United States Patent
Segawa et al.

(10) Patent No.: US 7,785,501 B2
(45) Date of Patent: Aug. 31, 2010

(54) BLACK RESIN COMPOSITION FOR DISPLAY DEVICE, AND MEMBER FOR DISPLAY DEVICE

(75) Inventors: Hiroaki Segawa, Tokyo (JP); Kei Ikegami, Tokyo (JP); Sachie Furukawa, Tokyo (JP); Hideo Takahashi, Mie (JP); Kaoru Isobe, Mie (JP); Katsuichi Chiba, Mie (JP); Yuichi Yasuda, Mie (JP)

(73) Assignees: Dai Nippon Printing Co., Ltd., Tokyo (JP); Ishihara Sangyo Kaisha, Ltd., Osaka (JP)

( * ) Notice: Subject to any disclaimer, the term of this patent is extended or adjusted under 35 U.S.C. 154(b) by 287 days.

(21) Appl. No.: 11/722,002

(22) PCT Filed: Dec. 27, 2005

(86) PCT No.: PCT/JP2005/023884

§ 371 (c)(1),
(2), (4) Date: Jun. 18, 2007

(87) PCT Pub. No.: WO2006/070794

PCT Pub. Date: Jul. 6, 2006

(65) Prior Publication Data

US 2008/0318018 A1    Dec. 25, 2008

(30) Foreign Application Priority Data

Dec. 28, 2004    (JP)    ............... 2004-382151

(51) Int. Cl.
*H01B 1/06*    (2006.01)
*G02B 5/20*    (2006.01)
(52) U.S. Cl. ............ 252/520.22; 423/598; 423/608
(58) Field of Classification Search ............ 252/520.22; 423/608, 598; 502/200, 350; 106/436
See application file for complete search history.

(56) References Cited

U.S. PATENT DOCUMENTS

| 4,125,412 | A | 11/1978 | West | |
|---|---|---|---|---|
| 5,002,646 | A * | 3/1991 | Egerton et al. | 204/177 |
| 7,071,139 | B2 | 7/2006 | Gole | |
| 2002/0169076 | A1 * | 11/2002 | Takeshi et al. | 502/350 |
| 2004/0058149 | A1 * | 3/2004 | Zhou et al. | 428/328 |

FOREIGN PATENT DOCUMENTS

GB    2167395    * 5/1986

(Continued)

OTHER PUBLICATIONS

Yang et al "Optical properties of titanium oxynitride nanocrystals...", Chem Phys Lett 383 (2004) 502-506.*

*Primary Examiner*—Mark Kopec
(74) *Attorney, Agent, or Firm*—Ladas & Parry LLP

(57) ABSTRACT

A black resin composition for a display device, which can achieve a high optical density even when its light-blocking agent content is relatively low and can achieve a high optical density even when it is formed into a thin film, and a member for display device which can reduce unevenness of display caused by a level difference in a pixel part resulting from the film thickness of the black resin composition. The black resin composition for a display device has a black titanium oxynitride represented by composition formula: $TiN_xO_{y-n}SiO_2$ (wherein x and y each are a real number of larger than 0 but less than 2, and n is a real number within the range of 0 less than or equal to n less than or equal to 0.05), containing a nitrogen atom represented by N in an amount of 17 wt % or more but less than 23 wt %, and having a specific surface area of 5 to 30 m2/g and a crystalline size as measured with an X-ray diffractometer of 17 to 25 nm, and a curable binder system. Also, a member for display device having a light-blocking layer formed using the said black resin composition for display device.

11 Claims, 6 Drawing Sheets

PRODUCTION EXAMPLE 1

FOREIGN PATENT DOCUMENTS

| | | |
|---|---|---|
| JP | 53-33228 | 3/1978 |
| JP | 60-065069 A | 4/1985 |
| JP | 61-201610 A | 9/1986 |
| JP | 07-018210 | 1/1995 |
| JP | 07-089721 | 4/1995 |
| JP | 08-059240 | 3/1996 |
| JP | 10-046042 | 2/1998 |
| JP | 2000-143985 | 5/2000 |
| JP | 2004-004651 | 1/2004 |
| JP | 2004-093656 | 3/2004 |
| JP | 2006-182627 * | 7/2006 |
| WO | WO2006/070795 | 7/2006 |

* cited by examiner

BLACK RESIN COMPOSITION FOR DISPLAY DEVICE, AND MEMBER FOR DISPLAY DEVICE

TECHNICAL FIELD

The present invention relates to a black resin composition for display device and a member for display device, such as a color filter for use in a liquid crystal display device or the like, using the black resin composition.

BACKGROUND ART

A member for display device includes a color filter for use in a liquid crystal display device or the like. A typical example of the structure of a color filter for use in a liquid crystal display device will be described with reference to FIG. 1.

As shown in FIG. 1(a), a color liquid crystal display device (101) generally has a structure in which a color filter 1 and an electrode substrate 2 such as a TFT substrate are opposed to each other to provide a gap 3 of about 1 to 10 μm between them, the gap 3 is filled with a liquid crystal compound L, and the periphery thereof is sealed with a sealant 4. The color filter 1 has a structure in which a light-blocking layer (black matrix layer) 6 having a predetermined pattern for shielding a boundary region between pixels from light, a pixel part 7 for forming pixels of a plurality of colors (usually, three primary colors of red (R), green (G), and blue (B)) arranged in a predetermined order, a protective film 8, and a transparent electrode film 9 are laminated on a transparent substrate 5 in this order from the side close to the transparent substrate. On the inner side surface of each of the color filter 1 and the electrode substrate 2 opposed to the color filter 1, there is provided an orientation film 10. In addition, in the gap 3, there are provided spacers for keeping a cell gap between the color filter 1 and the electrode substrate 2 constant and uniform. As such spacers, pearls 11 having a constant particle diameter may be dispersed in the gap 3, or as shown in FIG. 1(b), column-shaped spacers 12 having a height corresponding to the cell gap may be formed on the inner side surface of the color filter and in a region overlapped on the position where the light-blocking layer 6 is formed. A color display image can be obtained by controlling the light transmittance of the colored pixels having their respective colors or the liquid crystal layer provided behind the color filter.

As described above, a color filter generally used has a light-blocking layer provided between pixels of red, green, and blue to block light. By providing such a light-blocking layer, it is possible to improve the contrast ratio between light and dark. As such a light-blocking layer, an inorganic light-blocking thin film such as a chromium single-layer thin film or a chromium/chromium oxide laminated thin film has been conventionally and widely used. However, the use of such an inorganic light-blocking thin film containing chromium as a light-blocking layer involves problems that a production cost becomes high due to the necessity of a vacuum process for forming the thin film and that waste adversely affects the environment.

In order to solve such problems, there is proposed a resin light-blocking layer obtained by dispersing light-blocking particles such as carbon black or titanium black in a resin. However, such a resin light-blocking layer has a problem that its optical density (OD value) per unit film thickness is smaller than that of the inorganic thin film light-blocking layer. For this reason, the resin light-blocking layer usually needs to have a thickness of 1 μm or more to increase the contrast between light and dark of a liquid crystal display panel to maintain its image quality high.

Recently, however, there is a demand for a thinner and higher-performance color filter, and therefore there is also a demand for a resin light-blocking layer which can maintain a high OD value even when the thickness thereof is reduced. Meanwhile, as shown in FIG. 2, a color filter usually used has a structure in which the pattern of the pixel film 7 partially overlaps the light-blocking layer 6. A level difference 22 between a pixel surface 20 and a top 21 of a part of the pixel film overlapping the light-blocking layer increases as the thickness of the light-blocking layer increases. If the level difference 22 is large, the alignment of a liquid crystal is disordered. For this reason, in the case of using a resin light-blocking layer as the light-blocking layer, a transparent planarization film called an overcoat is generally formed after the formation of the pixel film to reduce the level difference. However, the cost of forming the planarization film is becoming a big issue concerning the use of a resin light-blocking layer. Also for this reason, there is a demand for a resin light-blocking layer which can maintain a high OD value even when the thickness thereof is reduced.

In order to obtain a resin light-blocking layer which can maintain a high OD value even when the thickness thereof is reduced, for example, Patent Document 1 discloses the formation of a resin black matrix having an optical density per unit film thickness of 4.4/μm or more, a film thickness of 0.9 μm or less, and a surface roughness of 30 nm or more using a paste for resin black matrix containing graphite fine particles having an average particle diameter of 100 to 400 nm in an amount of 25 to 75 wt % of the total amount of components constituting the paste. However, graphite is a scale-like crystal, and therefore when the paste containing graphite particles as light-blocking particles is applied onto a substrate, each graphite crystal reflects incident light like a mirror surface so that there is a fear that a total reflectance is increased and therefore the contrast of a display device is reduced. For this reason, there is a demand for alternative light-blocking particles to graphite.

On the other hand, a resin light-blocking layer using titanium oxynitride particles obtained by replacing part of oxygen of titanium dioxide with nitrogen is mainly used as a high-resistance light-blocking layer. Among various such resin light-blocking layers, a resin light-blocking layer intended to achieve a high OD value is disclosed in, for example, Patent Document 2. The Patent Document 2 discloses the use of titanium oxynitride having the composition of $TiN_xO_y$ (where $0<x<2.0$ and $0.1<y<2.0$) and produced by a method, in which titanium dioxide or titanium hydroxide is reduced at a high temperature in the presence of ammonia (Japanese Patent Application Laid-open (JP-A) Nos. 60-65069 and S61-201610), or a method, in which titanium dioxide or titanium hydroxide, to which a vanadium compound has been attached, is reduced at a high temperature in the presence of ammonia (JP-A No. 61-201610), in order to realize a resin black matrix formed from a black coating film having an optical density (OD value) of 3.0 or more per micrometer of film thickness and an adhesive strength of 5.0 MPa or more at the time when the contact area with glass is 5 mm². Further, Patent Document 3 discloses a black coating composition containing, as essential components, titanium oxynitride and a resin and having an optical density (OD value) of 3.0 or more per micrometer of film thickness and an X-ray intensity ratio R of 0.24 or more, R being represented by the following formula (1) $R=I_3/[I_3+1.8\times(I_1+1.8\times I_2)]$ (1), where $I_1$ represents the maximum diffraction line intensity of the titanium oxynitride at a diffraction angle 2θ of 25° to 26°, $I_2$ represents the maximum diffraction line intensity of the titanium oxynitride at a diffraction angle 2θ of 27° to 28°, and $I_3$ represents the maximum diffraction line intensity of the titanium oxynitride at a diffraction angle 2θ of 36° to 38° in the case of using CuKα rays as an X-ray source. However, the titanium oxynitride described in the Patent Document 3 is based on the premise that the peak of anatase-type titanium dioxide appearing at a diffraction angle 2θ of 25 to 26° (Type A) or the peak of rutile-type titanium dioxide appearing at a diffraction angle 2θ of 27 to 28° (Type R) is present. That is, the titanium oxynitride described in the Patent Document 3 contains titanium dioxide remaining without being completely reduced to titanium oxynitride as $I_1$ and $I_2$ can be observed in the all of the Examples.

Patent Document 1: JP-A No. 2004-93656
Patent Document 2: JP-A No. 2004-4651
Patent Document 3: JP-A No. 2000-143985

DISCLOSURE OF THE INVENTION

Problem to be Solved by the Invention

Although the resin black matrix disclosed in the Patent Document 2 has an OD value of 3.0 or more per micrometer of film thickness, an attempt to reduce its thickness was not actually made. Thus, an attempt to reduce the thickness of a light-blocking layer using the titanium oxynitride disclosed in the Patent Document 2 was made to the extent that the level difference described above can be reduced, but the titanium oxynitride was not sufficient to allow the light-blocking layer to maintain its OD value high. The black coating composition disclosed in the Patent Document 3 also has an OD value of 3.0 or more per micrometer of film thickness but an attempt to reduce its thickness was not actually made. Thus, an attempt to reduce the thickness of a light-blocking layer using the titanium oxynitride containing titanium dioxide disclosed in the Patent Document 3 was made to the extent that the level difference described above can be reduced, but the titanium oxynitride was not sufficient to allow the light-blocking layer to maintain its OD value high.

Meanwhile, a composition for forming a resin light-blocking layer is preferably photosensitive because it is possible to form a resin light-blocking layer by patterning by performing only the steps of application of the composition, exposure to light, and development, which greatly contributes to the simplification of a production process. It can be considered that an increase in light-blocking material content in a resin light-blocking layer can allow the resin light-blocking layer to maintain a high OD value even when the thickness thereof is reduced, but an increase in light-blocking material content in a resin light-blocking layer means a reduction in resin component content in the resin light-blocking layer. In a case where the resin component is made photosensitive to allow a resin light-blocking layer to be formed by patterning, a reduction in resin component content in the resin light-blocking layer causes a problem that the patterning of the resin light-blocking layer is impossible. For this reason, there is an upper limit to the light-blocking material content in the resin light-blocking layer. Therefore, there is a demand for a light-blocking material, which enables a resin light-blocking layer to have a high OD value even when the amount thereof contained in the resin light-blocking layer, is relatively small.

In view of the circumstances, it is a first object of the present invention to provide a black resin composition for display device, which can achieve a high optical density even when its black pigment content is relatively low and which can achieve a high optical density even when it is formed into a thin film having a smaller thickness than ever before.

Further, it is a second object of the present invention to provide a member for display device which is produced using the black resin composition achieving the above object and which can reduce unevenness of display caused by a level difference in a pixel part resulting from the film thickness of the black resin composition.

The present inventors have studied a black pigment which enables the black resin composition to have a high optical density even when the amount thereof contained in the black resin composition is relatively small, and as a result have found that titanium oxynitride, which is produced by reacting titanium dioxide or the like with an ammonia gas or the like to have a high nitrogen content of 17 wt % or more but less than 23 wt % and a small size of crystallites constituting titanium oxynitride particles of 17 to 25 nm, absorbs visible light due to its black color and, in addition, reflects visible light due to its high degree of nitriding and size effect resulting from a small crystallite size, and therefore has an excellent masking effect (light-blocking effect), and have found that a coating film of the black resin composition containing such predetermined titanium oxynitride has a significantly-improved light-blocking effect. These findings have led to the completion of the present invention.

More specifically, the present invention is directed to a black resin composition for display device comprising black titanium oxynitride represented by the composition formula: $TiN_xO_y \cdot nSiO_2$ (wherein Ti represents a titanium atom, N represents a nitrogen atom, O represents an oxygen atom, Si represents a silicon atom, x represents the ratio of nitrogen atoms to titanium atoms, y represents the ratio of oxygen atoms to titanium atoms, x and y are each a real number larger than 0 but less than 2, n represents the molar ratio of $SiO_2$ to $TiN_xO_y$ and is a real number within the range of $0 \leq n \leq 0.05$), containing nitrogen atoms represented by N in an amount of 17 wt % or more but less than 23 wt %, and having a specific surface area of 5 to 30 m$^2$/g and a crystallite size as measured using an X-ray diffractometer of 17 to 25 nm; and a curable binder system.

As described above, the black resin composition for display device according to the present invention uses the titanium oxynitride having a specific composition, a high nitrogen atom content, and a predetermined crystallite size and a curable binder system in combination, and therefore can achieve a high optical density even when its titanium oxynitride content is relatively low and can achieve a high optical density even when it is formed into a thin film. In addition, the black resin composition for display device according to the present invention can have a relatively high binder system content. Therefore, in a case where the binder system is photosensitive, patterning can be easily performed, which greatly contributes to the simplification of a production process and expands the application range of the black resin composition. That is, the black resin composition for display device according to the present invention can not only achieve a high optical density even when it is formed into a thin film but also have patterning ability.

In the present invention, from the viewpoint of achieving a higher optical density, it is preferred that the titanium oxynitride has a reflectance of at least 11% at a wavelength of 650 nm and a minimum reflectance of 11.5% or less within the wavelength range of 400 to 800 nm as measured using a UV-visible spectrophotometer.

In the present invention, from the viewpoint of achieving a higher optical density, it is also preferred that the titanium oxynitride represented by $TiN_xO_y \cdot nSiO_2$ contains a nitrogen atom represented by N in an amount of 19 to 22 wt %.

In the present invention, from the viewpoint of achieving a higher optical density, it is also preferred that the ratio of y to x (i.e., y/x) in $TiN_xO_y$ of the titanium oxynitride is in the range of 0.10 to 0.60.

In the present invention, from the viewpoint of particle dispersibility and dispersion stability, it is also preferred that the surface of particles of the titanium oxynitride is coated with an inorganic compound and/or an organic compound in an amount of 0.01 to 30 wt % with respect to the amount of the titanium oxynitride.

In the present invention, it is also preferred that the curable binder system is photosensitive. This makes it possible to easily perform patterning, which greatly contributes to the simplification of a production process and expands the application range of the black resin composition.

In the present invention, it is also preferred that the curable binder system contains a compound represented by the following formula (1):

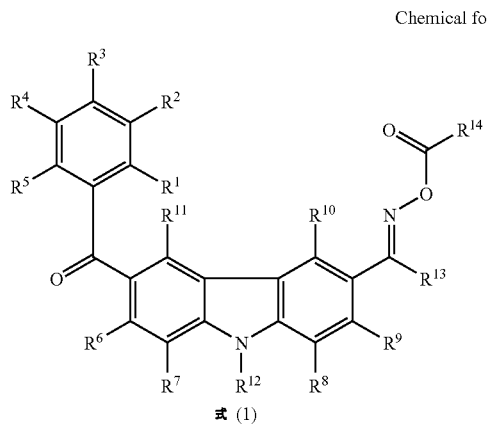

Chemical formula 1 wherein $R^1$ to $R^{14}$ are each independently hydrogen, a hydroxyl group, an amino group, a carboxyl group, a halogen, a ketone group, an aromatic group, or an aliphatic group, wherein the aromatic group and the aliphatic group may have a structure selected from among a branched structure and an alicyclic structure, and may contain one or more kinds of bonds selected from among an ether bond, an ester bond, an amino bond, an amide bond, a thioether bond, and an unsaturated bond at any position other than the terminal thereof, and may contain one or more kinds of groups selected from among a hydroxyl group, an amino group, a carboxyl group, a halogen, a carbonyl group, and an aromatic group at the terminal thereof. This improves the sensitivity of the photosensitive black resin composition, and therefore the photosensitive black resin composition can be satisfactorily cured even when it contains a relatively large amount of the titanium oxynitride to achieve a higher optical density.

In the present invention, from the viewpoint of reducing colored reflected light, it is also preferred that the black resin composition for display device further comprises carbon black in an amount of 3 to 20 wt % with respect to the total amount of a pigment including the titanium oxynitride.

In the present invention, from the viewpoint of a light-blocking effect and patterning, it is also preferred that when the binder system is photosensitive, the weight ratio between a pigment (P) including the titanium oxynitride and solid content (V) except for the pigment (i.e., P/V) is in the range of 0.5 to 3.0.

The black resin composition for display device according to the present invention is suitable for forming a light-blocking layer, and is therefore suitable for use in a color filter among various members for display device.

The present invention is also directed to a member for display device comprising a light-blocking layer formed using the black resin composition for display device according to the present invention.

As described above, the member for display device according to the present invention has a light-blocking layer formed using the black resin composition according to the present invention, and the light-blocking layer can have a sufficient optical density even when it is formed as a thin film. Therefore, the member for display device according to the present invention can be used for a thinner higher-performance optical device. In addition, the member for display device according to the present invention can reduce unevenness of display because a level difference in its pixel part can be reduced.

EFFECT OF THE INVENTION

The black resin composition for display device according to the present invention contains the titanium oxynitride having an excellent light-blocking effect, and therefore can achieve a high optical density even when its titanium oxynitride content is relatively low. Therefore, the coating film of the black resin composition can achieve a sufficient optical density even when the thickness thereof is smaller than ever before, or can achieve a higher optical density when the thickness thereof is the same as before.

Further, the black resin composition for display device according to the present invention can have a relatively high binder system content. Therefore, when the binder system is photosensitive, patterning can be easily performed, which greatly contributes to the simplification of a production process and expands the application range of the black resin composition. That is, the black resin composition for display device according to the present invention can not only achieve a high optical density even when it is formed into a thin film but also have patterning ability.

Furthermore, the member for display device according to the present invention has a light-blocking layer formed using the black resin composition for display device according to the present invention, and the light-blocking layer can have a sufficient optical density even when it is formed as a thin film. Therefore, the member for display device according to the present invention can be used for a thinner higher-performance optical device. In addition, the member for display device according to the present invention can reduce unevenness of display because a level difference in its pixel part can be reduced.

DESCRIPTION OF THE REFERENCE NUMERAL

Figure 1A:
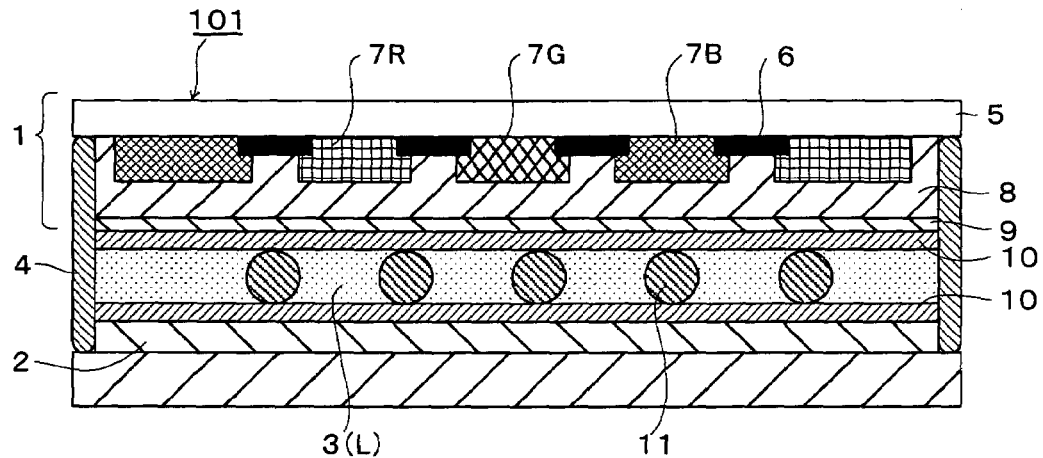
FIG. 1a is a schematic sectional view of an example of a liquid crystal panel.
Figure 1B:
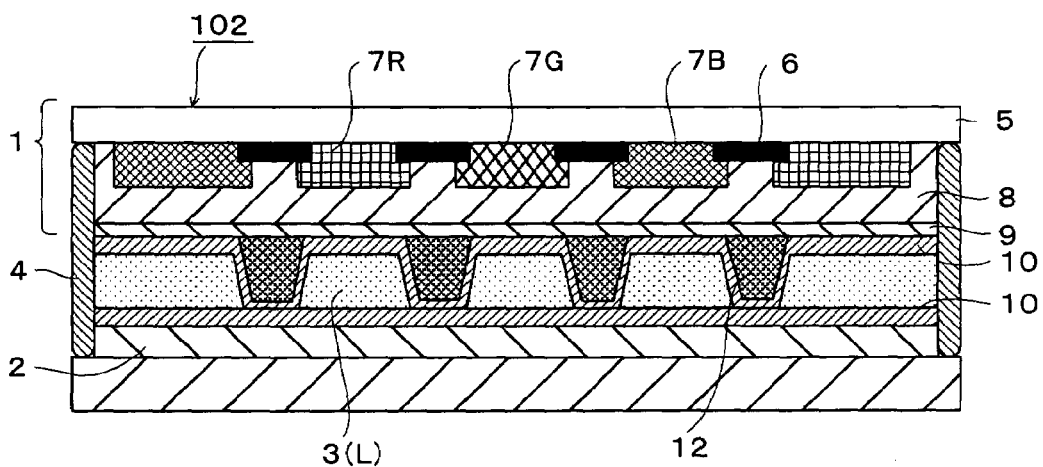
FIG. 1b is a schematic sectional view of another example of a liquid crystal panel.

1 ... color filter
2 ... electrode substrate
3 ... gap
4 ... sealant
5 ... transparent substrate
6 ... black matrix layer
7 (7R, 7G, 7B) ... colored layer
8 ... protective film
9 ... transparent electrode
10 ... oriented film
11 ... pearl
12 ... column-shaped spacers
20 ... pixel surface
21 ... top of an overlapping part of the pixel film
22 ... level difference
101, 102 ... color liquid crystal display device
103 ... color filter

BEST MODE FOR CARRYING OUT THE INVENTION

Hereinbelow, the present invention will be described in detail. It is to be noted that in the present invention, light includes electromagnetic waves having a wavelength within the visible and invisible light region and radioactive rays, and the radioactive rays include microwaves and electron beams. More specifically, in the present invention, light refers to electromagnetic waves and electron beams having a wavelength of 5 μm or less. It is also to be noted that in the present invention, the term "(meth)acrylic" refers to either acrylic or methacrylic, the term "(meth)acrylate" refers to either acrylate or methacrylate, and the term "(meth) acryloyl" refers to either acryloyl or methacryloyl.

1. Black Resin Composition for Display Device

A black resin composition for display device according to the present invention contains at least black titanium oxynitride and a curable binder system. The black titanium oxynitride is represented by the composition formula: $TiN_xO_y \cdot nSiO_2$ (wherein Ti represents a titanium atom, N represents a nitrogen atom, O represents an oxygen atom, Si represents a silicon atom, x represents the ratio of nitrogen atoms to titanium atoms, y represents the ratio of oxygen atoms to titanium atoms, x and y are each a real number of more than 0 but less than 2, n represents the molar ratio of $SiO_2$ to $TiN_xO_y$, and is a real number within the range of $0 \leq n \leq 0.05$), contains a nitrogen atom represented by N in an amount of 17 wt % or more but less than 23 wt %, and has a specific surface area of 5 to 30 m²/g and a crystallite size of 17 to 25 nm as measured using an X-ray diffractometer.

As described above, the black resin composition for display device according to the present invention uses the titanium oxynitride having a specific composition, a high nitrogen content, and a specific crystallite size and a curable binder system in combination, and therefore can achieve a high optical density even when its titanium oxynitride content is relatively low, and can achieve a high optical density even when it is formed into a thin film. In addition, the black resin composition for display device according to the present invention can have a relatively high binder system content. Therefore, in a case where the binder system is photosensitive, patterning can be easily performed, which greatly contributes to the simplification of a production process and expands the application range of the black resin composition. That is, the black resin composition for display device according to the present invention can not only achieve a high optical density even when it is formed into a thin film but also have patterning ability.

Hereinbelow, each component of the black resin composition for display device according to the present invention will be described.

<Titanium Oxynitride>

(1) Composition of Titanium Oxynitride

A titanium oxynitride according to the present invention is represented by $TiN_xO_y$, and if necessary, may contain silicon oxide represented by $SiO_2$. The silicon oxide may form a mixture with the titanium oxynitride, or may be attached to the surface of particles of the titanium oxynitride, or may form a composite with the titanium oxynitride, or may be present in a solid solution in particles of the titanium oxynitride. Therefore, the titanium oxynitride according to the present invention can be represented by the composition formula: $TiN_xO_y \cdot nSiO_2$, wherein Ti represents a titanium atom, N represents a nitrogen atom, O represents an oxygen atom, and Si represents a silicon atom, x represents the ratio of nitrogen atoms to titanium atoms, y represents the ratio of oxygen atoms to titanium atoms, n represents the molar ratio of $SiO_2$ to $TiN_xO_y$, and x and y are each a real number of more than 0 but less than 2. From the viewpoint of achieving good oxidation stability of the particles and a desired high degree of nitriding of the particles, the ratio of y to x (i.e., y/x) is preferably in the range of 0.10 to 0.60, more preferably in the range of 0.15 to 0.50, even more preferably in the range of 0.15 to 0.40, most preferably in the range of 0.15 to 0.30.

As described above, although the titanium oxynitride may or may not contain silicon oxide, it can be expected that silicon oxide has the effect of preventing sintering during the production of the titanium oxynitride, the effect of accelerating nitriding or improving the oxidation stability of the titanium oxynitride, and the effect of improving the dispersibility of the titanium oxynitride in a resin or solvent. In a case where the titanium oxynitride contains silicon oxide, the silicon oxide may be in the form of anhydrous silicon oxide, silicon oxide with adsorbed water, or hydrous silicon oxide. Further, in a case where the titanium oxynitride is produced at a high temperature, silicon oxide tends to be anhydrous silicon oxide. It can be considered that the silicon oxide is present in the form of $SiO_2$, but in a case where the silicon oxide is baked in an ammonia gas or amine gas at a high temperature during the production of the titanium oxynitride, there is a possibility that the silicon oxide is partially nitrided so that a silicon oxynitride or a silicon nitride is produced. For this reason, the titanium oxynitride according to the present invention may contain a silicon oxynitride or a silicon nitride. The molar ratio "n" of silicon oxide contained in the titanium oxynitride is a real number in the range of $0 \leq n \leq 0.05$, preferably in the range of $0.001 \leq n \leq 0.04$, more preferably in the range of $0.003 \leq n \leq 0.03$.

Titanium atoms and silicon atoms are analyzed by ICP emission spectrochemical analysis method, oxygen atoms are analyzed by an inert gas carrier/fusion-infrared absorption method, and nitrogen atoms are analyzed by a carbon-hydrogen-nitrogen analyzer, and then x and n are calculated from the thus obtained values. In a case where silicon atoms are present, y is calculated from a value obtained by subtracting the number of oxygen atoms constituting $SiO_2$ from the number of oxygen atoms obtained by analysis, assuming that the silicon atoms are bonded to oxygen atoms to form $SiO_2$.

(2) Nitrogen Content and Oxygen Content of Titanium Oxynitride

It is important that $TiN_xO_y \cdot nSiO_2$ contains a nitrogen atom represented by N in an amount of 17 wt % or more but less than 23 wt %, preferably in an amount of 19 to 22 wt %, more preferably in an amount of more than 20 wt % but 22 wt % or less. When the nitrogen content of the titanium oxynitride is 17 wt % or more, especially more than 20 wt %, the titanium oxynitride has a reddish black color, but a coating film containing such titanium oxynitride has metallic luster and therefore has a high visible light reflectance, thereby improving the masking effect (light-blocking effect) of the coating film. Titanium nitride represented by TiN contains nitrogen in an amount of about 23 wt %, but the nitrogen content of the titanium oxynitride according to the present invention is lower than that.

On the other hand, the oxygen (O) content in $TiN_xO_y$ is preferably in the range of 0.5 to 15 wt %, more preferably in the range of 1 to 13 wt %, even more preferably in the range of 2 to 11 wt %, still even more preferably in the range of 3 to 10 wt %, most preferably in the range of 4 to 9 wt % from the viewpoint of temporal stability that oxidation of the titanium oxynitride is less likely to proceed.

(3) X-ray Diffraction of Titanium Oxynitride

When the titanium oxynitride is analyzed by X-ray diffraction (using Cuα rays), a main (first) peak is observed between $2\theta=40°$ and $45°$, and a second peak is observed between $2\theta=35°$ and $40°$. The angle of the first peak shifts gradually as the nitrogen content of the titanium oxynitride is changed. For example, when x in $TiN_xO_y$ is changed from 0.85 to 1, the position of the peak shifts to the lower angle side. More specifically, when x is about 0.95, 0.93, or 0.89, $2\theta$ is about $42.9°$, $43.0°$, or $43.2°$, respectively. The main (first) peak of the titanium oxynitride according to the present invention is not observed at an angle ($42.6°$) where the peak of titanium nitride is observed, but is observed at an angle larger than $42.6°$, that is, at an angle in the range of, for example, 42.7 to $43.5°$. For this reason, it can be said that the titanium oxynitride according to the present invention is different from titanium nitride or titanium nitride whose surface has been partially oxidized. Further, the titanium oxynitride is obtained by heat-baking a titanium oxide such as titanium dioxide, hydrous titanium oxide, titanium hydroxide, or low-order titanium oxide (e.g., $TiO$, $Ti_2O_3$, $Ti_3O_5$) in the presence of an ammonia gas, amine gas, or the like, and therefore when the titanium oxide used as a starting material remains, an X-ray diffraction peak derived from, for example, titanium dioxide is observed. However, in the present invention, titanium dioxide or the like is preferably reduced to the extent that an x-ray diffraction peak derived from it cannot be observed or lower so as not to remain as an impurity. It is to be noted that the X-ray diffraction peak of anatase-type titanium dioxide appears between $2\theta=25°$ and $26°$, and the X-ray diffraction peak of rutile-type titanium dioxide appears between $2\theta=27°$ and $28°$. On the other hand, the X-ray diffraction peak of silicon oxide cannot be observed even when silicon oxide is present in a relatively large amount.

The size of crystallites constituting particles of the titanium oxynitride can be determined using the half width of the X-ray diffraction main (first) peak of the titanium oxynitride and the following formula I (Scherrer's formula). The crystallite size of titanium black commercially available is 26 nm, but it is important that the crystallite size of the titanium oxynitride according to the present invention is preferably in the range of 17 to 25 nm, more preferably in the range of 19 to 24 nm, even more preferably in the range of 19.5 to 23 nm, most preferably in the range of 20 to 22 nm. By setting the crystallite size of the titanium oxynitride to a value within the above range, it is possible for the titanium oxynitride to have a relatively high degree of blackness due to a size effect even when the degree of nitriding of the titanium oxynitride is high.

Formula 1: $D=0.9\lambda/(\beta_{1/2} \times \cos \theta)$, wherein D represents a crystallite size (Å) to be calculated, $\lambda$ represents the wavelength of X rays, and in this case $\lambda$ is 1.54 Å that is the wavelength of Cuα rays, $\beta_{1/2}$ represents the half width (radian) of a main (first) peak, and $\theta$ represents the angle of reflection.

(4) Degree of Blackness of Titanium Oxynitride

The titanium oxynitride has a black color. The black color includes pure black and black-based colors showing another color in addition to black, such as bluish black, purplish black, reddish black, and brownish black. The lightness and hue of the titanium oxynitride are determined based on the Lab color system in the following manner. The sample of 1.5 g is placed in a glass cylindrical cell (Nippon Denshoku K.K., No. 1483), the cell is set in a calorimeter (manufactured by Nippon Denshoku K.K. under the trade name of "Color Meter ZE2000"), and the color of the sample is measured from the bottom of the cell. The degree of blackness is expressed by a lightness index, that is an L-value in the Lab color system, and a smaller L-value means that the degree of blackness is higher. The titanium oxynitride according to the present invention can have a degree of blackness corresponding to an L-value of, for example, about 2 to 20, preferably about 8 to 13.

An a-value and a b-value in the lab color system, which can be determined in the same manner as in the case of an L-value, are indices of hue and color saturation. A larger a-value on the positive side means that the degree of redness is higher, and a larger a-value on the negative side means that the degree of greenness is higher. On the other hand, a larger b-value on the positive side means that the degree of yellowness is higher, and a larger b-value on the negative side means that the degree of blueness is higher. The titanium oxynitride according to the present invention can have a hue having an a-value of, for example, about 2 to 5 and a b-value of, for example, about −1 to 5.

(5) Visible Light Reflectance of Titanium Oxynitride

As described above, the titanium oxynitride has a black color, and therefore inherently absorbs visible light well. However, it can be considered that the masking effect of such the titanium oxynitride can be further improved by utilizing not only absorption of visible light but also reflection of visible light. More specifically, the titanium oxynitride can obtain a higher shielding effect (light-blocking effect) by making the minimum reflectance thereof within the wavelength range of 400 to 800 nm smaller and making the reflectance thereof at a wavelength within the long-wavelength region of visible light higher. The visible light reflection properties of the titanium oxynitride can be determined in the following manner. The titanium oxynitride powder of 0.3 g is placed in a cylindrical cell (diameter: 16 mm, JASCO Corporation, PSH-001), and the cylindrical cell is set in an UV visible spectrophotometer (manufactured by JASCO Corporation under the trade name of "V-570") to measure the visible light reflection spectrum of the titanium oxynitride (a barium salfate powder is used as a reference sample). It is generally said that when a visible light reflection spectrum is measured, a light wavelength, at which a reflectance is minimized, is present within the range of 400 to 800 nm and light having a wavelength longer than that is reflected. Therefore, it is possible to enhance visible light reflection by, for example, changing the composition of the titanium oxynitride in such a manner that a light wavelength, at which a reflectance is minimized, shifts to the lower wavelength side.

The present inventors have studied from such a viewpoint, and as a result have found that a wavelength, at which the titanium oxynitride according to the present invention shows its minimum reflectance, shifts to a lower wavelength side due to its high degree of nitriding and size effect resulting from its small crystallite size. Further, the wavelength, at which the titanium oxynitride shows its minimum reflectance, is preferably about 550 nm or less, more preferably about 490 nm or less from the viewpoint of achieving a desired reflection effect. Although the minimum reflectance of the titanium oxynitride varies depending on its crystallite size, specific surface area, or degree of nitriding, the titanium oxynitride according to the present invention has specified crystallite size, specific surface area, and nitrogen content to reduce its minimum reflectance, thereby increasing its absorptance at that wavelength. The minimum reflectance of the titanium oxynitride according to the present invention as measured over the wavelength range of 400 to 800 nm is preferably 11.5% or less.

When the reflectance of the titanium oxynitride at 650 nm (red light) is represented on behalf of the visible light reflectance, the reflectance is preferably at least about 11%, more preferably at least about 13%, even more preferably at least about 14%, most preferably at least about 15%. From these findings, it is preferred that the titanium oxynitride according to the present invention has a reflectance of at least 11% at 650 nm, shows its minimum reflectance at 550 nm or less, and has a minimum reflectance of 11.5% or less from the viewpoint of achieving a higher optical density.

(6) Particle diameter of Titanium Oxynitride

When the particles of $TiN_xO_y \cdot nSiO_2$ are observed with an electron microscope, the particle diameter of the particles is preferably in the range of 0.02 to 0.5 µm, more preferably in the range of 0.02 to 0.25 µm, even more preferably in the range of 0.03 to 0.2 µm, most preferably in the range of 0.03 to 0.1 µm from the view point of achieving an excellent masking effect. It is to be noted that the "particle diameter" herein means an average particle diameter. In a case where the titanium oxynitride contains silicon oxide, it is impossible to recognize the existence of silicon oxide with an electron microscope, but it can be assumed that silicon oxide is attached to the surface of the titanium oxynitride particles.

(7) Specific Surface Area of Titanium Oxynitride

The specific surface area of the titanium oxynitride measured by a BET method is preferably in the range of 5 to 30 $m^2/g$, more preferably in the range of 10 to 25 $m^2/g$, from the viewpoint of facilitating the dispersion of the titanium oxynitride in a resin binder with a dispersant and achieving a good masking effect.

(8) Method for Producing Titanium Oxynitride

The titanium oxynitride according to the present invention can be produced by heat-baking a titanium oxide placed in an apparatus in the presence of a nitrogen-containing reducing agent at a temperature in the range of about 750 to 1200° C. The heat-baking temperature is preferably in the range of about 850 to 1100° C., more preferably in the range of about 950 to 1050° C., most preferably in the range of about 970 to 1000° C. By optimizing the heat-baking temperature, it is possible to obtain titanium oxynitride having a high degree of nitriding and a small crystallite size. If the heat-baking temperature is less than the above lower limit value, nitriding is less likely to proceed and therefore it is difficult to obtain the desired titanium oxynitride. On the other hand, if the heat-baking temperature exceeds the above upper limit value, sintering proceeds and therefore it is difficult to obtain fine particles. The time for heat-baking can be appropriately set because it varies depending on the amount of the titanium oxide or the nitrogen-containing reducing agent, but is usually in the range of about 1 to 20 hours, preferably in the range of about 3 to 10 hours from the viewpoint of operation. It is to be noted that the titanium oxynitride obtained by heat-baking may be repeatedly cooled and then again subjected to heat-baking. Examples of the apparatus for heat-baking include well-known apparatuses such as fluidized-bed apparatuses, rotary kilns, and tunnel kilns. Among them, rotary kilns are preferred. Examples of the nitrogen-containing reducing agent include ammonia, alkylamines such as methylamine and dimethylamine, and hydrazine-based compounds such as hydrazine, hydrazine sulfate, and hydrazine hydrochloride. These reducing agents can be used singly or in combination of one or two or more kinds of them. Among these reducing agents, ammonia and alkylamines are preferred because they are in gaseous form and therefore can be brought into contact with and reacted with a titanium oxide uniformly. In addition, it is preferred that a trace amount of nitrogen, hydrogen, or a hydrocarbon is added to the nitrogen-containing reducing agent to accelerate nitriding. Particularly, a hydrocarbon is preferred because it reacts with oxygen contained in the titanium oxide to form carbon dioxide, which makes it possible to suppress the generation of water inhibiting nitriding.

The term "titanium oxide" herein refers to compounds including not only rutile(R)-type and anatase(A)-type titanium dioxides usually used but also hydrated titanium oxide, hydrous titanium oxide, titanium hydroxide, and low-order titanium oxides (e.g., $TiO$, $Ti_2O_3$, $Ti_3O_5$). Titanium dioxide can be obtained by, for example, heat-baking hydrous titanium oxide (or titanium hydroxide) in an atmosphere of air or an oxygen-containing gas or in an atmosphere of an inert gas such as nitrogen or argon at a temperature of about 800 to 1000° C. Hydrous titanium oxide can be obtained by, for example, dissolving titanium-containing ore (which may be crushed if necessary) such as ilmenite or titanium slag in sulfuric acid to react a titanium component with the sulfuric acid to generate titanyl sulfate ($TiOSO_4$), leaving the solution at rest for classification, filtering the solution, and subjecting the titanyl sulfate to thermal hydrolysis. Titanium dioxide is preferred rather than hydrated titanium oxide, hydrous titanium oxide, or titanium hydroxide because when such a titanium oxide contains water, nitriding of the titanium oxide by heat-baking in the presence of a nitrogen-containing reducing agent is less likely to proceed. Further, anatase-type titanium dioxide is more preferred than rutile-type titanium dioxide from the viewpoint of ease of nitriding.

Further, the titanium oxynitride according to the present invention is preferably produced by heat-baking titanium oxide particles whose surface has been coated with silicon oxide because sintering of the particles is less likely to occur even at a high heat-baking temperature within the above range, rutile-type titanium dioxide is less likely to be produced during reaction and therefore nitriding easily proceeds, and fine titanium oxynitride can be more easily obtained. The surface of titanium oxide particles may be coated with porous silicon oxide or dense silicon oxide, but is preferably coated with dense silicon oxide because the effect of suppressing sintering can be more easily obtained. The amount of silicon oxide for coating the surface of the titanium oxide particles should be determined so that the molar ratio n of silicon oxide to $TiN_xO_y$ obtained by heat-baking is in the range of $0 < n \leq 0.05$, preferably in the range of $0.001 \leq n \leq 0.04$, more preferably in the range of $0.003 \leq n \leq 0.03$. If the amount of silicon oxide for coating the surface of the titanium oxide particles is less than the above lower limit value, it is difficult to obtain a desired sintering-suppressing effect. On the other hand, if the amount of silicon oxide for coating the surface of the titanium oxide particles exceeds the above upper limit value, nitriding is less likely to proceed.

The coating of titanium oxide with dense silicon oxide can be carried out by a known method described in, for example, JP-A No. 53-33228 or JP-A No. 7-8971. According to a method described in JP-A No. 53-33228, a titanium oxide slurry is maintained at a temperature in the range of 80 to 100° C., the pH of the slurry is preferably adjusted to 9 to 10.5, sodium silicate is quickly added to the slurry, the slurry is neutralized to a pH9 to 10.5, and the slurry is maintained at a temperature of 80 to 100° C. for 50 to 60 minutes. On the other hand, according to a method described in JP-A No. 7-8971, a titanium oxide slurry is adjusted to a pH in the range of 9.5 to 11, silicate is added to the slurry little by little in 30 to 120 minutes at a temperature of 60° C. or higher, preferably 70° C. or higher, more preferably 90° C. or higher, the slurry is neutralized, and the temperature of the slurry is maintained for 60 to 120 minutes. Examples of the silicate include sodium silicate and potassium silicate. Examples of a neutralizing agent include acid compounds such as inorganic acids (e.g., sulfuric acid, hydrochloric acid) and organic acids (e.g., acetic acid, formic acid). After the completion of the coating with silicon oxide, the slurry is preferably dehydrated and washed before it is subjected to the process of heat-baking.

On the other hand, the coating of a titanium oxide with porous silicon oxide is carried out by quickly adding sodium silicate to a titanium oxide slurry while maintaining the slurry at a temperature of 70° C. or less, neutralizing the slurry, and maintaining the slurry at a temperature of 70° C. or less for 30 minutes or less.

If necessary, the thus produced titanium oxynitride may be dry-ground, or may be wet-ground, dehydrated, dried, and dry-ground after slurried by a known method. Wet-grinding can be carried out with, for example, a vertical type sand mill or a horizontal type sand mill, drying can be carried out with, for example, a band type heater or a batch type heater, dry-grinding can be carried out with, for example, an impact grinder such as a hammer mill or a pin mill, an abrasive grinder such as a crusher, a jet type grinder such as a jet mill or a snail mill, or a spray drier.

Further, the surface of particles of the titanium oxynitride according to the present invention may be coated with at least one compound selected from among inorganic compounds and organic compounds for the purpose of improving affinity with a resin binder, temporal stability during the storage of the coating material, or productivity.

Examples of the inorganic compound include aluminum compounds, silicon compounds, zirconium compounds, tin compounds, titanium compounds, and antimony compounds. These inorganic compounds can be used singly or in combination of two or more of them by, for example, laminating two or more coatings of different compounds onto the surface of the particles or applying one coating containing two or more compounds onto the surface of the particles. These inorganic compounds are more preferably of at least one kind selected from an oxide, a hydroxide, a hydrated oxide, and a phosphate.

Examples of the organic compound include polyvalent alcohols, alkanolamines and derivatives thereof, organosilicon compounds, higher fatty acids and metal salts thereof, and organometallic compounds. Specific examples of (1) the polyvalent alcohols include trimethylolethane, trimethylolpropane, tripropanolethane, and pentaerythritol. Specific examples of (2) the alkanolamines include triethanolamine and tripropanolamine. Specific examples of (3) the organosilicon compounds include: (a) polysiloxanes such as dimethylpolysiloxane, methylhydrogenpolysiloxane, methylphenylpolysiloxane, dimethylpolysiloxanediol, alkyl-modified silicone oil, alkylaralkyl-modified silicone oil, amino-modified silicone oil, both-terminal amino-modified silicone oil, epoxy-modified silicone oil, both-terminal epoxy-modified silicone oil, and fluorine-modified silicone oil; and (b) organo silanes such as nonreactive silanes (e.g., alkylsilanes such as n-butyltriethoxysilane, isobutyltrimethoxysilane, n-hexyltrimethoxysilane, n-hexyltriethoxysilane, n-octyltrimethoxysilane, n-octyltriethoxysilane, n-decyltrimethoxysilane, n-octadecyltrimethoxysilane, n-octadecylmethyldimethoxysilane; phenylsilanes such as phenyltriethoxysilane; and fluorosilanes such as trifluoropropyltrimethoxysilane) and silane coupling agents (e.g., aminopropyltriethoxysilane, N-(β-aminoethyl)-γ-aminopropyltriethoxysilane, N-phenyl-γ-aminopropyltrimethoxysilane, vinyltrimethoxysilane, vinyltriethoxysilane, vinyltrichlorosilane, γ-glycidoxypropyltrimethoxysilane, methacryloxypropyltrimethoxysilane, and β-(3,4-epoxycyclohexyl)ethyltrimethoxysilane).

Specific examples of (4) the higher fatty acids include stearic acid and lauric acids and specific examples of metal salts thereof include magnesium salts and zinc salts. Specific examples of (5) the organometallic compounds include: titanium coupling agents such as isopropyltriisostealoyl titanate, isopropyltris(dioctylpyrophosphate)titanate, tetra(2,2-diallyloxymethyl-1-butyl)bis(ditridecyl)phos phitetitanate, bis (dioctylpyrophosphate)oxyacetate titanate, bis(dioctylpyrophosphate)ethylene titanate, and isopropyltri(N-amidoethyl•aminoethyl)titanate; aluminum coupling agents such as acetoalkoxyaluminum diisopropylate; and zirconium-based compounds such as zirconium tributoxyacetylacetonate and zirconium tributoxystearate. These organic compounds for coating can be used singly or in combination of two or more of them.

The amount of the inorganic or organic compound for coating the surface of particles of the titanium oxynitride can be appropriately determined, but is preferably in the range of about 0.01 to 30 wt %, more preferably in the range of about 0.05 to 10 wt %, even more preferably in the range of about 0.1 to 5 wt % with respect to the amount of the titanium oxynitride. The coating of the surface of the titanium oxynitride with the inorganic or organic compound can be carried out by a known wet or dry method during, for example, dry-grinding of the titanium oxynitride, or slurrying of the titanium oxynitride, or wet-grinding of the titanium oxynitride. In the case of using a wet method for surface treatment, the titanium oxynitride is preferably wet-ground before or in the course of surface treatment. Further, in the case of using a wet method for surface treatment, surface treatment can be carried out in either an aqueous system or a solvent system. However, an aqueous system is preferred from the viewpoints of environment, costs, and facilities. It is to be noted that in the case of carrying out surface treatment in an aqueous system, especially in the case of carrying out wet grinding, the titanium oxynitride is slightly oxidized due to the influence of water itself or dissolved oxygen in the water, and therefore wet-grinding is preferably carried out in the presence of a reducing agent such as hydrazine, sodium borohydride, formaldehyde, tartaricacid, glucose, sodium hypophosphite, or sodium N—N-diethylglycine.

The amount of the titanium oxynitride contained in the black resin composition for display device is preferably in the range of 33 to 75 parts by weight, more preferably in the range of 38 to 72 parts by weight, per 100 parts by weight of the solid content of the black resin composition for display device. It is to be noted that the solid content used for determining the mixing ratio of the titanium oxynitride includes all the components of the black resin composition except for a solvent. For example, a liquid polymerizable monomer is also included in the solid content.

<Curable Binder System>

The black resin composition for display device according to the present invention contains a curable binder system to impart sufficient strength, durability, and adhesiveness to a coating film of the black resin composition. The curable binder system allows a patterned coating film of the black resin composition formed on a substrate by coating, an ink-jet method or transfer, to be cured by polymerization reaction.

Examples of such a curable binder system include: a photosensitive binder system which can be cured or changed in its solubility by polymerization initiated by irradiation with visible light, UV rays, or electron beams; and a thermosetting binder system which can be cured by polymerization initiated by heating. The curable binder system to be used in the present invention may be the photosensitive binder system, or the thermosetting binder system, or a combination of the photosensitive binder system and the thermosetting binder system.

(1) Photosensitive Binder System

The photosensitive binder system contains a photocurable resin which can be cured by polymerization initiated by irradiation with light such as UV rays or electron beams. Examples of such a photosensitive binder system include a negative-type photosensitive binder system in which a light-exposed portion of the coating film is cured, and therefore a light-unexposed portion is dissolved and removed to leave the light-exposed portion as a pattern of the coating film; and a positive-type photosensitive binder system in which a light-exposed portion chemically reacts and then becomes soluble in, for example, an aqueous alkali solution, therefore the light-exposed portion is dissolved and removed by utilizing a difference in solubility in an aqueous alkali solution between the light-exposed portion and a light-unexposed portion to leave only the light-unexposed portion as a pattern of the coating film.

(i) Negative-Type Photosensitive Binder System

The negative-type photosensitive binder system containing a photocurable resin which can be cured by polymerization initiated by irradiation with light such as UV rays or electron beams includes (A) an alkali-soluble resin, (B) a polyfunctional monomer, (C) a photopolymerization initiator and a sensitizer.

(A) Alkali Soluble Resin

As the alkali soluble resin to be used in the present invention, any resin can be appropriately used as long as it has a carboxyl group in the side chain thereof, acts as a binder for the titanium oxynitride described above, and is soluble in a developer, particularly preferably an alkali developer used for patterning. The alkali-soluble resin to be preferably used in the present invention is a resin having a carboxyl group, and specific examples thereof include carboxyl group-containing acrylic copolymers and carboxyl group-containing epoxy (meth)acrylate resins. Among these alkali-soluble resins, those having a carboxyl group in the side chain thereof and, in addition, having an ethylenically unsaturated group in the side chain thereof are particularly preferred. These acrylic copolymers and epoxy acrylate resins can be used in combination of two or more of them.

(Carboxyl Group-Containing Acrylic Copolymer)

The carboxyl group-containing acrylic copolymer can be obtained by copolymerizing a carboxyl group-containing ethylenically unsaturated monomer and an ethylenically unsaturated monomer.

Examples of the carboxyl group-containing ethylenically unsaturated monomer include: unsaturated monocarboxylic acids such as acrylic acid, methacrylic acid, crotonic acid, α-chloroacrylic acid, and cinnamic acid; unsaturated dicarboxylic acids (acid anhydrides) such as maleic acid, maleic acid anhydride, fumaric acid, itaconic acid, itaconic acid anhydride, citraconic acid, citraconic acid anhydride, and mesaconic acid; tri- or higher-valent unsaturated polyvalent carboxylic acids (acid anhydrides); mono(2-acryloyloxyethyl) esters or mono(2-acryloyloxyethyl) esters of a nonpolymerizable dicarboxylic acid such as mono(2-acryloyloxyethyl) succinate, mono(2-methacryloyloxyethyl) succinate, mono(2-acryloyloxyethyl) phthalate, and mono(2-methacryloyloxyethyl) phthalate; and ω-carboxypolycaprolactone monoacrylate and ω-carboxypolycaprolactone monomethacrylate. These carboxyl group-containing ethylenically unsaturated monomers can be used singly or in combination of two or more of them.

Examples of the ethylenically unsaturated monomer include aromatic vinyl compounds such as styrene, α-methylstyrene, o-vinyltoluene, m-vinyltoluene, p-vinyltoluene, p-chlorostyrene, o-methoxystyrene, m-methoxystyrene, p-methoxystyrene, indene, p-vinylbenzyl methyl ether, and p-vinylbenzyl glycidyl ether; unsaturated carboxylic acid esters such as methyl acrylate, methyl methacrylate, ethyl acrylate, ethyl methacrylate, n-propylacrylate, n-propylmethacrylate, i-propylacrylate, i-propylmethacrylate, n-butylacrylate, n-butylmethacrylate, i-butylacrylate, i-butylmethacrylate, sec-butylacrylate, sec-butylmethacrylate, t-butylacrylate, t-butylmethacrylate, 2-hydroxyethylacrylate, 2-hydroxyethylmethacrylate, 2-hydroxypropylacrylate, 2-hydroxypropylmethacrylate, 3-hydroxypropylacrylate, 3-hydroxypropylmethacrylate, 2-hydroxybutylacrylate, 2-hydroxybutylmethacrylate, 3-hydroxybutylacrylate, 3-hydroxybutylmethacrylate, 4-hydroxybutylacrylate, 4-hydroxybutylmethacrylate, allylacrylate, allylmethacrylate, benzylacrylate, benzylmethacrylate, phenylacrylate, phenylmethacrylate, 2-methoxyethylacrylate, 2-methoxyethylmethacrylate, methoxydiethylene glycol acrylate, methoxydiethylene glycol methacrylate, methoxytriethylene glycol acrylate, methoxytriethylene glycol methacrylate, methoxydipropylene glycol acrylate, methoxydipropylene glycol methacrylate, glycerin monoacrylate, and glycerin monomethacrylate; unsaturated carboxylic acid aminoalkyl esters such as 2-aminoethylacrylate, 2-aminoethylmethacrylate, 2-dimethylaminoethyl acrylate, 2-dimethylaminoethyl methacrylate, 2-aminopropyl acrylate, 2-aminopropyl methacrylate, 2-dimethylaminopropyl acrylate, 2-dimethylaminopropyl methacrylate, 3-aminopropyl acrylate, 3-aminopropyl methacrylate, 3-dimethylaminopropyl acrylate, and 3-dimethylaminopropyl methacrylate; unsaturated carboxylic acid glycidyl esters such as glycidyl acrylate and glycidyl methacrylate; carboxylic acid vinyl esters such as vinyl acetate, vinyl propionate, vinyl butyrate, and vinyl benzoate; unsaturated ethers such as vinyl methyl ether, vinyl ethyl ether, allyl glycidyl ether, and methacryl glycidyl ether; vinyl cyanide compounds such as acrylonitrile, methacrylonitrile, α-chloroacrylonitrile, and vinylidene cyanide; unsaturated amides such as acrylamide, methacrylamide, α-chloroacrylamide, N-(2-hydroxyethyl)acrylamide, N-(2-hydroxyethyl)methacrylamide, N-methylolacrylamide, and N-methylolmethacrylamide; N-substituted maleimides such as N-cyclohexylmaleimide, N-phenylmaleimide, N-o-hydroxyphenylmaleimide, N-m-hydroxyphenylmaleimide, N-p-hydroxyphenylmaleimide, N-o-methylphenylmaleimide, N-m-methylphenylmaleimide, N-p-methylphenylmaleimide, N-o-methoxyphenylmaleimide, N-m-methoxyphenylmaleimide, and N-p-methoxyphenylmaleimide; aliphatic conjugated dienes such as 1,3-butadiene, isoprene, and chloroprene; macromonomers having a monoacryloyl group or a monomethacryloyl group at the terminal of a polymer molecular chain such as polystyrene, polymethyl acrylate, polymethyl methacrylate, poly-n-butylacrylate, poly-n-butylmethacrylate, and polysiloxane. These ethylenically unsaturated monomers can be used singly or in combination of two or more of them.

Specific examples of the carboxyl group-containing acrylic copolymers include (meth)acrylic acid/benzyl(meth)acrylate copolymer, (meth)acrylic acid/styrene/methyl(meth)acrylate copolymer, (meth)acrylic acid/styrene/benzyl(meth)acrylate copolymer, (meth)acrylic acid/methyl(meth)acrylate/polystyrene macromonomer copolymer, (meth)acrylic acid/methyl(meth)acrylate/polymethyl methacrylate macromonomer copolymer, (meth)acrylic acid/benzyl(meth)acrylate/polystyrene macromonomer copolymer, (meth)acrylic acid/benzyl(meth)acrylate/polymethyl methacrylate macromonomer copolymer, (meth)acrylic acid/glycerin mono(meth)acrylate/benzyl(meth)acrylate copolymer, (meth)acrylic acid/glycerin mono(meth)acrylate/phenyl (meth)acrylate copolymer, (meth)acrylic acid/glycerin mono (meth)acrylate/N-phenylmaleimide copolymer, (meth)acrylic acid/2-hydroxyethyl(meth)acrylate/benzyl (meth)acrylate/polystyrene macromonomer copolymer, (meth)acrylic acid/2-hydroxyethyl(meth)acrylate/benzyl (meth)acrylate/polymethyl methacrylate macromonomer copolymer, (meth)acrylic acid/styrene/benzyl(meth)acrylate/N-phenylmaleimide copolymer, (meth)acrylic acid/styrene/phenyl(meth)acrylate/N-phenylmaleimide copolymer, (meth)acrylic acid/glycerin mono(meth)acrylate/styrene/benzyl(meth)acrylate copolymer, (meth)acrylic acid/glycerin mono(meth)acrylate/styrene/phenyl(meth)acrylate copolymer, (meth)acrylic acid/glycerin mono(meth)acrylate/styrene/N-phenylmaleimide copolymer, (meth)acrylic acid/glycerin mono(meth)acrylate/methyl(meth)acrylate/benzyl (meth)acrylate copolymer, (meth)acrylic acid/glycerin mono (meth)acrylate/methyl(meth)acrylate/phenyl(meth)acrylate copolymer, (meth)acrylic acid/glycerin mono(meth)acrylate/methyl(meth)acrylate/N-phenylmaleimide copolymer, (meth)acrylic acid/glycerin mono(meth)acrylate/2-hydroxyethyl(meth)acrylate/benzyl (meth)acrylate copolymer, (meth)acrylic acid/glycerin mono(meth)acrylate/2-hydroxyethyl(meth)acrylate/phenyl (meth)acrylate copolymer, (meth)acrylic acid/glycerin mono(meth)acrylate/2-hydroxyethyl(meth)acrylate/N-phenylmaleimide copolymer, (meth) acrylic acid/glycerin mono(meth)acrylate/benzyl(meth)acrylate/phenyl(meth)acrylate copolymer, (meth)acrylic acid/glycerin mono(meth)acrylate/benzyl(meth)acrylate/N-phenylmaleimide copolymer, (meth)acrylic acid/glycerin mono(meth)acrylate/benzyl(meth)acrylate/polystyrene macromonomer copolymer, (meth)acrylic acid/glycerin mono(meth)acrylate/benzyl(meth)acrylate/polymethylmethacrylate macromonomer copolymer, (meth)acrylic acid/mono[2-(meth)acryloyloxyethyl]succinate/glycerin mono(meth)acrylate/phenyl(meth)acrylate copolymer, (meth)acrylic acid/glycerin mono(meth)acrylate/phenyl(meth)acrylate/N-phenylmaleimide copolymer, (meth)acrylic acid/glycerin mono(meth)acrylate/phenyl(meth)acrylate/polystyrene macromonomer copolymer, (meth)acrylic acid/glycerin mono(meth)acrylate/phenyl (meth)acrylate/polymethylmethacrylate macromonomer copolymer, (meth)acrylic acid/mono[2-(meth)acryloyloxyethyl]succinate/glycerin mono(meth)acrylate/N-phenylmaleimide copolymer, (meth)acrylic acid/glycerin mono(meth) acrylate/N-phenylmaleimide/polystyrene macromonomer copolymer, (meth)acrylic acid/glycerin mono(meth)acrylate/N-phenylmaleimide/polymethyl methacrylate macromonomer copolymer, (meth)acrylic acid/styrene/benzyl(meth)acrylate/N-phenylmaleimide/polystyrene macromonomer copolymer, (meth)acrylic acid/styrene/benzyl(meth)acrylate/N-phenylmaleimide/polymethyl methacrylate macromonomer copolymer, (meth)acrylic acid/styrene/phenyl(meth)acrylate/N-phenylmaleimide/polystyrene macromonomer copolymer, (meth)acrylic acid/styrene/phenyl(meth)acrylate/N-phenylmaleimide/polymethyl methacrylate macromonomer copolymer, (meth)acrylic acid/glycerin mono (meth)acrylate/styrene/methyl(meth)acrylate/benzyl (meth)acrylate copolymer, (meth)acrylic acid/glycerin mono(meth)acrylate/styrene/methyl(meth)acrylate/phenyl (meth)acrylate copolymer, (meth)acrylic acid/glycerin mono(meth)acrylate/styrene/methyl(meth)acrylate/N-phenylmaleimide copolymer, (meth)acrylic acid/glycerin mono(meth)acrylate/styrene/2-hydroxyethyl(meth)acrylate/benzyl(meth)acrylate copolymer, (meth)acrylic acid/glycerin mono(meth)acrylate/styrene/2-hydroxyethyl(meth)acrylate/phenyl(meth)acrylate copolymer, (meth)acrylic acid/glycerin mono(meth)acrylate/styrene/2-hydroxyethyl(meth)acrylate/N-phenylmaleimide copolymer, (meth)acrylic acid/glycerin mono(meth)acrylate/styrene/benzyl(meth)acrylate/phenyl (meth)acrylate copolymer, (meth)acrylic acid/mono[2-(meth)acryloyloxyethyl]succinate/glycerin mono(meth)acrylate/styrene/benzyl (meth)acrylate copolymer, (meth)acrylic acid/glycerin mono (meth)acrylate/styrene/benzyl(meth)acrylate/N-phenylmaleimide copolymer, (meth)acrylic acid/glycerin mono(meth)acrylate/styrene/benzyl(meth)acrylate/polystyrene macromonomer copolymer, (meth)acrylic acid/glycerin mono(meth)acrylate/styrene/benzyl(meth)acrylate/polymethyl methacrylate macromonomer copolymer, (meth)acrylic acid/mono[2-(meth)acryloyloxyethyl]succinate/glycerin mono(meth)acrylate/styrene/phenyl(meth)acrylate copolymer, (meth)acrylic acid/glycerin mono(meth)acrylate/styrene/phenyl(meth)acrylate/N-phenylmaleimide copolymer, (meth)acrylic acid/glycerin mono(meth)acrylate/styrene/phenyl(meth)acrylate/polystyrene macromonomer copolymer, (meth)acrylic acid/glycerin mono(meth)acrylate/styrene/phenyl(meth)acrylate/polymethyl methacrylate macromonomer copolymer, (meth)acrylic acid/mono[2-(meth)acryloyloxyethyl]succinate/glycerin mono(meth)acrylate/styrene/N-phenylmaleimide copolymer, (meth)acrylic acid/glycerin mono(meth)acrylate/styrene/N-phenylmaleimide/polystyrene macromonomer copolymer, (meth)acrylic acid/glycerin mono(meth)acrylate/styrene/N-phenylmaleimide/polymethyl methacrylate macromonomer copolymer, (meth)acrylic acid/glycerin mono(meth)acrylate/methyl(meth)acrylate/2-hydroxyethyl (meth)acrylate/benzyl (meth)acrylate copolymer, (meth)acrylic acid/glycerin mono(meth)acrylate/methyl(meth)acrylate/2-hydroxyethyl (meth)acrylate/phenyl(meth)acrylate copolymer, (meth)acrylic acid/glycerin mono(meth)acrylate/methyl(meth)acrylate/2-hydroxyethyl (meth)acrylate/N-phenylmaleimide copolymer, (meth)acrylic acid/glycerin mono(meth)acrylate/methyl(meth)acrylate/benzyl(meth)acrylate/phenyl(meth)acrylate copolymer, (meth)acrylic acid/mono[2-(meth)acryloyloxyethyl]succinate/glycerin mono(meth)acrylate/methyl(meth)acrylate/benzyl(meth)acrylate copolymer, (meth)acrylic acid/glycerin mono(meth)acrylate/methyl(meth)acrylate/benzyl(meth)acrylate/N-phenylmaleimide copolymer, (meth)acrylic acid/glycerin mono(meth)acrylate/methyl(meth)acrylate/benzyl(meth)acrylate/polystyrene macromonomer copolymer, (meth)acrylic acid/glycerin mono(meth)acrylate/methyl(meth)acrylate/benzyl(meth)acrylate/polymethyl methacrylate macromonomer copolymer, (meth)acrylic acid/mono[2-(meth)acryloyloxyethyl]succinate/glycerin mono(meth)acrylate/methyl(meth)acrylate/phenyl (meth)acrylate copolymer, (meth)acrylic acid/glycerin mono(meth)acrylate/methyl(meth)acrylate/phenyl(meth)acrylate/N-phenylmaleimide copolymer, (meth)acrylic acid/glycerin mono(meth)acrylate/methyl(meth)acrylate/phenyl(meth)acrylate/polystyrene macromonomer copolymer, (meth)acrylic acid/glycerin mono(meth)acrylate/methyl(meth)acrylate/phenyl(meth)acrylate/polymethyl methacrylate macromonomer copolymer, (meth)acrylic acid/mono[2-(meth)acryloyloxyethyl]succinate/glycerin mono(meth)acrylate/methyl(meth)acrylate/N-phenylmaleimide copolymer, (meth)acrylic acid/glycerin mono(meth)acrylate/methyl (meth)acrylate/N-phenylmaleimide/polystyrene macromonomer copolymer, (meth)acrylic acid/glycerin mono(meth)acrylate/methyl(meth)acrylate/N-phenylmaleimide/polymethyl methacrylate macromonomer copolymer, (meth)acrylic acid/glycerin mono(meth)acrylate/2-hydroxyethyl(meth)acrylate/benzyl (meth)acrylate/phenyl(meth)acrylate copolymer, (meth)acrylic acid/mono[2-(meth)acryloyloxyethyl]succinate/glycerin mono(meth)acrylate/2-hydroxyethyl(meth)acrylate/benzyl (meth)acrylate copolymer, (meth)acrylic acid/glycerin mono(meth)acrylate/2-hydroxyethyl(meth)acrylate/benzyl (meth)acrylate/N-phenylmaleimide copolymer, (meth)acrylic acid/glycerin mono(meth)acrylate/2-hydroxyethyl(meth)acrylate/benzyl(meth)acrylate/polystyrene macromonomer copolymer, (meth)acrylic acid/glycerin mono(meth)acrylate/2-hydroxyethyl(meth)acrylate/benzyl (meth)acrylate/polymethyl methacrylate macromonomer copolymer, (meth)acrylic acid/mono[2-(meth)acryloyloxyethyl]succinate/glycerin mono (meth)acrylate/2-hydroxyethyl(meth)acrylate/phenyl (meth) acrylate copolymer, (meth)acrylic acid/glycerin mono(meth)acrylate/2-hydroxyethyl(meth)acrylate/phenyl (meth)acrylate/N-phenylmaleimide copolymer, (meth)acrylic acid/glycerin mono(meth)acrylate/2-hydroxyethyl(meth)acrylate/phenyl (meth)acrylate/polystyrene macromonomer copolymer, (meth)acrylic acid/glycerin mono(meth)acrylate/2-hydroxyethyl(meth)acrylate/phenyl (meth)acrylate/polymethyl methacrylate macromonomer copolymer, (meth)acrylic acid/mono[2-(meth)acryloyloxyethyl]succinate/glycerin mono(meth)acrylate/2-hydroxyethyl(meth)acrylate/N-phenylmaleimide copolymer, (meth)acrylic acid/glycerin mono(meth)acrylate/2-hydroxyethyl(meth)acrylate/N-phenylmaleimide/polystyrene macromonomer copolymer, (meth)acrylic acid/glycerin mono(meth)acrylate/2-hydroxyethyl(meth)acrylate/N-phenylmaleimide/polymethyl methacrylate macromonomer copolymer, (meth)acrylic acid/mono[2-(meth)acryloyloxyethyl]succinate/glycerin mono(meth)acrylate/benzyl(meth)acrylate/phenyl(meth)acrylate copolymer, (meth)acrylic acid/glycerin mono(meth)acrylate/benzyl(meth)acrylate/phenyl(meth)acrylate/N-phenylmaleimide copolymer, (meth)acrylic acid/glycerin mono(meth)acrylate/benzyl(meth)acrylate/phenyl(meth)acrylate/polystyrene macromonomer copolymer, (meth)acrylic acid/glycerin mono(meth)acrylate/benzyl(meth)acrylate/phenyl (meth)acrylate/polymethyl methacrylate macromonomer copolymer, (meth)acrylic acid/mono[2-(meth)acryloyloxyethyl]succinate/glycerin mono(meth)acrylate/benzyl(meth)acrylate/N-phenylmaleimide copolymer, (meth)acrylic acid/mono[2-(meth)acryloyloxyethyl]succinate/glycerin mono (meth)acrylate/benzyl(meth)acrylate/polystyrene macromonomer copolymer, (meth)acrylic acid/mono[2-(meth)acryloyloxyethyl]succinate/glycerin mono(meth)acrylate/benzyl(meth)acrylate/polymethyl methacrylate macromonomer copolymer, (meth)acrylic acid/glycerin mono(meth)acrylate/benzyl(meth)acrylate/N-phenylmaleimide/polystyrene macromonomer copolymer, (meth)acrylic acid/glycerin mono(meth)acrylate/benzyl(meth)acrylate/N-phenylmaleimide/polymethyl methacrylate macromonomer copolymer, (meth)acrylic acid/mono[2-(meth)acryloyloxyethyl]succinate/glycerin mono(meth)acrylate/phenyl(meth)acrylate/N-phenylmaleimide copolymer, (meth)acrylic acid/mono[2-(meth)acryloyloxyethyl]succinate/glycerin mono (meth)acrylate/phenyl(meth)acrylate/polystyrene macromonomer copolymer, (meth)acrylic acid/mono[2-(meth)acryloyloxyethyl]succinate/glycerin mono(meth)acrylate/phenyl(meth)acrylate/polymethyl methacrylate macromonomer copolymer, (meth)acrylic acid/glycerin mono(meth)acrylate/phenyl (meth)acrylate/N-phenylmaleimide/polystyrene macromonomer copolymer, (meth)acrylic acid/glycerin mono (meth)acrylate/phenyl(meth)acrylate/N-phenylmaleimide/polymethyl methacrylate macromonomer copolymer, (meth)acrylic acid/mono[2-(meth)acryloyloxyethyl]succinate/glycerin mono(meth)acrylate/N-phenylmaleimide/polystyrene macromonomer copolymer, (meth)acrylic acid/mono[2-(meth)acryloyloxyethyl]succinate/glycerin mono(meth)acrylate/N-phenylmaleimide/polymethyl methacrylate macromonomer copolymer, (meth)acrylic acid/mono[2-(meth)acryloyloxyethyl]succinate/styrene/benzyl(meth)acrylate/N-phenylmaleimide copolymer, (meth)acrylic acid/styrene/2-hydroxyethyl(meth)acrylate/benzyl(meth)acrylate/N-phenylmaleimide/polystyrene macromonomer copolymer, (meth)acrylic acid/styrene/2-hydroxyethyl (meth)acrylate/benzyl(meth) acrylate/N-phenylmaleimide/polymethyl methacrylate macromonomer copolymer, (meth)acrylic acid/styrene/2-hydroxyethyl(meth)acrylate/phenyl (meth) acrylate/N-phenylmaleimide/polystyrene macromonomer copolymer, or (meth)acrylic acid/styrene/2-hydroxyethyl(meth)acrylate/phenyl(meth) acrylate/N-phenylmaleimide/polymethyl methacrylate macromonomer copolymer.

Alternatively, an acrylic copolymer having an ethylenically unsaturated group in the side chain thereof obtained by reacting part of carboxyl groups of the acrylic copolymer mentioned above with epoxy groups of a compound having an epoxy group and an ethylenically unsaturated group in one molecule, such as glycidyl(meth)acrylate, 3,4-epoxycyclohexylmethyl(meth)acrylate, 4-(2,3-epoxypropyl)butyl (meth)acrylate, or allyl glycidyl ether, or by reacting part or all of hydroxyl groups of the acrylic copolymer mentioned above with isocyanate groups of a compound having an isocyanate group and an ethylenically unsaturated group in one molecule, such as 2-methacryloyloxyethyl isocyanate, may also be used. Such an ethylenically unsaturated bond-containing compound has polymerization reactivity in itself and therefore can be used as a photocurable resin.

The copolymerization ratio of the carboxyl group-containing ethylenically unsaturated monomer in the carboxyl group-containing copolymer is usually in the range of 5 to 50 wt %, preferably in the range of 10 to 40 wt %. If the copolymerization ratio of the carboxyl group-containing ethylenically unsaturated monomer is less than 5 wt %, the solubility of an obtained coating film in an alkali developer is lowered so that it becomes difficult to perform patterning. On the other hand, if the copolymerization ratio of the carboxyl group-containing ethylenically unsaturated monomer exceeds 50 wt %, dropping of a formed pattern from a substrate or roughening of a pattern surface tends to occur during development with an alkali developer.

The molecular weight of the carboxyl group-containing copolymer is preferably in the range of 1,000 to 500,000, more preferably in the range of 3,000 to 200,000. If the molecular weight of the carboxyl group-containing copolymer is less than 1,000, the binding function of the cured binder system is significantly reduced. On the other hand, if the molecular weight of the carboxyl group-containing copolymer exceeds 500,000, there is a case where it is difficult to perform patterning by development with an alkali developer.

A pre-polymer contained in a UV curable resin composition conventionally used in various fields such as ink, coating materials, and adhesives, may also be used in the present invention. Examples of the pre-polymer conventionally known include radical polymerization-type pre-polymers, cationic polymerization-type pre-polymers, and thiol-ene addition-type pre-polymers, and any one of these pre-polymers may be used.

Among them, radical polymerization-type pre-polymers are easily commercially available. Examples of the radical polymerization-type pre-polymers include ester acrylates, ether acrylates, urethane acrylates, epoxy acrylates, amino resin acrylates, acrylic resin acrylates, and unsaturated polyesters.

(Carboxyl Group-Containing Epoxy(Meth)Acrylate Resin)

The carboxyl group-containing epoxy(meth)acrylate resin is not particularly limited, but an epoxy(meth)acrylate compound obtained by reacting a reaction product between an epoxy compound and an unsaturated group-containing monocarboxylic acid with an acid anhydride is suitable.

The epoxy compound is not particularly limited, and examples of the epoxy compound include bisphenol A type epoxy compounds, bisphenol F type epoxy compounds, bisphenol S type epoxy compounds, phenol novolac type epoxy compounds, cresol novolac type epoxy compounds, aliphatic epoxy compounds, and bisphenol fluorene type epoxy compounds. These epoxy compounds can be used singly or in combination of two or more of them.

Examples of the unsaturated group-containing monocarboxylic acid include (meth)acrylic acid, 2-(meth)acryloyloxyethyl succinic acid, 2-(meth)acryloyloxyethyl phthalic acid, (meth)acryloyloxyethyl hexahydrophthalic acid, (meth)acrylic acid dimer, β-furfuryl acrylic acid, β-styryl acrylic acid, cinnamic acid, crotonic acid, and α-cyano cinnamic acid. In addition, a half-ester compound obtained by reaction between a hydroxyl group-containing acrylate and a saturated or unsaturated dibasic acid anhydride and a half-ester compound obtained by reaction between an unsaturated group-containing monoglycidyl ether and a saturated or unsaturated dibasic acid anhydride can also be exemplified. These unsaturated group-containing monocarboxylic acid can be used singly or in combination of two or more of them.

Examples of the acid anhydride include: dibasic acid anhydrides such as maleic anhydride, succinic anhydride, itaconic anhydride, phthalic anhydride, tetrahydrophthalic anhydride, hexahydrophthalic anhydride, methylhexahydrophthalic anhydride, endomethylenetetrahydrophthalic anhydride, methylendomethylenetetrahydrophthalic anhydride, chlorendic anhydride, and methyltetrahydrophthalic anhydride; aromatic polyvalent carboxylic anhydrides such as trimellitic anhydride, pyromellitic anhydride, benzophenonetetracarboxylic dianhydride, biphenyltetracarboxylic dianhydride, and biphenylethertetracarboxylic acid; polyvalent carboxylic anhydride derivatives such as 5-(2,5-dioxotetrahydrofuryl)-3-methyl-3-cyclohexene-1,2-dicarboxylic anhydride and endobicyclo-[2,2,1]-hepto-5-ene-2,3-dicarboxylic anhydride. These acid anhydrides can be used singly or in combination of two or more of them.

The molecular weight of the thus obtained carboxyl group-containing epoxy(meth)acrylate compound is not particularly limited, but is preferably in the range of 1,000 to 40,000, more preferably in the range of 2,000 to 5,000.

(B) Polyfunctional Monomer

Examples of the polyfunctional monomer to be used in the present invention include: di(meth)acrylates of alkylene glycols such as ethylene glycol and propylene glycol; di(meth)acrylates of polyalkylene glycols such as polyethylene glycol and polypropylene glycol; poly(meth)acrylates of tri- or higher-valent alcohols such as glycerin, trimethylolpropane, pentaerythritol, and dipentaerythritol and dicarboxylic acid-modified products thereof; oligo (meth)acrylates of polyesters, epoxy resins, urethane resins, alkyd resins, silicone resins, and spirane resins; di(meth)acrylates of both terminal-hydroxylated polymers such as poly-1,3-butadiene having hydroxyl groups at both terminals, polyisoprene having hydroxyl groups at both terminals, and polycaprolactone having hydroxyl groups at both terminals; and tris(2-(meth)acryloyloxyethyl)phosphate.

Among these polyfunctional monomers, poly(meth)acrylates of tri- or higher-valent alcohols and dicarboxylic acid-modified products thereof are preferred. More specifically, trimethylolpropane tri(meth)acrylate, pentaerythritol tri (meth)acrylate, succinic acid-modified pentaerythritol tri (meth)acrylate, pentaerythritol tetra(meth)acrylate, dipentaerythritol tetra(meth)acrylate, and dipentaerythritol hexa (meth)acrylate are preferred. These polyfunctional monomers can be used singly or in combination of two or more of them.

The amount of the polyfunctional monomer to be used in the present invention is usually in the range of 5 to 500 parts by weight, preferably in the range of 20 to 300 parts by weight per 100 parts by weight of the alkali soluble resin. If the amount of the polyfunctional monomer is less than 5 parts by weight, the strength and surface smoothness of a formed pattern tends to be lowered. On the other hand, if the amount of the polyfunctional monomer exceeds 500 parts by weight, alkali-development tends to become difficult or soil or a residual film tends to remain in a region on a substrate other than a part where a pattern is formed.

In the present invention, part of the polyfunctaionl monomer may be replaced with a monofunctional monomer. Examples of such a monofunctional monomer include the carboxyl group-containing unsaturated monomers constituting the alkali-soluble resins and other unsaturated monomers, 2-hydroxy-3-phenoxypropyl acrylate, and 2-hydroxy-3-phenoxypropyl methacryalte. Among these monofunctional polymers, mono(2-acryloyloxyethyl)succinate, mono(2-methacryloyloxyethyl)succinate, ω-carboxypolycaprolactone monoacrylate, ω-carboxypolycaprolactone monomethacrylate methoxytriethyleneglycol acrylate, methoxytriethyleneglycol methacrylate, methoxydipropyleneglycol acrylate, methoxydipropyleneglycol methacrylate, 2-hydroxy-3-phenoxypropyl acrylate, and 2-hydroxy-3-phenoxypropyl methacrylate are preferred. These monofunctional monomers can be used singly or in combination of two or more of them. The amount of the monofunctional monomer to be used is usually 90 wt % or less, preferably 50 wt % or less with respect to the total amount of the polyfunctional monomer and the monofunctional monomer.

(C) Photopolymerization Initiator and Sensitizer

The negative-type photosensitive binder system usually contains a photopolymerization initiator having activity against the wavelength of light from a light source used. The photopolymerization initiator is not particularly limited and is appropriately selected in consideration of the reaction type (e.g., radical polymerization, cationic polymerization) of the photopolymerizable polymer and the photopolymerizalbe monomer used or the kinds of other materials used.

In a case where the binder system is photoradical polymerizable, one or two or more compounds selected from the group consisting of compounds represented by the following formula (1) are preferably used as the photopolymerization initiator.

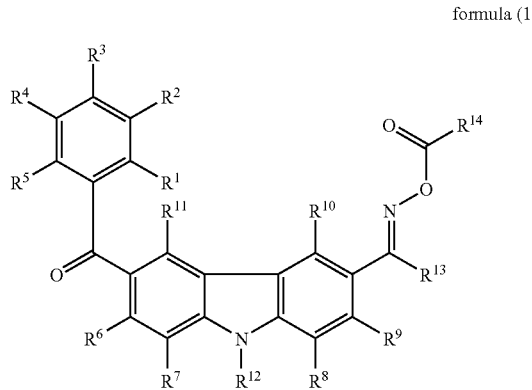

formula (1)

wherein $R^1$ to $R^{14}$ are each independently hydrogen, a hydroxyl group, an amino group, a carboxyl group, a halogen, a ketone group, an aromatic group, or an aliphatic group, wherein the aromatic group and the aliphatic group may have a structure selected from among a branched structure and an alicyclic structure, and may contain one or more kinds of bonds selected from among an ether bond, an ester bond, an amino bond, an amide bond, a thioether bond, and an unsaturated bond at any position other than the terminal thereof, and may contain one or more kinds of groups selected from among a hydroxyl group, an amino group, a carboxyl group, a halogen, a carbonyl group, and an aromatic group at the terminal thereof.

By introducing a halogen as a substituent into any one or two or more positions of $R^1$ to $R^{14}$, it is possible to improve the cleavage reactivity of the compound represented by the formula (1) during light irradiation, thereby further improving photosensitivity. Examples of the halogen include Br and Cl.

By introducing a hydroxyl group, an amino group, a carboxyl group, a ketone group, an aromatic group or an aliphatic group as a substituent into any one or two or more positions of $R^1$ to $R^{14}$, it is possible to change the absorption spectrum of the compound represented by the formula (1) and therefore to control the absorption wavelength characteristics of the compound represented by the formula (1) in accordance with a irradiation wavelength. Examples of the ketone group include those containing an alkyl group having 1 to 10 carbon atoms or an aromatic group having 5 to 14 carbon atoms. These alkyl groups and aromatic groups may have a substituent group and may have a structure other than a hydrocarbon at any position other than the terminal thereof.

As the aromatic group, one having 5 to 20 carbon atoms is preferred, and examples of such an aromatic group include not only aromatic hydrocarbon groups such as a phenyl group and a naphthyl group but also groups having a heteroatom other than a hydrocarbon, such as a pyridyl group.

As the aliphatic group, one having 1 to 10 carbon atoms is preferred, and examples of such an aliphatic group include not only aliphatic hydrocarbon groups such as alkyl groups (e.g., methyl group, an ethyl group, an n-propyl group, an isopropyl group, an n-butyl group, an isobutyl group, a tert-butyl group, an n-pentyl group, and an n-hexyl group) and unsaturated hydrocarbon groups such as alkenyl groups but also groups containing a heteroatom other than a hydrocarbon.

Examples of the photopolymerization initiator represented by the formula (1) include: ethanone 1-[9-ethyl-6-(2-methylbenzoyl)-9H -carbazol-3-yl]-1-(O-acetyloxime), ethanone 1-[9-ethyl-6-(4-methylbenzoyl)-9H -carbazol-3-yl]-1-(O-acetyloxime), ethanone 1-[9-ethyl-6-(6-methylbenzoyl)-9H-carbazol-3-yl]-1-(O-acetyloxime), ethanone 1-[9-ethyl-6-(2, 4-dimethylbenzoyl)-9H-carbazol-3-yl]-1-(O -acetyloxime), ethanone 1-[9-ethyl-6-(2,6-dimethylbenzoyl)-9H -carbazol-3-yl]-1-(O-acetyloxime), ethanone 1-[9-ethyl-6-(2,4,6-trimethylbenzoyl)-9H-carbazol-3-yl-1-(O-acetyloxime), ethanone 1-[9-ethyl-6-(2-ethyl benzoyl )-9H-carbazol-3-yl]-1-(O-acetyloxime), ethanone 1-[9-ethyl-6-(4-ethylbenzoyl)-9H-carbazol-3-yl]-1-(O -acetyloxime), ethanone 1-[9-ethyl-6-(6-ethylbenzoyl)-9H -carbazol-3-yl]-1-(O-acetyloxime), ethanone 1-[9-ethyl-6-(2,4-diethylbenzoyl)-9H -carbazol-3-yl]-1-(O-acetyloxime), ethanone 1-[9-ethyl-6-(2,6-diethylbenzoyl)-9H-carbazol-3-yl]-1-(O-acetyloxime), ethanone 1-[9-ethyl-6-(2,4, 6-triethylbenzoyl)-9H-carbazol-3-yl]-1 -(O-acetyloxime), ethanone 1-[9-methyl-6-(2-methylbenzoyl)-9H -carbazol-3-yl]-1-(O-acetyloxime), ethanone 1-[9-methyl-6-(4-methylbenzoyl)-9H-carbazol-3-yl]-1-(O-acetyloxime), ethanone 1-[9-methyl-6-(6-methylbenzoyl)-9H-carbazol-3-yl]-1-(O-acetyloxime), ethanone 1-[9-methyl-6-(2,4-dimethylbenzoyl)-9H-carbazol-3-yl]-1-(O-acetyloxime), ethanone 1-[9-methyl-6-(2,6-dimethylbenzoyl)-9H -carbazol-3-yl]-1-(O-acetyloxime), ethanone 1-[9-methyl-6-(2,4,6-trimethylbenzoyl)-9H-carbazol-3-yl]-1-(O-acetyloxime), ethanone 1-[9-methyl-6-(2-ethylbenzoyl )-9H-carbazol-3-yl]-1-(O -acetyloxime), ethanone 1-[9-methyl-6-(4-ethylbenzoyl)-9H- carbazol -3-yl]-1-(O-acetyloxime), ethanone 1-[9-methyl-6-(6-ethylbenzoyl)-9H -carbazol-3-yl]-1-(O-acetyloxime), ethanone 1-[9-methyl-6-(2,4-diethylbenzoyl)-9H-carbazol-3-yl]-1-(O-acetyloxime), ethanone 1-[9-methyl-6-(2,6-diethylbenzoyl)-

9H-carbazol-3-yl]-1-(O-acetyloxime), ethanone 1-[9-methyl-6-(2,4,6-triethylbenzoyl)-9H-carbazol-3-yl]-1-(O-acetyloxime), ethanone 1-[9-propyl-6-(2-methylbenzoyl)-9H-carbazol-3-yl]-1-(O-acetyloxime), ethanone 1-[9-propyl-6-(4-methylbenzoyl)-9H-carbazol-3-yl]-1-(O-acetyloxime), ethanone 1-[9-propyl-6-(6-methylbenzoyl)-9H-carbazol-3-yl]-1-(O-acetyloxime), ethanone 1-[9-propyl-6-(2,4-dimethylbenzoyl)-9H-carbazol-3-yl]-1-(O-acetyloxime), ethanone 1-[9-propyl-6-(2,6-dimethylbenzoyl)-9H-carbazol-3-yl]-1-(O-acetyloxime), ethanone 1-[9-propyl-6-(2,4,6-trimethylbenzoyl)-9H-carbazol-3-yl]-1-(O-acetyloxime), ethanone 1-[9-propyl-6-(2-ethylbenzoyl)-9H-carbazol-3-yl]-1-(O-acetyloxime), ethanone 1-[9-propyl-6-(4-ethylbenzoyl)-9H-carbazol-3-yl]-1-(O-acetyloxime), ethanone 1-[9-propyl-6-(6-ethylbenzoyl)-9H-carbazol-3-yl]-1-(O-acetyloxime), ethanone 1-[9-propyl-6-(2,4-diethylbenzoyl)-9H-carbazol-3-yl]-1-(O-acetyloxime), ethanone 1-[9-propyl-6-(2,6-diethylbenzoyl)-9H-carbazol-3-yl]-1-(O-acetyloxime), ethanone 1-[9-propyl-6-(2,4,6-triethylbenzoyl)-9H-carbazol-3-yl]-1-(O-acetyloxime), ethanone 1-[9-ethyl-6-(2-methylbenzoyl)-9H-carbazol-3-yl]-1-[O-(1-propanone)oxime], ethanone 1-[9-ethyl-6-(4-methylbenzoyl)-9H-carbazol-3-yl]-1-[O-(1-propanone)oxime], ethanone 1-[9-ethyl-6-(6-methylbenzoyl)-9H-carbazol-3-yl]-1-[O-(1-propanone)oxime], ethanone 1-[9-ethyl-6-(2,4-dimethylbenzoyl)-9H-carbazol-3-yl]-1-[O-(1-propanone)oxime], ethanone 1-[9-ethyl-6-(2,6-dimethylbenzoyl)-9H-carbazol-3-yl]-1-[O-(1-propanone)oxime], ethanone 1-[9-ethyl-6-(2,4,6-trimethylbenzoyl)-9H-carbazol-3-yl]-1-[O-(1-propanone)oxime], ethanone 1-[9-ethyl-6-(2-ethylbenzoyl)-9H-carbazol-3-yl]-1-[O-(1-propanone)oxime], ethanone 1-[9-ethyl-6-(4-ethylbenzoyl)-9H-carbazol-3-yl]-1-[O-(1-propanone)oxime], ethanone 1-[9-ethyl-6-(6-ethylbenzoyl)-9H-carbazol-3-yl]-1-[O-(1-propanone)oxime], ethanone 1-[9-ethyl-6-(2,4-diethylbenzoyl)-9H-carbazol-3-yl]-1-[O-(1-propanone)oxime], ethanone 1-[9-ethyl-6-(2,6-diethylbenzoyl)-9H-carbazol-3-yl]-1-[O-(1-propanone)oxime], ethanone 1-[9-ethyl-6-(2,4,6-triethylbenzoyl)-9H-carbazol-3-yl]-1-[O-(1-propanone)oxime], ethanone 1-[9-methyl-6-(2-methylbenzoyl)-9H-carbazol-3-yl]-1-[O-(1-propanone)oxime], ethanone 1-[9-methyl-6-(4-methylbenzoyl)-9H-carbazol-3-yl]-1-[O-(1-propanone)oxime], ethanone 1-[9-methyl-6-(6-methylbenzoyl)-9H-carbazol-3-yl]-1-[O-(1-propanone)oxime], ethanone 1-[9-methyl-6-(2,4-dimethylbenzoyl)-9H-carbazol-3-yl]-1-[O-(1-propanone)oxime], ethanone 1-[9-methyl-6-(2,6-dimethylbenzoyl)-9H-carbazol-3-yl]-1-[O-(1-propanone)oxime], ethanone 1-[9-methyl-6-(2,4,6-trimethylbenzoyl)-9H-carbazol-3-yl]-1-[O-(1-propanone)oxime], ethanone 1-[9-methyl-6-(2-ethylbenzoyl)-9H-carbazol-3-yl]-1-[O-(1-propanone)oxime], ethanone 1-[9-methyl-6-(4-ethylbenzoyl)-9H-carbazol-3-yl]-1-[O-(1-propanone)oxime], ethanone 1-[]-methyl-6-(6-ethylbenzoyl)-9H-carbazol-3-yl]-1-[O-(1-propanone)oxime], ethanone 1-[9-methyl-6-(2,4-diethylbenzoyl)-9H-carbazol-3ly]-1-[O-(1-propanone)oxime], ethanone 1-[9-methyl-6-(2,6-diethylbenzoyl)-9H-carbazol-3-yl]-1-[O-(1-propanone)oxime], ethanone 1-[9-methyl-6-(2,4,6-triethylbenzoyl)-9H-carbazol-3-yl]-1-[O-(1-propanone)oxime], ethanone 1-[9-propyl-6-(2-methylbenzoyl)-9H-carbazol-3-yl]-1-[O-(1-propanone)oxime], ethanone 1-[9-propyl-6-(4-methylbenzoyl)-9H-carbazol-3-yl]-1-[O-(1-propanone)oxime], ethanone 1-[9-propyl-6-(6-methylbenzoyl)-9H-carbazol-3-yl]-1-[O-(1-propanone)oxime], ethanone 1-[9-propyl-6-(2,4-dimethylbenzoyl)-9H-carbazol-3-yl]-1-[O-(1-propanone)oxime], ethanone 1-[9-propyl-6-(2,6-dimethylbenzoyl)-9H-carbazol-3-yl]-1-[O-(1-propanone)oxime], ethanone 1-[9-propyl-6-(2,4,6-trimethylbenzoyl)-9H-carbazol-3-yl]-1-[O-(1-propanone)oxime], ethanone 1-[9-propyl-6-(2-ethylbenzoyl)-9H-carbazol-3-yl]-1-[O-(1-propanone)oxime], ethanone 1-[9-propyl-6-(4-ethylbenzoyl)-9H-carbazol-3-yl]-1-[O-(1-propanone)oxime], ethanone 1-[9-propyl-6-(6-ethylbenzoyl)-9H-carbazol-3-yl]-1-[O-(1-propanone)oxime], ethanone 1-[9-propyl-6-(2,4-diethylbenzoyl)-9H-carbazol-3-yl]-1-[O-(1-propanone)oxime], ethanone 1-[9-propyl-6-(2,6-diethylbenzoyl)-9H-carbazol-3-yl]-1-[O-(1-propanone)oxime], ethanone 1-[9-propyl-6-(2,4,6-triethylbenzoyl)-9H-carbazol-3-yl]-1-[O-(1-propanone)oxime], ethanone 1-[9-ethyl-6-(2-methylbenzoyl)-9H-carbazol-3-yl]-1-[O-(1-butanone)oxime], ethanone 1-[9-ethyl-6-(4-methylbenzoyl)-9H-carbazol-3-yl]-1-[O-(1-butanone)oxime], ethanone 1-[9-ethyl-6-(6-methylbenzoyl)-9H-carbazol-3-yl]-1-[O-(1-butanone)oxime], ethanone 1-[9-ethyl-6-(2,4-dimethylbenzoyl)-9H-carbazol-3-yl]-1-[O-(1-butanone)oxime], ethanone 1-[9-ethyl-6-(2,6-dimethylbenzoyl)-9H-carbazol-3-yl]-1-[O-(1-butanone)oxime], ethanone 1-[9-ethyl-6-(2,4,6-trimethylbenzoyl)-9H-carbazol-3-yl]-1-[O-(1-butanone)oxime], ethanone 1-[9-ethyl-6-(2-ethylbenzoyl)-9H-carbazol-3-yl]-1-[O-(1-butanone)oxime], ethanone 1-[9-ethyl-6-(4-ethylbenzoyl)-9H-carbazol-3-yl]-1-[O-(1-butanone)oxime], ethanone 1-[9-ethyl-6-(6-ethylbenzoyl)-9H-carbazol-3-yl]-1-[O-(1-butanone)oxime], ethanone 1-[9-ethyl-6-(2,4-diethylbenzoyl)-9H-carbazol-3-yl]-1-[O-(1-butanone)oxime], ethanone 1-[9-ethyl-6-(2,6-diethylbenzoyl)-9H-carbazol-3-yl]-1-[O-(1-butanone)oxime], ethanone 1-[9-ethyl-6-(2,4,6-triethylbenzoyl)-9H-carbazol-3-yl]-1-[O-(1-butanone)oxime], ethanone 1-[9-methyl-6-(2-methylbenzoyl)-9H-carbazol-3-yl]-1-[O-(1-butanone)oxime], ethanone 1-[9-methyl-6-(4-methylbenzoyl)-9H-carbazol-3-yl]-1-[O-(1-butanone)oxime], ethanone 1-[9-methyl-6-(6-methylbenzoyl)-9H-carbazol-3-yl]-1-[O-(1-butanone)oxime], ethanone 1-[9-methyl-6-(2,4-dimethylbenzoyl)-9H-carbazol-3-yl]-1-[O-(1-butanone)oxime], ethanone 1-[9-methyl-6-(2,6-dimethylbenzoyl)-9H-carbazol-3-yl]-1-[O-(1-butanone)oxime], ethanone 1-[9-methyl-6-(2,4,6-trimethylbenzoyl)-9H-carbazol-3-yl]-1-[O-(1-butanone)oxime], ethanone 1-[9-methyl-6-(2-ethylbenzoyl)-9H-carbazol-3-yl]-1-[O-(1-butanone)oxime], ethanone 1-[9-methyl-6-(4-ethylbenzoyl)-9H-carbazol-3-yl]-1-[O-(1-butanone)oxime], ethanone 1-[9-methyl-6-(6-ethylbenzoyl)-9H-carbazol-3-yl]-1-[O-(1-butanone)oxime], ethanone 1-[9-methyl-6-(2,4-diethylbenzoyl)-9H-carbazol-3-yl]-1-[O-(1-butanone)oxime], ethanone 1-[9-methyl-6-(2,6-diethylbenzoyl)-9H-carbazol-3-yl]-1-[O-(1-butanone)oxime], ethanone 1-[9-methyl-6-(2,4,6-triethylbenzoyl)-9H-carbazol-3-yl]-1-[O-(1-butanone)oxime], ethanone 1-[9-propyl-6-(2-methylbenzoyl)-9H-carbazol-3-yl]-1-[O-(1-butanone)oxime], ethanone 1-[9-propyl-6-(4-methylbenzoyl)-9H-carbazol-3-yl]-1-[O-(1-butanone)oxime], ethanone 1-[9-propyl-6-(6-methylbenzoyl)-9H-carbazol-3-yl]-1-[O-(1-butanone)oxime], ethanone 1-[9-propyl-6-(2,4-dimethylbenzoyl)-9H-carbazol-3-yl]-1-[O-(1-butanone)oxime], ethanone, 1-[9-propyl-6-(2,6-dimethylbenzoyl)-9H-carbazol-3-yl]-1-[O-(1-butanone)oxime], ethanone 1-[9-propyl-6-(2,4,6-trimethylbenzoyl)-9H-carbazol-3-yl]-1-[O-(1-butanone)oxime]; ethanone 1-[9-propyl-6-(2-ethylbenzoyl)-9H-carbazol-3-yl]-1-[O-(1-butanone)oxime], ethanone 1-[9-propyl-6-(4-ethylbenzoyl)-9H-carbazol-3-yl]-1-[O-(1-butanone)oxime], ethanone 1-[9-propyl-6-(6-ethylbenzoyl)-9H-carbazol-3-yl]-1-[O-(1-butanone)oxime], ethanone 1-[9-propyl-6-(2,4-diethylbenzoyl)-9H-carbazol-3-yl]-1-[O-(1-butanone)oxime], ethanone 1-[9-propyl-6-(2,6-diethylbenzoyl)-9H-carbazol-3-yl]-1-[O-(1-butanone)oxime], ethanone 1-[9-propyl-6-(2,4,6-triethylbenzoyl)-9H-carbazol-3-yl]-1-[O-(1-butanone)oxime], ethanone 1-[9-ethyl-6-(2-methylbenzoyl)-9H-carbazol-3-yl]-1-[O-(1-pentanone)oxime], ethanone 1-[9-ethyl-6-(4-methylbenzoyl)-9H-carbazol-3-yl]-1-[O-(1-pentanone)oxime], ethanone 1-[9-ethyl-6-(6-methylbenzoyl)-9H-carbazol-3-yl]-1-[O-(1-pentanone)oxime], ethanone 1-[9-ethyl-6-(2,4-dimethylbenzoyl)-9H-carbazol-3-yl]-1-[O-(1-pentanone)oxime], ethanone 1-[9-ethyl-6-(2,6-dimethylbenzoyl)-9H-carbazol-3-yl]-1-[O-(1-pentanone)oxime], ethanone 1-[9-ethyl-6-(2,4,6-trimethylbenzoyl)-9H-carbazol-3-yl]-1-[O-(1-pentanone)oxime], ethanone 1-[9-ethyl-6-(2-ethylbenzoyl)-9H-carbazol-3-yl]-1-[O-(1-pentanone)oxime], ethanone 1-[9-ethyl-6-(4-ethylbenzoyl)-9H-carbazol-3-yl]-1-[O-(1-pentanone)oxime], ethanone 1-[9-ethyl-6-(6-ethylbenzoyl)-9H-carbazol-3-yl]-1-[O-(1-pentanone)oxime], ethanone 1-[9-ethyl-6-(2,4-diethylbenzoyl)-9H-carbazol-3-yl]-1-[O-(1-pentanone)oxime], ethanone 1-[9-ethyl-6-(2,6-diethylbenzoyl)-9H-carbazol-3-yl]-1-[O-(1-pentanone)oxime], ethanone 1-[9-ethyl-6-(2,4,6-triethylbenzoyl)-9H-carbazol-3-yl]-1-[O-(1-pentanone)oxime], ethanone 1-[9-methyl-6-(2-methylbenzoyl)-9H-carbazol-3-yl]-1-[O-(1-pentanone)oxime], ethanone 1-[9-methyl-6-(4-methylbenzoyl)-9H-carbazol-3-yl]-1-[O-(1-pentanone)oxime], ethanone 1-[9-methyl-6-(6-methylbenzoyl)-9H-carbazol-3-yl]-1-[O-(1-pentanone)oxime], ethanone 1-[9-methyl-6-(2,4-dimethylbenzoyl)-9H-carbazol-3-yl]-1-[O-(1-pentanone)oxime], ethanone 1-[9-methyl-6-(2,6-dimethylbenzoyl)-9H-carbazol-3-yl]-1-[O-(1-pentanone)oxime], ethanone 1-[9-methyl-6-(2,4,6-trimethylbenzoyl)-9H-carbazol-3-yl]-1-[O-(1-pentanone)oxime], ethanone 1-[9-methyl-6-(2-ethylbenzoyl)-9H-carbazol-3-yl]-1-[O-(1-pentanone)oxime], ethanone 1-[9-methyl-6-(4-ethylbenzoyl)-9H-carbazol-3-yl]-1-[O-(1-pentanone)oxime], ethanone 1-[9-methyl-6-(6-ethylbenzoyl)-9H-carbazol-3-yl]-1-[O-(1-pentanone)oxime], ethanone 1-[9-methyl-6-(2,4-diethylbenzoyl)-9H-carbazol-3-yl]-1-[O-(1-pentanone)oxime], ethanone 1-[9-methyl-6-(2,6-diethylbenzoyl)-9H-carbazol-3-yl]-1-[O-(1-pentanone)oxime], ethanone 1-[9-methyl-6-(2,4,6-triethylbenzoyl)-9H-carbazol-3-yl]-1-[O-(1-pentanone)oxime], ethanone 1-[9-propyl-6-(2-methylbenzoyl)-9H-carbazol-3-yl]-1-[O-(1-pentanone)oxime], ethanone 1-[9-propyl-6-(4-methylbenzoyl)-9H-carbazol-3-yl]-1-[O-(1-pentanone)oxime], ethanone 1-[9-propyl-6-(6-methylbenzoyl)-9H-carbazol-3-yl]-1-[O-(1-pentanone)oxime], ethanone 1-[9-propyl-6-(2,4-dimethylbenzoyl)-9H-carbazol-3-yl]-1-[O-(1-pentanone)oxime], ethanone 1-[9-propyl-6-(2,6-dimethylbenzoyl)-9H-carbazol-3-yl]-1-[O-(1-pentanone)oxime], ethanone 1-[9-propyl-6-(2,4,6-trimethylbenzoyl)-9H-carbazol-3-yt]-1-[O-(1-pentanone)oxime], ethanone 1-[9-propyl-6-(2-ethylbenzoyl)-9H-carbazol-3-yl]-1-[O-(1-pentanone)oxime], ethanone 1-[9-propyl-6-(4-ethylbenzoyl)-9H-carbazol-3-yl]-1-[O-(1-pentanone)oxime], ethanone 1-[9-propyl-6-(6-ethylbenzoyl)-9H-carbazol-3-yl]-1-[O-(1-pentanone)oxime], ethanone 1-[9-propyl-6-(2,4-diethylbenzoyl)-9H-carbazol-3-yl]-1-[O-(1-pentanone)oxime], ethanone 1-[9-propyl-6-(2,6-diethylbenzoyl)-9H-carbazol-3-yl]-1-[O-(1-pentanone)oxime], ethanone 1-[9-propyl-6-(2,4,6-triethylbenzoyl)-9H-carbazol-3-yl]-1-[O-(1-pentanone)oxime], propanone 1-[9-ethyl-6-(2-methylbenzoyl)-9H-carbazol-3-yl]-1-(O-acetyloxime), propanone 1-[9-ethyl-6-(4-methylbenzoyl)-9H-carbazol-3-yl]-1-(O-acetyloxime), propanone 1-[9-ethyl-6-(6-methylbenzoyl)-9H-carbazol-3-yl]-1-(O-acetyloxime), propanone 1-[9-ethyl-6-(2,4-dimethylbenzoyl)-9H-carbazol-3-yl]-1-(O-acetyloxime), propanone 1-[9-ethyl-6-(2,6-dimethylbenzoyl)-9H-carbazol-3-yl]-1-(O-acetyloxime), propanone 1-[9-ethyl-6-(2,4,6-trimethylbenzoyl)-9H-carbazol-3-yl]-1-(O-acetyloxime), propanone 1-[9-ethyl-6-(2-ethylbenzoyl)-9H-carbazol-3-yl]-1-(O-acetyloxime), propanone 1-[9-ethyl-6-(4-ethylbenzoyl)-9H-carbazol-3-yl]-1-(O-acetyloxime), propanone 1-[9-ethyl-6-(6-ethylbenzoyl)-9H-carbazol-3-yl]-1-(O-acetyloxime), propanone 1-[9-ethyl-6-(2,4-diethylbenzoyl)-9H-carbazol-3-yl]-1-(O-acetyloxime), propanone 1-[9-ethyl-6-(2,6-diethylbenzoyl)-9H-carbazol-3-yl]-1-(O-acetyloxime), propanone 1-[9-ethyl-6-(2,4,6-triethylbenzoyl)-9H-carbazol-3-yl]-1-(O-acetyloxime), propanone 1-[9-methyl-6-(2-methylbenzoyl)-9H-carbazol-3-yl]-1-(O-acetyloxime), propanone 1-[9-methyl-6-(4-methylbenzoyl)-9H-carbazol-3-yl]-1-(O-acetyloxime), propanone 1-[9-methyl-6-(6-methylbenzoyl)-9H-carbazol-3-yl]-1-(O-acetyloxime), propanone 1-[9-methyl-6-(2,4-dimethylbenzoyl)-9H-carbazol-3-yl]-1-(O-acetyloxime), propanone 1-[9-methyl-6-(2,6-dimethylbenzoyl)-9H-carbazol-3-yl]-1-(O-acetyloxime), propanone 1-[9-methyl-6-(2,4,6-trimethylbenzoyl)-9H-carbazol-3-yl]-1-(O-acetyloxime), propanone 1-[9-methyl-6-(2-ethylbenzoyl)-9H-carbazol-3-yl]-1-(O-acetyloxime), propanone 1-[9-methyl-6-(4-ethylbenzoyl)-9H-carbazol-3-yl]-1-(O-acetyloxime), propanone 1-[9-methyl-6-(6-ethylbenzoyl)-9H-carbazol-3-yl]-1-(O-acetyloxime), propanone 1-[9-methyl-6-(2,4-diethylbenzoyl)-9H-carbazol-3-yl]-1-(O-acetyloxime), propanone 1-[9-methyl-6-(2,6-diethylbenzoyl)-9H-carbazol-3-yl]-1-(O-acetyloxime), propanone 1-[9-methyl-6-(2,4,6-triethylbenzoyl)-9H-carbazol-3-yl]-1-(O-acetyloxime), propanone 1-[9-propyl-6-(2-methylbenzoyl)-9H-carbazol-3-yl]-1-(O-acetyloxime), propanone 1-[9-propyl-6-(4-methylbenzoyl)-9H-carbazol-3-yl]-1-(O-acetyloxime), propanone 1-[9-propyl-6-(6-methylbenzoyl)-9H-carbazol-3-yl]-1-(O-acetyloxime), propanone 1-[9-propyl-6-(2,4-dimethylbenzoyl)-9H-carbazol-3-yl]-1-(O-acetyloxime), propanone 1-[9-propyl-6-(2,6-dimethylbenzoyl)-9H-carbazol-3-yl]-1-(O-acetyloxime), propanone 1-[9-propyl-6-(2,4,6-trimethylbenzoyl)-9H-carbazol-3-yl]-1-(O-acetyloxime), propanone 1-[9-propyl-6-(2-ethylbenzoyl)-9H-carbazol-3-yl]-1-(O-acetyloxime), propanone 1-[9-propyl-6-(4-ethylbenzoyl)-9H-carbazol-3-yl]-1-(O-acetyloxime), propanone 1-[9-propyl-6-(6-ethylbenzoyl)-9H-carbazol-3-yl]-1-(O-acetyloxime), propanone 1-[9-propyl-6-(2,4-diethylbenzoyl)-9H-carbazol-3-yl]-1-(O-acetyloxime), propanone 1-[9-propyl-6-(2,6-diethylbenzoyl)-9H-carbazol-3-yl]-1-(O-acetyloxime), propanone 1-[9-propyl-6-(2,4,6-triethylbenzoyl)-9H-carbazol-3-yl]-1-(O-acetyloxime), propanone 1-[9-ethyl-6-(2-methylbenzoyl)-9H-carbazol-3-yl]-1-[O-(1-propanone)oxime], propanone 1-[9-ethyl-6-(4-methylbenzoyl)-9H-carbazol-3-yl]-1-[O-(1-propanone)oxime], propanone 1-[9-ethyl-6-(6-methylbenzoyl)-9H-carbazol-3-yl]-1-[O-(1-propanone)oxime], propanone 1-[9-ethyl-6-(2,4-dimethylbenzoyl)-9H-carbazol-3-yl]-1-[O-(1-propanone)oxime], propanone 1-[9-ethyl-6-(2,6-dimethylbenzoyl)-9H-carbazol-3-yl]-1-[O-(1-propanone)oxime], propanone 1-[9-ethyl-6-(2,4,6-trimethylbenzoyl)-9H-carbazol-3-yl]-1-[O-(1-propanone)oxime], propanone 1-[9-ethyl-6-(2-ethylbenzoyl)-9H-carbazol-3-yl]-1-[O-(1-propanone)oxime], propanone 1-[9-ethyl-6-(4-ethylbenzoyl)-9H-carbazol-3-yl]-1-[O-(1-propanone)oxime], propanone 1-[9-ethyl-6-(6-ethylbenzoyl)-9H-carbazol-3-yl]-1-[O-(1-propanone)oxime], propanone 1-[9-ethyl-6-(2,4-diethylbenzoyl)-9H-carbazol-3-yl]-1-[O-(1-propanone)oxime], propanone 1-[9-ethyl-6-(2,6-diethylbenzoyl)-9H-carbazol-3-yl]-1-[O-(1-propanone)oxime], propanone 1-[9-ethyl-6-(2,4,6-triethylbenzoyl)-9H-carbazol-3-yl]-1-[O-(1-propanone)oxime], propanone 1-[9-methyl-6-(2-methylbenzoyl)-9H-carbazol-3-yl]-1-[O-(1-propanone)oxime], propanone 1-[9-methyl-6-(4-methylbenzoyl)-9H-carbazol-3-yl]-1-[O-(1-propanone)oxime], propanone 1-[9-methyl-6-(6-methylbenzoyl)-9H-carbazol-3-yl]-1-[O-(1-propanone)oxime], propanone 1-[9-methyl-6-(2,4-dimethylbenzoyl)-9H -carbazol-3-yl]-1-[O-(1-propanone)oxime], propanone 1-[9-methyl-6-(2,6-dimethylbenzoyl)-9H-carbazol-3-yl]-1-[O-(1-propanone)oxime], propanone 1-[9-methyl-6-(2,4,6-trimethylbenzoyl)-9H -carbazol-3-yl]-1-[O-(1-propanone)oxime], propanone 1-[9-methyl-6-(2-ethylbenzoyl)-9H-carbazol-3-yl]-1-[O-(1-propanone)oxime], propanone 1-[9-methyl-6-(4-ethylbenzoyl)-9H-carbazol-3-yl]-1-[O -(1-propanone)oxime], propanone 1-[9-methyl-6-(6-ethylbenzoyl )-9H -carbazol-3-yl]-1-[O-(1-propanone)oxime], propanone 1-[9-methyl-6-(2,4-diethylbenzoyl )-9H-carbazol-3-yl]-1-[O-(1-propanone)oxime], propanone 1-[9-methyl-6-(2,6-diethylbenzoyl)-9H-carbazol-3-yl]-1-[O-(1-propanone)oxime], propanone 1-[9-methyl-6-(2,4,6-triethylbenzoyl)-9H -carbazol-3-yl]-, 1-[O-(1-propanone)oxime], propanone 1-[9-propyl -6-(2-methylbenzoyl)-9H-carbazol-3-yl]-1-[O-(1-propanone)oxime], propanone 1-[9-propyl-6-(4-methylbenzoyl)-9H-carbazol-3-yl]-1-[O-(1-propanone)oxime], propanone 1-[9-propyl-6-(6-methylbenzoyl)-9H -carbazol-3-yl]-1-[O-(1-propanone)oxime], propanone 1-[9-propyl-6-(2,4-dimethylbenzoyl)-9H-carbazol-3-yl]-1-[O-(1-propanone)oxime], propanone 1-[9-propyl-6-(2,6-dimethylbenzoyl)-9H -carbazol-3-yl]-1-[O-(1-propanone)oxime], propanone 1-[9-propyl -6-(2,4,6-trimethylbenzoyl)-9H-carbazol-3-yl]-1-[O-(1-propanone)oxime], propanone 1-[9-propyl-6-(2-ethylbenzoyl)-9H-carbazol-3-yl]-1-[O-(1-propanone)oxime], propanone 1-[9-propyl-6-(4-ethylbenzoyl)-9H -carbazol-3-yl]-1-[O-(1-propanone)oxime], propanone 1-[9-propyl-6-(6-ethylbenzoyl)-9H-carbazol-3-yl]-1-[O-(1-propanone)oxime], propanone 1-[9-propyl-6-(2,4-diethylbenzoyl)-9H-carbazol-3-yl]-1-[O-(1-propanone)oxime],propanone 1-[9-propyl-6-(2,6-diethytbenzoyl )-9H -carbazol-3-yl]-1-[O-(1-propanone)oxime], propanone 1-[9-propyl-6-(2,4,6-triethylbenzoyl)-9H-carbazol-3-yl]-1-[O-(1-propanone)oxime], propanone 1-[9-ethyl-6-(2-methylbenzoyl)-9H -carbazol-3-yl]-1-[O-(1-butanone)oxime], propanone 1-[9-ethyl-6-(4-methylbenzoyl)-9H-carbazol-3-yl]-1-[O-(1-butanone)oxime], propanone 1-[9-ethyl-6-(6-methylbenzoyl)-9H-carbazol-3-yl]-1-[O -(1-butanone)oxime], propanone 1-[9-ethyl-6-(2,4-dimethylbenzoyl )-9H -carbazol-3-yl]-1-[O-(1-butanone)oxime], propanone 1-[9-ethyl-6-(2,6-dimethylbenzoyl )-9H-carbazol-3-yl]-1-[O-(1-butanone)oxime], propanone 1-[9-ethyl-6-(2,4,6-trimethylbenzoyl)-9H-carbazol-3-yl]-1-[O-(1-butanone)oxime], propanone 1-[9-ethyl-6-(2-ethylbenzoyl )-9H -carbazol-3-yl]-1-[O-(1-butanone)oxime], propanone 1-[9-ethyl-6-(4-ethylbenzoyl )-9H-carbazol-3-yl]-1-[O-(1-butanone)oxime], propanone 1-[9-ethyl-6-(6-ethylbenzoyl)-9H-carbazol-3-yl]-1-[O-(1-butanone)oxime], propanone 1-[9-ethyl-6-(2,4-diethylbenzoyl)-9H -carbazol-3-yl]-1-[O-(1-butanone)oxime], propanone 1-[9-ethyl-6-(2,6-diethylbenzoyl)-9H-carbazol-3-yl]-1-[O-(1-butanone)oxime], propanone 1-[9-ethyl-6-(2,4,6-triethylbenzoyl)-9H-carbazol-3-yl]-1-[O-(1-butanone)oxime], propanone 1-[9-methyl-6-(2-methylbenzoyl)-9H -carbazol-3-yl]-1-[O-(1-butanone)oxime], propanone 1-[9-methyl-6-(4-methylbenzoyl)-9H-carbazol-3-yl]-1-[O-(1-butanone)oxime], propanone 1-[9-methyl-6-(6-methylbenzoyl)-9H-carbazol-3-yl]1-[O-(1-butanone)oxime], propanone 1-[9-methyl-6-(2,4-dimethylbenzoyl )-9H -carbazol-3-yl]-1-[O-(1-butanone)oxime], propanone 1-[9-methyl-6-(2,6-dimethylbenzoyl)-9H-carbazol-3-yl]-1-[O-(1-butanone)oxime], propanone 1-[9-methyl-6-(2,4,6-trimethylbenzoyl)-9H-carbazol-3-yl]-1-[O-(1-butanone)oxime], propanone 1-[9-methyl-6-(2-ethylbenzoyl)-9H -carbazol-3-yl]-1-[O-(1-butanone)oxime], propanone 1-[9-methyl-6-(4-ethylbenzoyl)-9H-carbazol-3-yl]-1-[O-(1-butanone)oxime], propanone 1-[9-methyl-6-(6-ethylbenzoyl)-9H-carbazol-3-yl]-1-[O -(1-butanone)oxime], propanone 1-[9-methyl-6-(2,4-diethylbenzoyl)-9H -carbazol-3-yl]-1-[O-(1-butanone)oxime], propanone 1-[9-methyl-6-(2,6-diethylbenzoyl)-9H-carbazol-3-yl]-1-[O-(1-butanone)oxime], propanone 1-[9-methyl-6-(2,4,6-triethylbenzoyl)-9H-carbazol-3-yl]-1-[O-(1-butanone) oxime], propanone 1-[9-propyl-6-(2-methylbenzoyl)-9H -carbazol-3-yl]-1-[O-(1-butanone)oxime], propanone 1-[9-propyl-6-(4-methylbenzoyl)-9H-carbazol-3-yl]-1-[O-(1-butanone)oxime], propanone 1-[9-propyl-6-(6-methylbenzoyl)-9H-carbazol-3-yl]-1-[O-(1-butanone)oxime], propanone 1-[9-propyl-6-(2,4-dimethylbenzoyl)-9H -carbazol-3-yl]-1-[O-(1-butanone)oxime], propanone 1-[9-propyl-6-(2,6-dimethylbenzoyl)-9H-carbazol-3-yl]-1-[O-(1-butanone)oxime], propanone 1-[9-propyl-6-(2,4,6-trimethylbenzoyl)-9H-carbazol-3-yl]-1-[O-(1-butanone)oxime], propanone 1-[9-propyl-6-(2-ethylbenzoyl)-9H -carbazol-3-yl]-1-[O-(1-butanone)oxime], propanone 1-[9-propyl-6-(4-ethylbenzoyl)-9H-carbazol-3-yl]-1-[O-(1-butanone)oxime], propanone 1-[9-propyl-6-(6-ethylbenzoyl)-9H-carbazol-3-yl]-1-[O -(1-butanone)oxime], propanone 1-[9-propyl-6-(2,4-diethylbenzoyl)-9H -carbazol-3-yl]-1-[O-(1-butanone)oxime], propanone 1-[9-propyl-6-(2,6-diethylbenzoyl)-9H-carbazol-3-yl]-1-[O-(1-butanone)oxime], propanone 1-[9-propyl-6-(2,4,6-triethylbenzoyl)-9H-carbazol-3-yl]-1-[O-(1-butanone)oxime], propanone 1-[9-ethyl-6-(2-methylbenzoyl)-9H -carbazol-3-yl]-1-[O-(1-pentanone)oxime], propanone 1-[9-ethyl-6-(4-methylbenzoyl)-9H-carbazol-3-yl]-1-[O-(1-pentanone)oxime], propanone 1-[9-ethyl-6-(6-methylbenzoyl)-9H-carbazol-3-yl]-1-[O -(1-pentanone)oxime], propanone 1-[9-ethyl-6-(2,4-dimethylbenzoyl)-9H -carbazol-3-yl]-1-[O-(1-pentanone)oxime], propanone 1-[9-ethyl-6-(2,6-dimethylbenzoyl)-9H-carbazol-3-yl]-1-[O-(1-pentanone)oxime], propanone 1-[9-ethyl-6-(2,4,6-trimethylbenzoyl)-9H -carbazol-3-yl]-1-[O-(1-pentanone)oxime], propanone 1-[9-ethyl-6-(2-ethylbenzoyl)-9H-carbazol-3-yl]-1-[O-(1-pentanone)oxime], propanone 1-[9-ethyl-6-(4-ethylbenzoyl)-9H-carbazol-3-yl]-1-[O-(1-pentanone)oxime], propanone 1-[9-ethyl-6-(6-ethylbenzoyl)-9H -carbazol-3-yl]-1-[O-(1-pentanone)oxime], propanone 1-[9-ethyl-6-(2,4-diethylbenzoyl)-9H-carbazol-3-yl]-1-[O-(1-pentanone)oxime], propanone 1-[9-ethyl-6-(2,6-diethylbenzoyl)-9H-carbazol-3-yl]-1-[O-(1-pentanone)oxime], propanone 1-[9-ethyl-6-(2,4,6-triethylbenzoyl)-9H -carbazol-3-yl]-1-[O-(1-pentanone)oxime], propanone 1-[9-methyl-6-(2-methylbenzoyl)-9H-carbazol-3-yl]-1-[O-(1-pentanone)oxime], propanone 1-[9-methyl-6-(4-methylbenzoyl)-9H-carbazol-3-yl]-1-[O-(1-pentanone)oxime], propanone 1-[9-methyl-6-(6-methylbenzoyl)-9H -carbazol-3-yl]-1-[O-(1-pentanone)oxime], propanone 1-[9-methyl-6-(2,4-dimethylbenzoyl)-9H-carbazol-3-yl]-1-[O-(1-pentanone)oxime], propanone 1-[9-methyl-6-(2,6-dimethylbenzoyl)-9H -carbazol-3-yl]-1-[O-(1-pentanone)oxime], propanone 1-[9-methyl-6-(2,4,6-trimethylbenzoyl)-9H-carbazol-3-yl]-1-[O-(1 -pentanone)oxime], propanone 1-[9-methyl-6-(2-ethylbenzoyl)-9H -carbazol-3-yl]-1-[O-(1-pentanone)oxime], propanone 1-[9-methyl-6-(4-ethylbenzoyl )-9H-carbazol-3-yl]-1-[O-(1-pentanone)oxime], propanone 1-[9-methyl-6-(6-ethylbenzoyl)-9H-carbazol-3-yl]-1-[O -(1-pentanone)oxime], propanone 1-[9-methyl-6-(2,4-diethylbenzoyl)-9H -carbazol-3-yl]-1-[O-(1-pentanone)oxime], propanone 1-[9-methyl-6-(2,6-diethylbenzoyl)-9H- carbazol-3-yl]-1-[O-(1-pentanone)oxime], propanone 1-[9-methyl-6-(2,4,6-triethylbenzoyl)-9H-carbazol-3-yl]-1-[O-(1-pentanone)oxime], propanone 1-[9-propyl-6-(2-methylbenzoyl)-9H -carbazol-3-yl]-1-[O-(1-pentanone) oxime], propanone 1-[9-propyl-6-(4-methylbenzoyl)-9H-carbazol-3-yl]-1-[O-(1-pentanone)oxime], propanone 1-[9-propyl-6-(6-methylbenzoyl)-9H-carbazol-3-yl]-1-[O-(1-pentanone)oxime], propanone 1-[9-propyl-6-(2,4-dimethylbenzoyl)-9H -carbazol-3-yl]-1-[O-(1-pentanone) oxime], propanone 1-[9-propyl-6-(2,6-dimethylbenzoyl)-9H-carbazol-3-yl]-1-[O-(1-pentanone)oxime], propanone 1-[9-propyl-6-(2,4,6-trimethylbenzoyl)-9H -carbazol-3-yl]-1-[O-(1-pentanone)oxime], propanone 1-[9-propyl-6-(2-ethylbenzoyl)-9H-carbazol-3-yl]-1-[O-(1-pentanone)oxime], propanone 1-[9-propyl-6-(4-ethylbenzoyl)-9H-carbazol-3-yl]-1-[O -(1-pentanone)oxime], propanone 1-[9-propyl-6-(6-ethylbenzoyl)-9H -carbazol-3-yl]-1-[O-(1-pentanone)oxime], propanone 1-[9-propyl-6-(2,4-diethylbenzoyl )-9H-carbazol-3-yl]-1-[O-(1-pentanone)oxime], propanone 1-[9-propyl-6-(2,6-diethylbenzoyl)-9H-carbazol-3-yl]-1 -[O-(1-pentanone)oxime], and propanone 1-[9-propyl-6-(2,4,6-triethylbenzoyl) -9H-carbazol-3-yl]-1-[O-(1-pentanone) oxime].

Since the photopolymerization initiator represented by the formula (1) is highly sensitive, the use of such a photopolymerization initiator makes it possible to significantly improve the sensitivity of the photosensitive binder system and therefore to allow reaction to efficiently proceed. Therefore, even when an exposure dose is less than usual, the black resin composition can be sufficiently cured. Further, the high sensitivity of the photopolymerization initiator allows curing reaction to satisfactorily proceed even when the concentration of the titanium oxynitride particles in the black resin composition is high, or the concentration of a curable component in the black resin composition is low, or even where the black resin composition is located at a deep position of a coating film where only a small amount of light reaches. As a result, the cured black resin composition comes in close contact with a base material such as a substrate, and is therefore less likely to fall off the base material during development so that a fine pattern of the black resin composition is accurately formed.

Particularly, the effect obtained by using such a photopolymerization initiator having improved sensitivity is remarkably recognized in the case of light exposure in the presence of oxygen. The reactrion of the photopolymerization initiator represented by the formula (1) is less likely to be inhibited by oxygen, and therefore polymerization reaction quickly proceeds even in the presence of oxygen. For this reason, in the case of forming a coating film of the black resin composition for display device according to the present invention containing the photopolymerization initiator represented by the formula (1), it is not necessary to coat the surface of the coating film with an oxygen insulation film before light exposure or to expose the coating film to light in an atmosphere of nitrogen, thereby avoiding such complicated processes and high costs.

Further, reaction inhibition caused by oxygen remarkably occurs on the surface of a coating film being in contact with oxygen, which tends to adversely affect the surface profile of a pattern formed by the coating film, especially the sharpness of the edges of the pattern. However, as described above, since the black resin composition for display device according to the present invention contains the photopolymerization initiator represented by the formula (1) which is less likely to undergo reaction inhibition caused by oxygen, the accuracy of the surface profile of a pattern formed using the black resin composition is improved.

As described above, the use of the photopolymerization initiator represented by the formula (1) makes it possible to improve both the adhesiveness of a coating film of the black resin composition with a base material and the accuracy of the surface profile of a pattern formed by the coating film, thereby enabling the formation of a fine and precise pattern required of a light-blocking film of a color filter for use in display devices and solid-state image sensors.

Among the compounds represented by the formula (1) preferred are those wherein $R^2$ to $R^{11}$ are each hydrogen. Among such compounds wherein $R^2$ to $R^{11}$ are hydrogen, preferred are those where $R^1$, $R^{12}$, $R^{13}$, and $R^{14}$ are each an aliphatic group having 1 to 3 carbon atoms.

Particularly, the compound represented by the formula (1) wherein $R^2$ to $R^{11}$ are each hydrogen, $R^1$ is a methyl group, $R^{12}$ is an ethyl group, $R^{13}$ is a methyl group, and $R^{14}$ a methyl group (which is represented by the following formula (2)) can efficiently generate radicals by irradiation with UV rays, including i rays (365 nm), having a wavelength close to the visible light region (as a reference, 330 to 370 nm), and therefore imparts high sensitivity to the photosensitive colored composition.

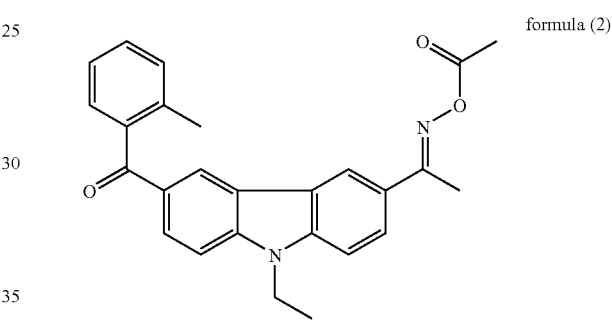

formula (2)

The reason for this can be considered as follows: the compound represented by the formula (2) has a larger absorption intensity at a wavelength in the range of 330 to 370 nm (e.g., 333 nm, 365 nm) and a higher quantum yield constant involved in polymerization initiation reaction as compared to another initiator widely used for color filters, such as Irgacure 907 (manufactured by Ciba Specialty Chemicals), and therefore can efficiently utilize light having a wavelength in the range of 330 to 370 nm to allow polymerization reaction to proceed. As the photopolymerization initiator represented by the formula (2), for example, a commercialized product such as CGI242 (manufactured by Ciba Specialty Chemicals) can be used.

In the present invention, another photopolymerization initiator having the function of causing cleavage reaction or hydrogen abstraction reaction by irradiation with light to induce radical polymerization reaction may be used in combination with the compound represented by the formula (1) as long as the above-described effects are not impaired. In a case where two or more initiators are used in combination, an agent showing absorption at an exposure wavelength is preferably used to the extent that it does not significantly inhibit the reaction of the initiators.

Examples of such another photopolymerization initiator include compounds which can generate free radicals with the use of the energy of UV rays, such as benzophenone derivatives such as benzoin and benzophenone and derivatives of esters thereof; xanthone derivatives and thioxanthone derivatives; halogen-containing compounds such as chlorosulfonyl polynuclear aromatic compounds, chloromethyl polynuclear aromatic compounds, chloromethyl heterocyclic compounds, and chloromethyl benzophenones; triazines; fluorenones; haloalkanes; redox couples of a photoreducing pigment and a reducing agent; organic sulfur compounds; and peroxides. Preferred are ketone-base compounds and biimidazole-based compounds.

Specific examples of the biimidazole-based compounds include
2,2'-bis(2-chlorophenyl)-4,4',5,5'-tetraphenyl-1,2'-bi imidazole,
2,2'-bis(2-chlorophenyl)-4,4',5,5'-tetrakis(4-ethoxycarbonylphenyl)-1,2'-biimidazole,
2,2'-bis(2-chlorophenyl)-4,4',5,5'-tetrakis(4-phenoxycarbonylphenyl)-1,2'-biimidazole,
2,2'-bis(2,4-dichlorophenyl)-4,4',5,5'-tetrakis(4-ethoxycarbonylphenyl)-1,2'-biimidazole,
2,2'-bis(2,4-dichlorophenyl)-4,4',5,5'-tetrakis(4-phenoxycarbonylphenyl)-1,2'-biimidazole,
2,2'-bis(2,4,6-trichlorophenyl)-4,4',5,5'-tetrakis(4-ethoxycarbonylphenyl)-1,2'-biimidazole,
2,2'-bis(2,4,6-trichlorophenyl)-4,4',5,5'-tetrakis(4-phenoxycarbonylphenyl)-1,2'-biimidazole,
2,2'-bis(2-bromophenyl)-4,4',5,5'-tetrakis(4-ethoxycarbonylphenyl)-1,2'-biimidazole,
2,2'-bis(2-bromophenyl)-4,4',5,5'-tetrakis(4-phenoxycarbonylphenyl)-1,2'-biimidazole,
2,2'-bis(2,4-dibromophenyl)-4,4',5,5'-tetrakis(4-ethoxylcarbonylphenyl)-1,2'-biimidazole,
2,2'-bis(2,4-dibromophenyl)-4,4',5,5'-tetrakis(4-phenoxycarbonylphenyl)-1,2'-biimidazole,
2,2'-bis(2,4,6-tribromophenyl)-4,4',5,5'-tetrakis(4-ethoxycarbonylphenyl)-1,2'-biimidazole,
2,2'-bis(2,4,6-tribromophenyl)-4,4',5,5'-tetrakis(4-phenoxycarbonylphenyl)-1,2'-biimidazole,
2,2'-bis(2-cyanophenyl)-4,4',5,5'-tetrakis(4-ethoxycarbonylphenyl)-1,2'-biimidazole,
2,2'-bis(2-cyanophenyl)-4,4',5,5'-tetrakis(4-phenoxycarbonylphenyl)-1,2'-biimidazole,
2,2'-bis(2-methylphenyl)-4,4',5,5'-tetrakis(4-methoxycarbonylphenyl)-1,2'-biimidazole,
2,2'-bis(2-methylphenyl)-4,4',5,5'-tetrakis(4-ethoxycarbonylphenyl)-1,2'-biimidazole,
2,2'-bis(2-methylphenyl)-4,4',5,5'-tetrakis(4-phenoxycarbonylphenyl)-1,2'-biimidazole,
2,2'-bis(2-ethylphenyl)-4,4',5,5'-tetrakis(4-methoxycarbonylphenyl)-1,2'-biimidazole,
2,2'-bis(2-ethylphenyl)-4,4',5,5'-tetrakis(4-ethoxycarbonylphenyl)-1,2'-biimidazole,
2,2'-bis(2-ethylphenyl)-4,4',5,5'-tetrakis(4-phenoxycarbonylphenyl)-1,2'-biimidazole,
2,2'-bis(2-phenylphenyl)-4,4',5,5'-tetrakis(4-methoxycarbonylphenyl)-1,2'-biimidazole, 2,2'-bis(2-phenylphenyl)-4,4',5,5'-tetrakis(4-ethoxycarbonylphenyl)-1,2'-biimidazole,
2,2'-bis(2-phenylphenyl)-4,4',5,5'-tetrakis(4-phenoxycarbonylphenyl)-1,2'-biimidazole,
2,2'-bis(2,4-dichlorophenyl-4,4',5,5'-tetraphenyl-1,2'-biimidazole,
2,2'-bis(2,4,6-trichlorophenyl)-4,4',5,5'-tetraphenyl-1,2'-biimidazole,
2,2'-bis(2,4-dibromophenyl)-4,4',5,5'-tetraphenyl-1,2'-biimidazole,
2,2'-bis(2,4,6-tribromophenyl)-4,4',5,5'-tetraphenyl-1,2'-biimidazole,
2,2'-bis(2,4-dicyanophenyl)-4,4',5,5'-tetraphenyl-1,2'-biimidazole,
2,2'-bis(2,4,6-tricyanophenyl)-4,4',5,5'-tetraphenyl-1,2'-biimidazole,
2,2'-bis(2,4-dimethylphenyl)-4,4',5,5'-tetraphenyl-1,2'-biimidazole,
2,2'-bis(2,4,6-trimethylphenyl)-4,4',5,5'-tetraphenyl-1,2'-biimidazole,
2,2'-bis(2,4-diethylphenyl)-4,4',5,5'-tetraphenyl-1,2'-biimidazole,
2,2'-bis(2,4,6-triethylphenyl)-4,4',5,5'-tetraphenyl-1,2'-biimidazole,
2,2'-bis(2,4-diphenylphenyl)-4,4',5,5'-tetraphenyl-1,2'-biimidazole, and
2,2'-bis(2,4,6-triphenylphenyl)-4,4',5,5'-tetraphenyl-1,2'-biimidazole.

More specific examples of the biimidazole-base compound include commercialized products such as Biimidazole (manufactured by KUROGANE KASEI Co., Ltd.) and CL2W2 (manufactured by Showa Denko K.K.).

These photopolymerization initiators can be used singly or in combination of two or more of them. The amount of the photopolymerization initiator contained in the photosensitive binder system is not particularly limited, and is appropriately determined to obtain a desired photosensitive binder system. For example, in the case of using at least the compound represented by the formula (1), the amount of the photopolymerization initiator is in the range of 0.05 to 60 parts by weight, particularly in the range of 0.1 to 50 parts by weight per 100 parts by weight of the total amount of the components of the negative-type photosensitive binder system.

In the present invention, if necessary, at least one kind selected from the group consisting of sensitizers and curing accelerators may also be used in combination with the photopolymerization initiator. Specific examples of the sensitizers include
4,4'-bis(dimethylamino)benzophenone,
4,4'-bis(diethylamino)benzophenone,
4-diethylaminoacetophenone,
4-dimethylaminopropiophenone,
ethyl-4-dimethylaminobenzoate,
2-ethylhexyl-1,4-dimethylaminobenzoate,
2,5-bis(4-diethylaminobenzal)cyclohexanone,
7-diethylamino-3-(4-diethylaminobenzoyl)coumarin, and 4-(diethylamino)chalcone. Specific examples of the curing accelerators include chain transfer agents such as 2-mercaptobenzimidazole, 2-mercaptobenzothiazole,
2-mercaptobenzoxazole,
2,5-dimercapto-1,3,4-thiadiazole,
2-mercapto-4,6-dimethylaminopyrizine,
1-phenyl-5-mercapto-1H-tetrazole, and
3-mercapto-4-methyl-4H-1,2,4-triazole.

At least one kind selected from the group consisting of these sensitizers and curing accelerators can be used singly or in combination of one or more of them, and the amount thereof contained in the photosensitive binder system is not particularly limited, but is usually in the range of 5 to 70 parts by weight, preferably in the range of 10 to 50 parts by weight per 100 parts by weight of the total weight of the photopolymerization initiator.

(ii) Positive-Type Photosensitive Binder System

The positive-type photosensitive binder system containing a photocurable resin which can be cured by polymerization initiated by irradiation with light such as UV rays or electron beams includes (A) an acid-decomposable resin and (B) a photoacid-generating agent.

The acid-decomposable resin to be used in the present invention is a resin having a group which can be converted into an alkali-soluble group (e.g., a carboxyl group, a phenolic hydroxyl group) through contact with an acid. As such an acid-decomposable resin, a resin whose main chain or side chain segment has a t-butoxycarbonyl group (—COOt-Bu), a t-butoxycarbonylphenyloxycarbonyl group (—COOph-COOt-Bu), or p-(t-butoxycarbonyloxy)phenyl group (-phO-COOt-Bu) bonded thereto is preferably used. More preferred specific examples of the acid-decomposable resin include poly-t-butyl(meth)acrylate, poly-t-butoxycarbonylphenyl (meth)acrylate, poly-p-(t-butoxycarbonyloxy)styrene. These polymers may contain another monomer unit.

The photoacid-generating agent to be used in the present invention is a compound which generates an acid through irradiation with light. As such a photoacid-generating agent, one or more compound known as a photoacid-generating agent can be used. Examples of the photoacid-generating agent include onium salts with a halogen-ion, a BF4-ion, a PF6-ion, an AsF6-ion, an SbF6-ion, or a CF3SO3-ion, organic halogen compounds, naphthoquinonediazide sulfonic acid compounds, and photo-sulfonic acid-generating compounds.

Specific examples of the onium salts include those described in U.S. Pat. Nos. 4,069,055 and 4,069,056. Specific examples of diazonium salts include those described in Photogr. Sci. Eng., 18,387 (1974), J. Macromol. Chem. Sci.,A21, 1695 (1984), and Polymer, 21, 423 (1980). Specific examples of iodonium salts include those discribed in Maclomolecules, 10, 1307 (1977), Chem. & Eng. NEWS., Nov. 28, 31 (1988), and European Patent No. 0104143. Specific examples of sulfonium salts include those described in Polymer J., 17, 73 (1985), Polymer Bull., 14, 279 (1985), J. Polymer Sci., 17, 977 (1979), J. Org. Chem., 43, 3055 (1978), J. Org. Chem., 50, 4360 (1985), JP-A Nos. 57-18723 and 56-8428, U.S. Pat. Nos. 4,760,013, 4,139,655, and 4734444, and European Patent No. 0297433. Specific examples of phosphonium salts include those discribed in U.S. Pat. Nos. 4,069,055 and 4,069, 056 and Maclomolecules, 17, 2469 (1984). Specific examples of selenium salts include those described in Maclomolecules, 10, 1307 (1977). Specific examples of arsonium salts include those described in Proc. Conf. Rad. Curing ASIA P478 Tokyo. October (1988).

Examples of the organic halogen compounds which generate an acid through irradiation with light include trimethylphenylsulfon compounds described in Japanese Patent Publication No. 46-4605, halomethyl-S-triazine compounds described in Japanese Patent Publication No. 48-36281 and JP-A Nos. 53-133428, 60-105667, and 60-239736, and halomethyloxadiazole compounds described in Angew. Physik. Chem., 24. 381 (1918), J. Phys. Chem., 66, 2449 (1962), JP-A Nos. 54-74728, 55-77742, 59-148784, 60-3626, 60-138539, and 60-239473.

Examples of the photo-sulfonic acid-generating compounds include an ester compound of nitrobenzyl alcohol and arylsulfonic acid described in Maclomolecules, 21, 2001 (1988) and JP-A No. 64-18143 and an ester compound of an oxime and arylsulfonic acid described in European Patent Nos. 0044155 and 0199672, an ester compound of N-hydroxyamide or imide and sulfonic acid discribed in U.S. Pat. Nos. 4,258,121 and 4,618,564, and an ester compound of benzoin and sulfonic acid discribed in European Patent Nos. 84515 and 199672.

Among these photoacid-generating agents, organic halogen compounds, particularly halomethyl-S-triazine compounds, halomethyloxadiazole compounds, and photo-sulfonic acid-generating compounds are preferred because they can efficiently decompose a group which can be converted into an alkali-soluble group (e.g., a carboxyl group, a phenolic hydroxyl group) through contact with an acid, such as a t-butoxycarbonyl group or a t-butoxycarbonyloxyphenyl group.

These acid-generating agents can be used singly or in combination of two or more of them. If the amount of the acid-generating agent contained in the positive-type photosensitive binder system is too small for the acid-decomposable resin, only a small amount of an acid is generated so that it is not possible to satisfactorily make the acid-decomposable resin alkali-soluble. On the other hand, the amount of the acid-generating agent contained in the positive-type photosensitive binder system is too large for the acid-decomposable resin, there is a fear that a phenomenon undesirable for development or the like occurs. For this reason, the amount of the acid-generating agent contained in the positive-type photosensitive binder system is preferably in the range of 0.05 to 15 parts by weight, more preferably in the range of 3 to 15 parts by weight per 100 parts by weight of the acid-decomposable resin.

It is to be noted that the photoacid-generating agent can be used in combination with a sensitizer to improve the efficiency of photoacid generation and the sensitivity of the photosensitive resin composition. The photoacid-generating agent and the sensitizer can be appropriately selected depending on, for example, the kind of pigment used.

Examples of the sensitizer include known sensitizers such as anthracene, phenanthrene, perylene, pyrene, chrysene, 1,2-benzoanthracene, coronene, 1,6-diphenyl-1,3,5-hexatriene, 1,1,4,4-tetraphenyl-1,3-butadiene, 2,3,4,5-tetraphenylfuran, 2,5-diphenylthiophene, thioxanthone, 2-chlorothioxanthone, phenothiazine, 1,3-diphenylpyrazoline, 1,3-diphenylisobenzofuran, xanthone, benzophenone, 4-hydroxybenzophenone, anthrone, ninhydrin, 9-fluorenone, nitropyrene, 2,4,7-trinitrofluorenone, indanone, phenanthraquinone, 7-methoxy-4-methylcoumarin, 3-keto-bis(7-diethylaminocoumarin), fluoroscene, eosin, rhodamine S, and triphenylpyrylium perchlorate.

The molar ratio between the sensitizer and the photoacid-generating agent is preferably in the range of 0.01/1 to 10/1, more preferably in the range of 0.1/1 to 5/1.

(2) Thermosetting Binder System

Examples of a thermosetting system include: a ring-opening addition reaction system between an epoxy group and activated hydrogen or between a cyclic urea group and a hydroxyl group; and a polyimide precursor system such as thermal ring-closing imidization of polyamic acid.

As the thermosetting binder system, a combination of a compound having two or more thermosetting functional groups in one molecule and a curing agent is preferably used. Such a thermosetting binder system may further contain a catalyst which can accelerate thermal curing reaction. As the thermosetting functional group, an epoxy group is preferred. The thermosetting binder system may further contain the above-described polymer not having polymerization reactivity in itself.

As the compound having two or more thermosetting functional groups in one molecule, an epoxy compound having two or more epoxy groups in one molecule is usually used. Such an epoxy compound having two or more epoxy groups in one molecule (a so-called epoxy resin is also included) preferably has 2 to 50 epoxy groups, more preferably 2 to 20 epoxy groups in one molecule. The epoxy group is not particularly limited as long as it has a structure containing an oxirane ring structure. Examples of such an epoxy group include a glycidyl group, an oxyethylene group, and an epoxycyclohexyl group. Examples of the epoxy compound include known polyvalent epoxy compounds which can be cured by a carboxylic acid. Such epoxy compounds are widely disclosed in, for example, M. Shinbo, "Epoxy Resin Handbook", Nikkan Kogyo Shimbun, Ltd. (1987), and those disclosed therein can be used.

Specific examples of the epoxy compound include bisphenol A-type epoxy resins, bisphenol F-type epoxy resins, brominated bisphenol A-type epoxy resins, bisphenol S-type epoxy resins, diphenyl ether-type epoxy resins, hydroquinone-type epoxy resins, naphthalene-type epoxy resins, biphenyl-type epoxy resins, fluorene-type epoxy resins, phenol novolac-type epoxy resins, orthocresol novolac-type epoxy resins, trishydroxyphenylmethane-type epoxy resins, trifunctional-type epoxy resins, tetraphenylolethane-type epoxy resins, dicyclopentadienephenol-type epoxy resins, hydrogenated bisphenol A-type epoxy resins, bisphenol A nucleus-containing polyol-type epoxy resins, polypropylene glycol-type epoxy resins, glycidyl ester-type epoxy resins, glycidylamine-type epoxy resins, glyoxal-type epoxy resins, alicyclic epoxy resins, and heterocyclic epoxy resins. More specific examples of the epoxy compound include bisphenol A-type novolac epoxy resins such as Epicoat 157S70 (manufactured by Japan Epoxy Resin Co., Ltd.) and the like, and cresol novolac-type epoxy resins such as YDCN-701 (manufactured by Tohto Kasei Co., Ltd.) and the like.

As the epoxy compound, a polymer having a relatively high molecular weight and usually used as a binder component to impart adhesiveness, heat-resistance, and alkali-resistance to a cured film (hereinafter, also referred to as a "binder-type epoxy compound") may be used in combination with a compound having two or more epoxy groups in one molecule and a molecular weight smaller than that of the binder-type epoxy compound (hereinafter, also referred to as a "polyfunctional epoxy compound") to increase the crosslink density of the cured film and to control the viscosity of the composition.

The polystyrene-conversion weight average molecular weight of the binder-type epoxy compound is preferably in the range of 1,000 to 100,000, particularly preferably in the range of 2,000 to 50,000. If the molecular weight of the binder-type epoxy compound is less than 1,000, properties, such as strength and solvent-resistance, required of a cured resin layer that is a structural detail of, for example, a color filter tend to be poor. On the other hand, if the molecular weight of the binder-type epoxy compound exceeds 100,000, the viscosity of the black resin composition tends to be increased, which deteriorates the uniformity of coating applied onto substrate so that an obtained coating film tends to have large variations in its thickness.

On the other hand, the polystyrene-conversion weight average molecular weight of the polyfunctional epoxy compound is not particularly limited as long as it is smaller than that of the binder-type epoxy compound used in combination with it, but is preferably 4,000 or less, particularly preferably 3,000 or less. It is to be noted that the polystyrene-conversion weight average molecular weight is determined by gel permeation chromatography (e.g., HLC-8029 manufactured by Tosoh Corporation) using tetrahydrofuran as an eluent.

The binder-type epoxy compound has limitations on the amount of epoxy groups which can be introduced into a molecule of the copolymer. However, by adding the polyfunctional epoxy compound having a relatively small molecular weight to the resin composition, it is possible to supply epoxy groups to the resin composition and therefore to increase the concentration of an epoxy reactive site, thereby increasing the crosslink density of the resin composition. The polyfunctional epoxy compound can be appropriately selected from among the above-mentioned polyvalent epoxy compounds.

Examples of the curing agent include polyvalent carboxylic anhydrides and polyvalent carboxylic acids. These polyvalent carboxylic anhydrides and polyvalent carboxylic acids can be used singly or in combination of two or more of them.

In a case where the thermosetting functional group is an epoxy group, the amount of the curing agent contained in the thermosetting binder system is usually in the range of 1 to 100 parts by weight, preferably in the range of 5 to 50 parts by weight per 100 parts by weight of an epoxy group-containing component (monomer and resin). If the blending amount of the curing agent is less than 1 part by weight, the black resin composition is insufficiently cured and therefore a tough coating film of the black resin composition cannot be formed. On the other hand, if the amount of the curing agent exceeds 100 parts by weight, a coating film of the black resin composition cannot have a uniform thickness and a smooth surface and, in addition, adhesion between the coating film and a substrate is poor.

As described above, the thermosetting binder system according to the present invention may further contain a catalyst which can accelerate thermal curing reaction between, for example, an acid and an epoxy to improve the hardness and heat-resistance of a cured resin layer of the black resin composition. As such a catalyst, a heat-latent catalyst activated by heating for curing can be used.

The heat-latent catalyst exhibits its catalytic activity when it is heated, and is added to the thermosetting binder system if necessary to accelerate curing reaction and impart good properties to a cured product. As such a heat-latent catalyst, one exhibiting acid catalytic activity at a temperature of 60° C. or higher is preferably used. Examples of such a heat-latent acid catalyst include compounds obtained by neutralizing a proton acid with a Lewis base, compounds obtained by neutralizing a Lewis acid with a Lewis base, mixtures of a Lewis acid and a trialkylphosphate, sulfonic acid esters, and onium compounds. For example, various compounds described in, for example, JP-A No. 4-218561 can be used.

The total amount of the curable binder system contained in the black resin composition for display device is preferably in the range of 15 to 67 parts by weight, more preferably in the range of 25 to 62 parts by weight per 100 parts by weight of the solid content of the black resin composition for display device.

<Other Components>

(Solvent)

The black resin composition for display device according to the present invention usually contains a solvent to have good coating properties.

Examples of a solvent to be used in the present invention include organic solvents such as alcohol-based solvents (e.g., methyl alcohol, ethyl alcohol, N-propyl alcohol, and i-propyl alcohol); cellosolve-base solvents (e.g., methoxy alcohol and ethoxy alcohol); carbitol-based solvents (e.g., methoxyethoxy ethanol and ethoxyethoxy ethanol); ester-based solvents (e.g., ethylacetate, butyl acetate, methyl methoxy propionate, ethyl ethoxypropionate, and ethyl lactate); ketone-based solvents (e.g., acetone, methyl isobutyl ketone, and cyclohexanone); cellosolve acetate-based solvents (e.g., methoxyethylacetate, methoxypropylacetate, methoxybutylacetate, ethoxyethylacetate, and ethylcellosolve acetate); carbitol acetate-based solvents (e.g., methoxyethoxyethylacetate and ethoxyethoxyethylacetate); ether-based solvents (e.g., diethyl ether, ethyleneglycoldimethyl ether, diethyleneglycoldimethyl ether, and tetrahydrofuran); aprotic amide solvents (e.g., N,N-dimethylformamide, N,N-dimethylacetamide, and N-methylpyrrolidone); lactone-based solvents (e.g., ε-butyrolactone); unsaturated hydrocarbon-based solvents (e.g., benzene, toluene, xylene, and naphthalene); saturated hydrocarbon-based solvents (e.g., N-heptane, N-hexane, and N-octane). Among these solvents, cellosolve acetate-based solvents such as methoxyethylacetate, ethoxyethylacetate, and ethylcellosolveacetate, carbitol acetate-based solvents such as methoxyethoxyethylacetate and ethoxyethoxyethylacetate, ether-based solvents such as ethyleneglycoldimethyl ether, diethyleneglycoldimethyl ether, and propyleneglycoldiethyl ether, and ester-based solvents such as methyl methoxypropionate, ethyl ethoxypropionate, and ethyl lactate are preferred. More preferred are MBA (acetic acid-3-methoxybutyl, $CH_3CH(OCH_3)CH_2CH_2OCOCH_3$), PGMEA (propyleneglycol monomethyl ether acetate, $CH_3OCH_2CH(CH_3)OCOCH_3$), DMDG (diethyleneglycol dimethyl ether, $H_3COC_2H_4OCH_3$), diethyleneglycol methyl ethyl ether, or mixtures thereof.

These solvents can be used singly or in combination of two or more of them. The solid content of the black resin composition for display device according to the present invention is adjusted to 5 to 70 wt % by using the solvent.

If necessary, the black resin composition for display device according to the present invention may further contain one or more of a dispersing agent, a surfactant, an adhesion accelerator, a UV blocking agent, a UV absorbing agent, a surface conditioning (leveling) agent, and other components.

(Pigment Dispersant)

If necessary, the black resin composition for display device according to the present invention may contain a pigment dispersant to achieve good dispersion of a pigment such as the titanium oxynitride. Examples of such a pigment dispersant include cationic, anionic, nonionic, ampholytic, silicone-based, and fluorine-based surfactants. Among these surfactants, the following polymer surfactants (polymer dispersants) are preferred.

As described above, the dispersant is added to the black resin composition for display device if necessary to achieve good dispersion of a coloring agent. Specific examples of such a dispersant include amide compounds such as nonanamide, decanamide, dodecanamide, N-dodecylhexadecanamide, N-octadecylpropionamide, N,N-dimethyldodecanamide, and N,N-dihexylacetamide; amine compounds such as diethylamine, diheptylamine, dibutylhexadecylamine, N,N,N',N'-tetramethylmethanamine, triethylamine, tributylamine, and trioctylamine; hydroxyl group-containing amines such as monoethanolamine, diethanolamine, triethanolamine, N,N,N',N'-(tetrahydroxyethyl)-1,2-diaminoethane, N,N,N'-tri(hydroxyethyl)-1,2-diaminoethane, N,N,N',N'-tetra(hydroxyethylpolyoxyethylene)-1,2-diaminoethane, 1,4-bis(2-hydroxyethyl)piperazine, and 1-(2-hydroxyethyl)piperazine; compounds such as nipecotamide, isonipecotamide, and nicotinic acid amide.

Specific examples further include unsaturated carboxylic acid ester (co)polymers such as polyacrylic acid esters; (partial)amine salts, (partial)ammonium salts, and (partial)alkylamine salts of unsaturated carboxylic acid (co)polymers such as polyacrylic acid; hydroxyl group-containing unsaturated carboxylic acid ester (co)polymers, such as hydroxyl group-containing polyacrylic acid esters, and modified products thereof; polyurethanes; unsaturated polyamides; polysiloxanes; long-chain polyaminoamide phosphates; and amides obtained by reaction between a poly(lower alkyleneimine) and a free carboxyl group-containing polyester and salts thereof.

Examples of a commercially available dispersant include Disperbyk-101, -116, -130, -140, -160, -161, -162, -163, -164, -166, -167, -168, -170, -171, -174, -182, -2000, -2001, and -2050 (manufactured by BYK Japan K.K.), EFKA-4046 and -4047 (manufactured by EFAK CHEMICALS), Solsperse 12000, 13240, 13940, 17000, 20000, 24000GR, 24000SC, 27000, 28000, 32000, 33500, 33500, 35200, and 37500 (manufactured by Lubrizol Japan Ltd.); and Ajisper PB711, 821, and 822 (manufactured by Ajinomoto Fine-Techno. Co., Inc.).

These pigment dispersants can be used singly or in combination of two or more of them. The amount of the pigment dispersant contained in the black resin composition for display device greatly varies depending on the concentration of the curable binder system and the concentration of the pigment, and is therefore appropriately determined. The amount of the pigment dispersant contained in the black resin composition for display device is not particularly limited, but is preferably in the range of 3 to 33 parts by weight, more preferably in the range of 5 to 30 parts by weight per 100 parts by weight of the pigment contained in the black resin composition for display device.

(Pigment)

If necessary, the black resin composition for display device according to the present invention may contain another pigment. Specific examples of another pigment include carbon black, Cu—Fe—Mn-based oxides, synthesized iron black, anthraquinone-based pigments, phthalocyanine-based pigments, benzoimidazolone-based pigments, quinacridone-based pigments, azochelate-based pigments, azo-based pigments, isoindolinone-based pigments, pyranthrone-based pigments, indanthrone-based pigments, anthrapyrimidine-based pigments, dibromoanzanthrone-based pigments, flavanthrone-based pigments, perylene-based pigments, perynone-based pigments, quinophtharone-based pigments, thioindigo-based pigments, and dioxazine-based pigments. These pigments can be used singly or in combination of two or more of them.

Among these pigments, carbon black is preferred, and the amount of carbon black contained in the black resin composition is preferably in the range of 3 to 20 wt %, more preferably in the range of 5 to 15 wt % with respect to the total amount of a pigment including the titanium oxynitride described above. In this case, the black resin composition for display device can effectively reduce colored reflected light (yellowish red) while achieving a high optical density even in the form of a thin film and maintaining its patterning ability. Such carbon black to be used in combination with the titanium oxynitride is not particularly limited, but preferably has an average particle diameter of 20 nm to 50 nm.

Examples of commercially-available carbon black include #260, #25, #30, #32, #33, #40, #44, #45, #45L, #47, #50, #52, MA7, MA8, MA11, MA100, MA100R, MA100S, and MA230 (manufactured by Mitsubishi Chemical Corporation), Printex A, Printex L, Printex P, Printex 30, Printex 35, Printex 40, Printex 45, Printex 55, Printex 60, Printex 300, Printex 350, Special Black 4, Special Black 350, and Special Black 550 (manufactured by DEGUSSA), Raven1255, Raven1250, Raven1200, Raven1080 ULTRA, Raven1060 ULTRA, Raven1040, Raven1035, and Raven1020 (manufactured by Columbia Carbon Japan).

The effect of reducing colored reflected light can be evaluated in the following manner. The black resin composition for display device according to the present invention having a P/V ratio of, for example, 1.8 is applied onto a glass substrate to form a coating film having a thickness of 0.8 μm, and the visible light reflection spectrum of the coating film is measured from the glass substrate side using a UV visible spectrophotometer (UV-2550, Shimadzu Corporation) over the wavelength range of 400 to 800 nm at an incident angle of 5°.

(Surfactant)

In the present invention, various kinds of surfactants may be used in combination to improve the dispersion stability of the black resin composition for display device. These surfactants can be selected from among cationic surfactants, anionic surfactants, nonionic surfacetants, ampholytic surfactants, silicone-based surfactants, fluorine-based surfactants, and the like. Specific examples of these surfactants include polyoxyethylene alkyl ethers such as polyoxyethylenelauryl ether, polyoxyethylenestearyl ether, and polyoxyethyleneoleyl ether; polyoxyethylenealkylphenyl ethers such as polyoxyethylene-n-octylphenyl ether and polyoxyethylene-n-nonylphenyl ether; polyethylene glycol diesters such as polyethylene glycol dilaurate and polyethylene glycol distearate; sorbitan fatty acid esters; fatty acid-modified polyesters; tertiary amine-modified polyurethanes; and polyethyleneimines.

Examples of a commercially-available surfactant include KP (manufactured by Shin-Etsu Chemical Co., Ltd.), Polyflow (manufactured by Kyoeisha Chemical Co., Ltd.), EFTOP (manufactured by Tohkem Products Corporation), Megafac (DAINIPPON INK AND CHEMICALS, INCORPORATED), Fluorad (manufactured by Sumitomo 3M Limited), and AsahiGuard and Surflon (manufactured by Asahi Glass Co., Ltd.).

(Others)

a) Adhesion Accelerator

Examples of the adhesion accelerator include vinyltrimethoxysilane, vinyltriethoxysilane, vinyltris(2-methoxyethoxy)silane, and N-(2-aminoethyl)-3-aminopropylmethyldimethoxysilane.

b) UV Absorber

Examples of the UV absorber include 2-(3-t-butyl-5-methyl-2-hydroxyphenyl)-5-chlorobenzotriazole and alkoxybenzophenone.

c) Leveling Agent

Examples of the leveling agent include commercially-available silicone-based, polyoxyalkylene-based, fatty acid ester-based, and special acrylic polymers.

In the black resin composition for display device according to the present invention, the weight ratio between a pigment (P) including the titanium oxynitride particles described above and solid content (V) except for the pigment (i.e., P/V) is preferably in the range of 0.1 to 5.0, more preferably in the range of 0.5 to 3.0, particularly preferably in the range of 0.6 to 2.6.

<Method for Producing Black Resin Composition for Display Device>

The black resin composition for display device according to the present invention can be produced by adding the titanium oxynitride, the binder system, and if necessary, one or more other components into a single solvent or a mixed solvent and mixing them to dissolve or disperse a solid component in the solvent by a known dispersion method.

However, in the case of using such a method, there is a possibility that a large amount of a pigment such as the titanium oxynitride cannot be sufficiently dispersed in the solvent. For this reason, it is preferred that a pigment dispersion liquid is prepared in advance by dispersing a pigment such as the titanium oxynitride and, if necessary, a dispersant in a solvent, and a binder liquid is prepared in advance by dispersing or dissolving one or more other components such as the binder system in a solvent. And, the obtained pigment dispersion liquid and binder liquid are mixed and then, if necessary, the mixture is subjected to dispersion treatment. By doing so, it is possible to easily obtain a black resin composition for display device excellent in dispersibility of a pigment such as the titanium oxynitride.

In a case where the pigment dispersion liquid is not prepared in advance, first, a pigment such as the titanium oxynitride and, if necessary, a dispersant are added to a solvent, and they are sufficiently mixed by stirring to disperse the pigment such as the titanium oxynitride particles in the solvent, and then one or more other components including the binder system are added thereto and mixed. By doing so, it is possible to disperse the pigment such as the titanium oxynitride in the solvent without being inhibited by one or more other components. In addition, it is also possible to obtain a black resin composition for display device having excellent stability.

Examples of a dispersion machine used for dispersion treatment include roll mills such as a two-roll mill and a three-roll mill, ball mills such as a ball mill and a vibration ball mill, paint conditioners, and bead mills such as a continuous disk type bead mill and a continuous annular type bead mill. The diameter of beads used in a bead mill is preferably in the range of 0.03 to 2.00 mm, more preferably in the range of 0.10 to 1.0 mm.

<Resin Coating Film for Display Device>

In a case where the thus obtained black resin composition for display device has photosensitivity and alkali-developability, the black resin composition is applied onto a support material to form a coating film, and the coating film is dried and irradiated with light corresponding to a predetermined pattern to cause difference in alkali solubility between a light-exposed portion and a light-unexposed portion by, for example, selectively curing a part of the coating film, and the coating film is developed with an alkali solution to obtain a black coating film having a predetermined pattern.

On the other hand, in a case where the obtained black resin composition for display device is heat-curable or does not have alkali-developability, the black resin composition is selectively attached to a predetermined region on a support material by an ink-jet method, a thermal transfer method, or the like, and is then cured by heating or light irradiation to obtain a black coating film having a predetermined pattern.

As the light used for curing reaction, one having a wavelength, at which the reaction of the photosensitive binder system occurs, is appropriately selected from among UV rays, radioactive rays such as ionizing radiation, and visible light. Irradiation energy required for curing is usually in the range of about 10 to 500 mJ/m$^2$. In the light exposure step, the surface of the coating film is irradiated with laser light or irradiated with light through a mask to allow the predetermined position of the coating film to be selectively exposed to light and cured.

The conditions of heat-curing vary depending on the kind of binder system used. However, heat-curing is usually performed at about 120 to 400° C. using a vacuum drier, an oven, a hot plate, or another device capable of applying heat, after drying at 50 to 200° C.

The resin coating film for display device formed using the black resin composition according to the present invention can achieve a high optical density even when the titanium oxynitride content thereof is relatively low. Therefore, the resin coating film for display device formed using the black resin composition according to the present invention can achieve a sufficient optical density even when the thickness thereof is smaller than ever before, or can achieve a higher optical density when the thickness thereof is the same as before.

More specifically, the resin coating film can have an optical density (OD value) of 4.0 or higher when the film thickness thereof is 0.7 μm. It is to be noted that in the present invention, the film thickness refers to an average thickness, and is measured by, for example, a stylus film thickness meter (manufactured by KLA TENCOR Corporation.). It is also to be noted that the optical density (OD value) is determined from a stimulus value Y in the XYZ color system using the following formula:

$$OD = -\log_{10}(Y/100)$$

The black resin composition according to the present invention can be used for forming various black coating films, but is particularly suitable for forming a member for display device for use in display devices, especially a light-blocking layer (black matrix) of a color filter or the like because it has the advantage that fine patterning can be carried out. The black resin composition according to the present invention is suitable also for forming a member for optical device such as a color filter for use in image input devices such as a solid-state image sensor and the like.

<Member for Display Device>

A member for display device according to the present invention has a light-blocking layer formed using the black resin composition for display device according to the present invention.

As described above, since the member for display device according to the present invention has a light-blocking layer formed using the black resin composition for display device according to the present invention, the light-blocking layer can have a sufficient optical density even in the form of a thin film. Therefore, the member for display device according to the present invention can be used for thinner higher-performance optical devices. In addition, the use of the member for display device according to the present invention can reduce unevenness of display because a level difference in its pixel part can be reduced.

Figure 3:
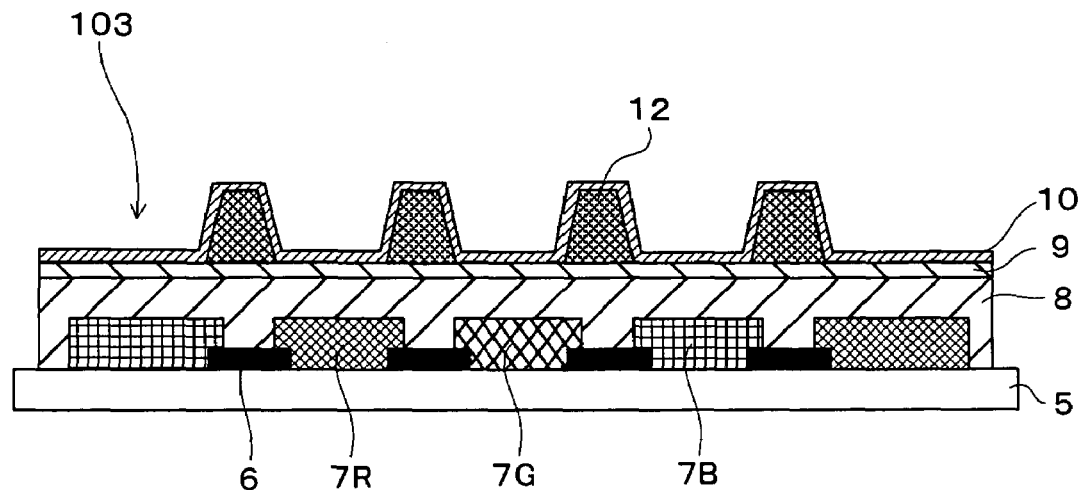
FIG. 3 is a schematic sectional view of an example of a color filter according to the present invention.
Figure 4:
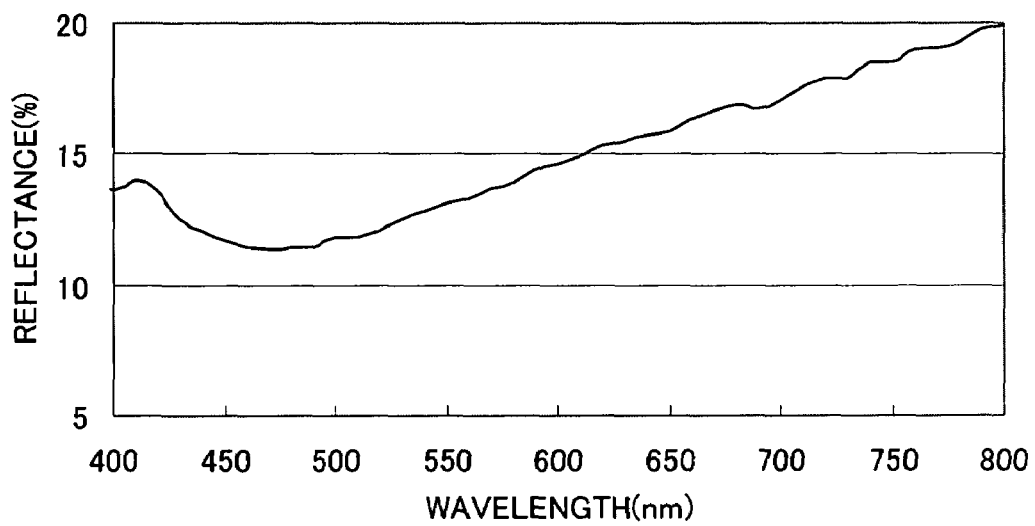
FIG. 4 is a graph showing the visible light reflectance of titanium oxynitride (sample A) obtained in Production Example 1.
Figure 5:
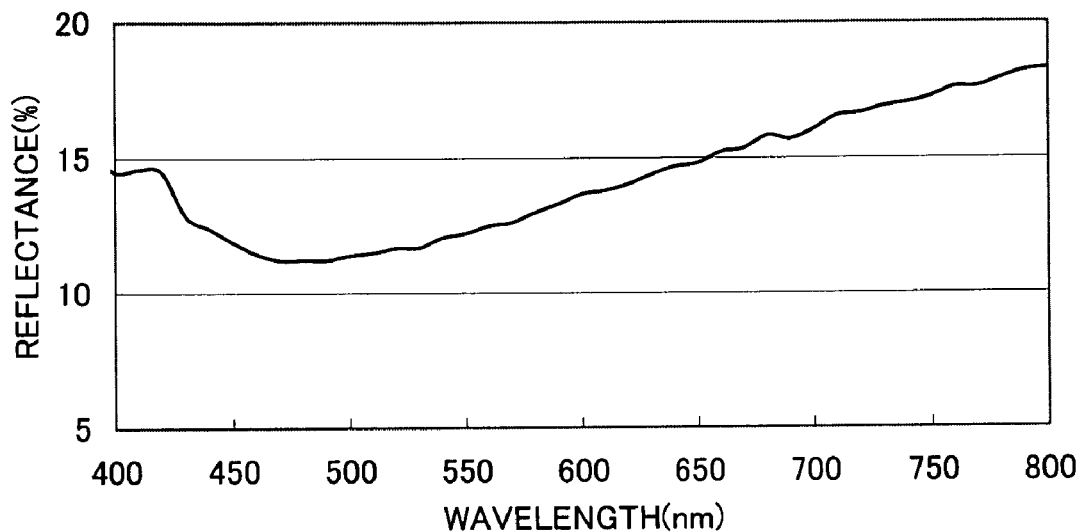
FIG. 5 is a graph showing the visible light reflectance of titanium oxynitride (sample B) obtained in Production Example 2.
Figure 6:
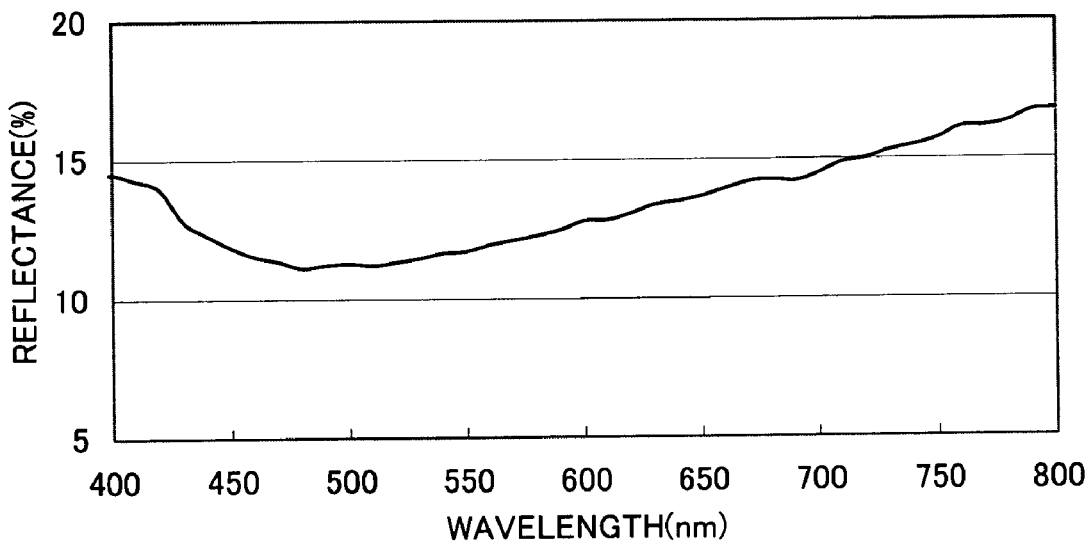
FIG. 6 is a graph showing the visible light reflectance of titanium oxynitride (sample C) obtained in Production Example 3.
Figure 7:
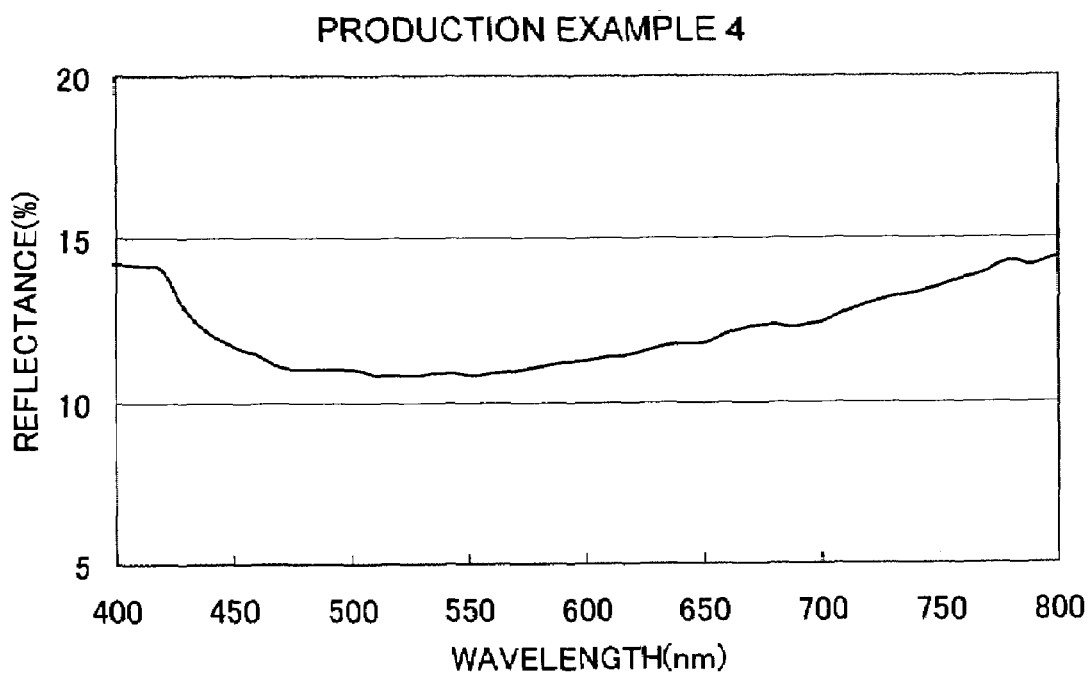
FIG. 7 is a graph showing the visible light reflectance of titanium oxynitride (sample D) obtained in Production Example 4.
Figure 8:
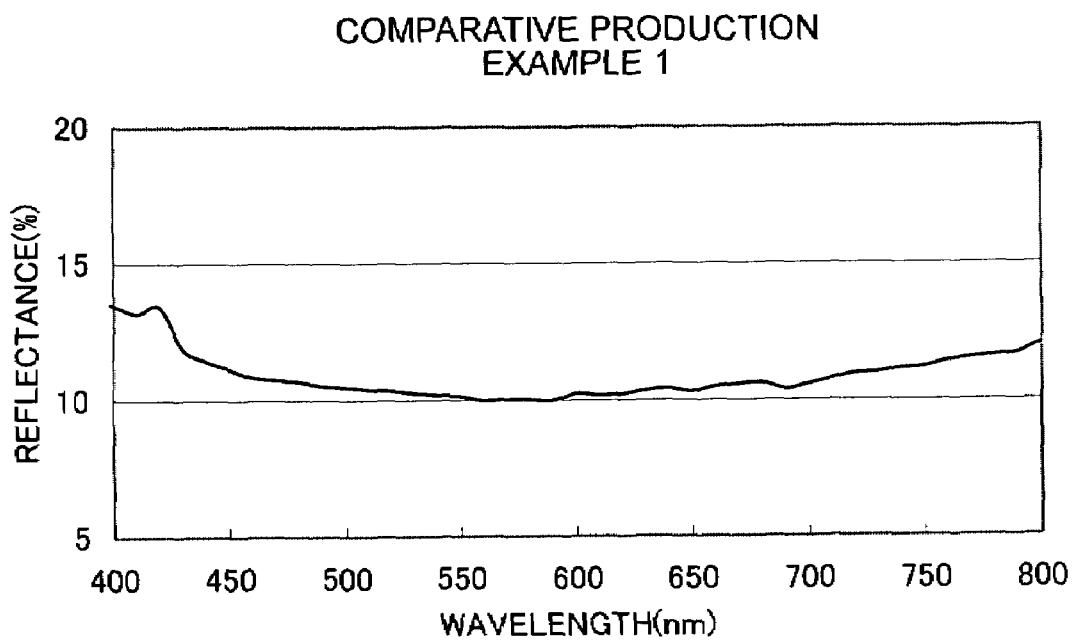
FIG. 8 is a graph showing the visible light reflectance of titanium oxynitride (sample E) obtained in Comparative Production Example 1.
Figure 9:
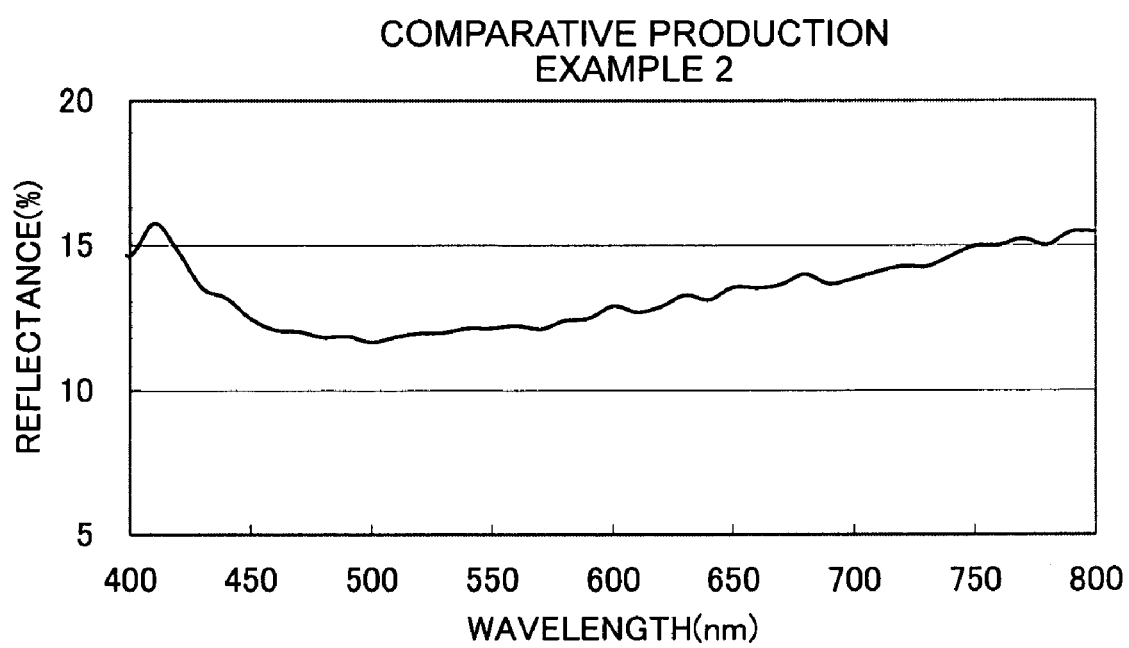
FIG. 9 is a graph showing the visible light reflectance of commercially available titanium black (manufactured by Mitsubishi Materials Corporation under the trade name of "13M-C")

FIG. 3 is a sectional view of an example of a color filter for display device (i.e., a color filter 103) belonging to the member for display device according to the present invention.

The color filter 103 has a light-blocking layer 6 formed on a transparent substrate 5 so as to have a predetermined pattern, a colored layer 7 (7R, 7G, 7B) formed on the light-blocking layer so as to have a predetermined pattern, and a protective film 8 formed so as to cover the colored layer. If necessary, a transparent electrode 9 for driving a liquid crystal may be formed on the protective film. On the innermost side of the color filter 103, in this case, on the surface of the transparent electrode, there is provided an oriented film 10.

A column-shaped spacer 12 is one example of a convex spacer, and the plurality of column-shaped spacers 12 are formed on the transparent electrode 9 at predetermined positions in a region corresponding to the region where the light-blocking layer 6 is formed (i.e., undisplayed region). The column-shaped spacers 12 are formed on the transparent electrode 9 or the colored layer 7 or the protective film 8. In the color filter 103 shown in FIG. 3, the column-shaped spacers 12 and the transparent electrode 9 formed on the protective film 8 have a sea-island structure in which the spacers 12 are islands, but the protective film 8 and the column-shaped spacers 12 may be formed integrally. In this case, the transparent electrode is formed so as to cover the protective film 8 and the column-shaped spacers 12.

Examples of a material of the transparent substrate 5 of the color filter 101 include transparent rigid materials not having flexibility such as silica glass, Pyrex (trade mark) glass, and synthesized quartz plates and transparent flexible materials having flexibility such as transparent resin films and optical resin plates. Among these materials, 1737 glass (manufactured by Corning Incorporated) is suitable for producing a color filter because it is an alkali-free glass containing no alkali component and has a small thermal expansion coefficient and excellent dimension stability and workability for high-temperature heat treatment.

The light-blocking layer 6 is formed so as to fill spaces between the colored layers 7R, 7G, and 7B and to surround a colored layer-forming region in order to improve the contrast of display images. In the present invention, the light-blocking layer 6 is formed using the black resin composition for display device according to the present invention containing light-blocking particles.

In a case where the black resin composition for display device according to the present invention has photosensitivity and alkali-developability, first, the black resin composition is applied onto the transparent substrate 5 and, if necessary, dried to form a photosensitive coating film, and then the coating film is exposed to light through a photo mask for a light-blocking layer, developed, and, if necessary, heat-treated to form a light-blocking layer 6.

On the other hand, in a case where the black resin composition for display device according to the present invention is heat-curable or does not have alkali-developability, the black resin composition is selectively attached to a predetermined region on the transparent substrate 5 by an ink-jet method, thermal transfer, or the like, and is then cured by heating or light irradiation to form a light-blocking layer 6.

The thickness of the light-blocking layer varies depending on the kind of member for display device to which it is applied, but is usually in the range of about 0.5 to 2.5 μm. However, in the present invention, since the light-blocking layer is formed using the black resin composition according to the present invention, the light-blocking layer can have a sufficient light-blocking effect even in the form of a thin film. Therefore, it is possible to reduce the thickness of the light-blocking layer to 0.3 to 1.0 μm that is smaller than ever before. Assuming that a conventional light-blocking layer needs to have a thickness of about 1.5 μm, about 0.7 μm thickness is sufficient for the light-blocking layer according to the present invention to obtain the same light-blocking effect.

The colored layer 7 provides a display region, in which a red pattern, a green pattern, and a blue pattern are arranged in a desired pattern form such as a mosaic type, a stripe type, a triangle type, or a four pixel arrangement type. The colored layer 7 can be formed by a known method such as a pigment dispersion method, a dyeing method, a printing method, or an electrodeposition method. Among these methods, a pigment dispersion method using a curable resin composition containing a coloring agent such as a pigment is preferably used.

In the case of using such a pigment dispersion method, first, coloring agents such as pigments are separately dispersed in a curable resin composition to prepare photocurable colored resin compositions for red, green, and blue, respectively. Then, any one of the photocurable colored resin compositions, for example, the photocurable red resin composition is applied onto the transparent substrate 5 by a known method such as spin-coating so as to cover the light-blocking layer 6 to form a photocurable red resin layer. The photocurable red resin layer is exposed to light through a photo mask for red pattern, alkali-developed, and heat-cured in, for example, a clean oven to form a red colored layer 7R. Thereafter, the photocurable colored resin compositions for green and blue are used in order to form a green colored layer 7G and a blue colored layer 7B by patterning in the same manner as in the case of the red colored layer 7R.

Figure 2:
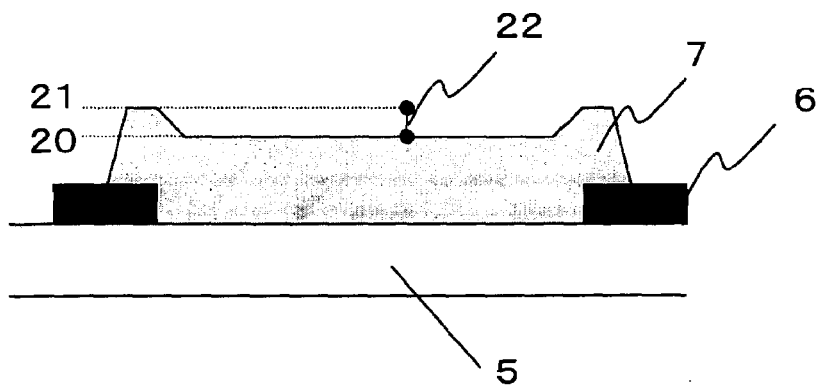
FIG. 2 is a schematic sectional view for explaining a level difference in a pixel part of a color filter.

The thickness of the colored layer is usually in the range of about 0.5 to 2.5 μm. According to the present invention, it is possible to reduce the thickness of the light-blocking layer 6, thereby reducing a level difference in the colored layer shown in FIG. 2. For example, a level difference 22 between a surface 20 of the colored layer and a top 21 of a part of the colored layer overlapping the light-blocking layer can be reduced to 0.05 to 0.30 μm. By reducing the level difference in the colored layer, it is possible to obtain a member for display device which can reduce unevenness of display of a display device.

The protective film 8 is provided to planarize the surface of the color filter and to prevent the leakage of the components contained in the colored layer 7 into a liquid crystal layer. The protective film 8 can be formed by applying a known negative-type photocurable transparent resin composition or thermosetting transparent resin composition onto the light-blocking layer 6 and the colored layer 7 by spin-coating, roll-coating, spray-coating or printing so as to cover these layers and curing the resin composition by light irradiation or heating.

It is to be noted that according to the present invention, as described above, since a level difference in the colored layer can be reduced, it is possible to obtain a member for display device which can reduce unevenness of display without providing the protective film for planarization. For this reason, in the present invention, the protective film can be omitted.

In the case of providing the protective film, the thickness of the protective film is determined in consideration of, for example, the light transmittance of the resin composition and the surface condition of the color filter. For example, the thickness of the protective film is set to about 0.1 to 2.0 μm. In the case of forming the protective film using a spin coater, the rotation number of the spin coater is set within the range of 500 to 1,500 rotations/min.

The transparent electrode film 9 on the protective film is formed by a method generally used, such as sputtering, vacuum deposition, or CVD, using indium tin oxide (ITO), zinc oxide (ZnO), tin oxide (SnO), or an alloy thereof, and if necessary, has a predetermined pattern formed by etching using a photoresist or by using a tool. The thickness of the transparent electrode is in the range of about 20 to 500 nm, preferably in the range of about 100 to 300 nm.

The plurality of convex spacers are provided in a non-display region on the substrate to maintain a cell gap when the color filter 103 is bonded to a liquid crystal driving side substrate such as a TFT array substrate. The shape and size of the convex spacers are not particularly limited as long as the spacers can be selectively provided in a non-display region on the substrate and can be maintain a cell gap over the entire substrate. In the case of forming the column-shaped spacers 12 shown in the figure as such convex spacers, the spacer 12 has a constant height within the range of about 2 to 10 μm, and the projection height thereof (i.e., the thickness of a pattern) is appropriately determined depending on, for example, the desired thickness of a liquid crystal layer. In addition, the width of the column-shaped spacer 12 is appropriately determined within the range of about 5 to 20 μm. The density of the column-shaped spacers 12 is appropriately determined in consideration of, for example, thickness variations in a liquid crystal layer, an aperture ratio, the form of the column-shaped spacer, and the material of the column-shaped spacer. For example, a necessary and sufficient spacer function can be obtained by providing one column-shaped spacer 12 per one set of red, green, and blue pixels. The shape of the column-shaped spacer 12 is not particularly limited as long as it has a column shape, and examples of such a column shape include a cylindrical shape, a prismatic shape, and a truncated cone or pyramid shape.

Such a convex spacer can be formed using a curable resin composition. More specifically, first, a coating liquid of a curable resin composition is directly applied onto the transparent substrate or is applied onto another layer such as the transparent electrode on the transparent substrate by spin-coating, roll-coating, spray-coating, or printing, and is then dried to form a photocurable resin layer. As in the case of forming the protective film, the rotation number of a spin coater can be determined within the range of 500 to 1,500 rotations/min. Then, the resin layer is exposed to light through a photo mask for convex spacer, and is then developed with a developer such as an alkali developer to form a predetermined convex pattern. If necessary, the convex pattern may be further heat-treated (post-baked) in a clean oven or the like. In this way, convex spacers are formed.

The convex spacers can be directly provided on the color filter or indirectly provided on another layer formed on the color filter. For example, the convex spacers may be formed on the transparent electrode, such as an ITO electrode, or the protective film formed on the color filter, or may be formed on the transparent electrode formed on the protective film formed on the color filter.

The orientation film 10 is provided on the inner side of the color filter so as to cover a display region containing the colored layer 7 and a non-display region containing the light-blocking layer 6 and the column-shaped spacers 12. The orientation film can be formed by applying a coating liquid containing a resin such as a polyimide resin by a known method such as spin-coating to form a coating film, and drying the coating film, and if necessary, curing the coating film by heating or light irradiation, and rubbing the coating film.

The thus obtained color filter 103 (i.e., a display side substrate) is faced toward a TFT array substrate (i.e., a liquid crystal driving side substrate), and these substrates are bonded in combination using a sealant provided along the periphery of inside surfaces of the substrates with a cell gap having a predetermined distance being maintained. Then, the gap between both the substrates is filled with a liquid crystal and is then sealed to obtain an active matrix-type color liquid crystal display device belonging to a liquid crystal panel.

EXAMPLES

Production Example 1

1. Coating of Titanium Dioxide with Silicon Oxide 300 g (TiO$_2$ conversion) of hydrous titanium dioxide was suspended in a liter of water to prepare a slurry, and then the slurry was adjusted to pH 10 with an aqueous sodium hydroxide solution. Then, the slurry was heated to 70° C., and then an aqueous sodium silicate solution was added dropwise into the slurry in 2 hours. Then, the slurry was heated to 90° C., and then dilute sulfuric acid was added dropwise into the slurry in 2 hours to neutralize the slurry to pH 5, and was left standing for 30 minutes. Then, the slurry was dehydrated, washed, and baked at 850° C. for 5 hours in the air to obtain titanium dioxide coated with dense silicon oxide (0.3 wt % as SiO$_2$). The thus obtained titanium dioxide was of an anatase type.

2. Reduction Baking of Titanium Dioxide

Next, the titanium dioxide coated with silicon oxide was placed in a quartz tube having an inner diameter of 7.5 cm, and the quartz tube was heated at 980° C. for 6 hours while an ammonia gas was flown into the quartz tube at a flow rate of 10 liters/min. Then, the thus obtained product was cooled to 100° C. in the same atmosphere, and was further cooled to room temperature in the air to obtain titanium oxynitride (sample A) according to the present invention represented by the composition formula:

$TiN_{0.95}O_{0.20} \cdot 0.1SiO_2$.

Production Example 2

Hydrous titanium dioxide was baked in the air at 850° C. for 5 hours to obtain titanium dioxide not coated with silicon oxide. The thus obtained titanium dioxide was of a rutile type. The titanium dioxide not coated with silicon oxide was placed in a quartz tube having an inner diameter of 7.5 cm, and the quartz tube was heated at 980° C. for 3 hours while an ammonia gas was flown into the quartz tube at a flow rate of 10 liters/min. Then, the thus obtained product was cooled to 100° C. in the same atmosphere, and was further cooled to room temperature in the air. The product was analyzed by X-ray diffraction, and as a result, peaks assigned to titanium oxynitride were observed but peaks assigned to rutile-type titanium oxide were also partially observed. Then, the product was against placed in the quartz tube having an inner diameter of 7.5 cm, and the quartz tube was heated at 980° C. for 3 hours while an ammonia gas was flown into the quartz tube at a flow rate of 10 liters/min. Then, the thus obtained product was cooled to 100° C. in the same atmosphere, and was further cooled to room temperature in the air to obtain titanium oxynitride (sample B) according to the present invention represented by the composition formula:

$TiN_{0.96}O_{0.19} \cdot 0SiO_2$.

Production Example 3

Titanium oxynitride (sample C) according to the present invention represented by the composition formula:

$TiN_{0.93}O_{0.31} \cdot 0.01SiO_2$ was obtained in the same manner as in the Production Example 1 except that the time for reduction baking at 980° C. was changed to 3 hours.

Production Example 4

Titanium oxynitride (sample D) according to the present invention represented by the composition formula:

$TiN_{0.89}O_{0.48} \cdot 0.01SiO_2$ was obtained in the same manner as in the Production Example 1 except that the temperature for reduction baking was changed to 900° C. and the time for reduction baking was changed to 3 hours.

Comparative Production Example 1

Titanium dioxide was coated with silicon oxide (9 wt % as $SiO_2$) in the same manner as in the Production Example 1, and then the thus obtained titanium dioxide coated with silicon oxide was placed in a quartz tube having an inner diameter of 7.5 cm, and the quartz tube was heated at 900° C. for 3 hours while an ammonia gas was flown into the quartz tube at a flow rate of 10 liters/min. Then, the thus obtained product was cooled to 100° C. in the same atmosphere, and was further cooled to room temperature in the air to obtain titanium oxynitride (sample E) represented by the composition formula:

$TiN_{0.88}O_{0.64} \cdot 0.11SiO_2$.

Comparative Production Example 2

Commercially-available titanium black (manufactured by Mitsubishi Materials Corporation under the trade name of "13M-C") represented by the composition formula: $TiN_{0.75}O_{0.58} \cdot 0.001SiO_2$ was used as a comparative sample F.

Production Example 5

1. Coating of Titanium Dioxide with Silicon Oxide 300 g ($TiO_2$ conversion) of hydrous titanium dioxide was suspended in a liter of water to prepare a slurry, and then the slurry was adjusted to pH 10 with an aqueous sodium hydroxide solution. Then, the slurry was heated to 70° C., and then an aqueous sodium silicate solution was added dropwise into the slurry in 2 hours. Then, the slurry was heated to 90° C., and then dilute sulfuric acid was added dropwise into the slurry in 2 hours to neutralize the slurry to pH 5, and was left standing for 30 minutes. Then, the slurry was dehydrated, washed, and baked in the air at 850° C. for 5 hours to obtain titanium dioxide coated with dense silicon oxide (0.3 wt % as $SiO_2$). The thus obtained titanium dioxide was of an anatase type.

2. Reduction Baking of Titanium Dioxide

Next, the titanium dioxide coated with silicon oxide was placed in a SUS310 tube having an inner diameter of 25.5 cm, and the SUS310 tube was heated at 980° C. for 3 hours while an ammonia gas was flown into the tube at a flow rate of 265 liters/min. Then, the thus obtained product was cooled to 100° C. in the same atmosphere, and was further cooled to room temperature in the air to obtain titanium oxynitride (sample G) according to the present invention whose nitrogen content was 20.0 wt %.

Production Example 6

27.5 g of the titanium oxynitride (sample G) obtained in the Production Example 5, 64 mL of water, and 161.8 g of zircon beads having a diameter φ of 0.5 mm were placed in a glass vessel, and the glass vessel was set in a paint conditioner (model #5110, Red Devil Equipment CO.) to grind the titanium oxynitride. Then, the zircon beads were removed to obtain a wet-ground slurry. The concentration of the wet-ground slurry was adjusted to 250 g/L with pure water, and the pH of the wet-ground slurry was adjusted to 7.0 with sulfuric acid. Then, 0.55 g of γ-glycidoxypropyltrimethoxysilane was added to the wet-ground slurry at room temperature, and the wet-ground slurry was left standing for 80 minutes. Then, the wet-ground slurry was heated to 80° C., stirred for 2 hours, adjusted to pH2.5, dehydrated, washed, and dried to obtain titanium oxynitride whose surface was treated with 2 wt % of γ-glycidoxypropyltrimethoxysilane (sample H).

Production Example 7

27.5 g of the titanium oxynitride (sample G) obtained in the Production Example 5, 64 mL of water, and 161.8 g of zircon beads having a diameter φ of 0.5 mm were placed in a glass vessel, and the glass vessel was set in a paint conditioner (model #5110, Red Devil Equipment CO.) to grind the titanium oxynitride. Then, the zircon beads were removed to obtain a wet-ground slurry. The concentration of the wet-ground slurry was adjusted to 250 g/L with pure water. Then, 0.55 g of isopropyltri(N-amidoethyl•aminoethyl) titanate was added to the wet-ground slurry at room temperature, and the wet-ground slurry was left standing for 20 minutes. Then, the slurry was dehydrated, washed, and dried to obtain titanium oxynitride whose surface was treated with 2 wt % of isopropyltri(N-amidoethyl•aminoethyl)titanate (sample I).

Production Example 8

27.5 g of the titanium oxynitride (sample G) obtained in the Production Example 5, 64 mL of water, and 161.8 g of zircon beads having a diameter φ of 0.5 mm were placed in a glass vessel, and the glass vessel was set in a paint conditioner (model #5110, Red Devil Equipment CO.) to grind the titanium oxynitride. Then, the zircon beads were removed to obtain a wet-ground slurry. The concentration of the wet-ground slurry was adjusted to 250 g/L with pure water. Then, a mixed solution of 0.55 g of isopropyltris(dioctylpyrophosphate) titanate and 0.27 g of triethylamine was added to the wet-ground slurry at room temperature, and then the wet-ground slurry was left standing for 20 minutes, neutralized to pH 4.5 with sulfuric acid, dehydrated, washed, and dried to obtain titanium oxynitride whose surface was treated with 2 wt % of isopropyltris(dioctylpyrophosphate)titanate (sample J).

Production Example 9

27.5 g of the titanium oxynitride (sample G) obtained in the Production Example 5, 64 mL of water, and 161.8 g of zircon beads having a diameter φ of 0.5 mm were placed in a glass vessel, and the glass vessel was set in a paint conditioner (model #5110, Red Devil Equipment CO.) to grind the titanium oxynitride. Then, the zircon beads were removed to obtain a wet-ground slurry. The concentration of the wet-ground slurry was adjusted to 250 g/L with pure water, and then the wet-ground slurry was heated to 70° C. and adjusted to pH 10.5 with an aqueous sodium hydroxide solution. Then, an aqueous sodium aluminate solution was added dropwise into the wet-ground slurry in 20 minutes, and the wet-ground slurry was stirred for 20 minutes. Then, dilute sulfuric acid was added dropwise into the wet-ground slurry in 20 minutes, and the wet-ground slurry was neutralized to pH 7.5, and was left standing for 30 minutes. Then, the slurry was dehydrated, washed, and dried to obtain titanium oxynitride whose surface was treated with 0.5 wt % of aluminum hydroxide (sample K).

The composition and features of each of the samples A to F obtained in the Production Examples 1 to 4 and the Comparative Production Examples 1 and 2 are shown in Table 1-1 and the composition and features of each of the samples G to K obtained in the Production Examples 5 to 9 are shown in Table 1-2.

<Evaluation Methods>

(1) Composition

The titanium atom content and silicon atom content of each of the samples were measured by ICP emission spectrochemical analysis method (GVM-1014, Shimadzu Corporation). The oxygen atom content of each of the samples was measured by an inert gas carrier fusion-infrared absorption method (TC436AR, LECO Corporation), and the nitrogen atom content of each of the samples was measured using a carbon-hydrogen-nitrogen analyzer (vario EL III, Elementar). From the thus obtained measurement values, x and n were calculated. In a case where the sample contained silicon atoms, the silicon oxide content thereof was calculated assuming that silicon atoms were bonded with oxygen atoms to form silicon oxide ($SiO_2$). Then, the amount of oxygen atoms bonded with silicon atoms to form $SiO_2$ was subtracted from the oxygen content obtained by measurement, and the thus obtained value was defined as the oxygen atom content of $TiN_xO_y$ to calculate the value of y. From these calculated values, the composition formula of the sample, an O/N molar ratio, an O/N weight ratio, and the value of x+y were determined.

(2) X-Ray Diffraction

The sample was analyzed by X-ray diffraction (RINT 2200, Rigaku Corporation). The presence or absence of titanium dioxide in the sample was determined based on whether or not a diffraction peak at an angle of 2θ=25 to 26° (A-type) or 27 to 28° (R-type) assigned to titanium dioxide appeared. Further, the reflection angle of a main peak of the titanium oxynitride was determined. Further, the size of crystallites constituting the titanium oxynitride particles was determined from the half width of the main (first) peak at an angle 2θ of 40 to 45° using the above-described formula I (Scherrer's formula).

(3) Lightness and Hue 1.5 g of the sample was placed in a glass cylindrical cell (No. 1483, Nippon Denshoku K.K.), and the cell was set in a calorimeter (Color Meter ZE2000, Nippon Denshoku K.K.), and the color of the sample was measured from the bottom of the cell to determine the lightness and hue of the titanium oxynitride based on the Lab color system.

(4) Measurement of Reflectance 0.3 g of the titanium oxynitride powder was placed in a cylindrical cell (diameter: 16 mm, PSH-001, JASCO Corporation), and the cell was set in a UV visible spectrophotometer (V-570, JASCO Corporation) to measure the visible light reflection spectrum of the titanium oxynitride.

(5) Particle Diameter

The sample was photographed by an electron microscope (H-7000, Hitachi, Ltd.) to measure the average particle diameter thereof.

(6) Specific Surface Area

The specific surface area of the sample was measured by a simplified BET method using a specific surface area measuring instrument (Flow SorbII2300, Shimadzu Corporation).

(7) Oxidation Stability

The oxidation stability of the sample was measured based on the fact that the nitrogen content of titanium oxynitride is reduced by oxidation. The sample was left standing at room temperature for 1 month, and then the nitrogen content of the titanium oxynitride was measured. In a case where substantially no reduction in the nitrogen content of the titanium oxynitride was observed, the oxidation stability of the sample was evaluated as "good", and on the other hand, in a case where a significant reduction in the nitrogen content of the titanium oxynitride was observed, the oxidation stability of the sample was evaluated as "poor".

TABLE 1-1

|  | Production Example 1 | Production Example 2 | Production Example 3 | Production Example 4 | Comparative Production Example 1 | Comparative Production Example 2 |
|---|---|---|---|---|---|---|
| Composition formula | $TiN_{0.95}O_{0.20}$·$0.01SiO_2$ | $TiN_{0.96}O_{0.19}$·$0SiO_2$ | $TiN_{0.93}O_{0.31}$·$0.01SiO_2$ | $TiN_{0.89}O_{0.48}$·$0.01SiO_2$ | $TiN_{0.88}O_{0.64}$·$0.11SiO_2$ | $TiN_{0.75}O_{0.58}$·$0.001SiO_2$ |
| O/N molar ratio | 0.21 | 0.20 | 0.33 | 0.54 | 0.73 | 0.77 |
| Nitrogen content (wt %) | 20.9 | 21.1 | 19.4 | 18.2 | 15.8 | 15.6 |
| Oxygen content (wt %) | 5.3 | 4.9 | 7.6 | 11.5 | 17.7 | 14.1 |
| O/N weight ratio | 0.25 | 0.23 | 0.39 | 0.63 | 1.10 | 0.88 |
| x + y | 1.15 | 1.16 | 1.23 | 1.37 | 1.52 | 1.33 |
| Silicon oxide content (wt %) | 0.5 | 0.0 | 0.5 | 0.5 | 8.6 | 0.1 |
| Presence or absence of titanium dioxide by X-ray diffraction | Absent | Absent | Absent | Absent | Absent | Present (both R-type and A-type) |
| Reflection angle of main peak of titanium oxynitride by X-ray diffraction (°) | 42.9 | 42.9 | 43.0 | 43.2 | 43.1 | 43.0 |
| L-value | 12.8 | 12.4 | 10.2 | 8.1 | 6.5 | 10.6 |
| a-value | 3.2 | 3.7 | 3.0 | 2.2 | 0.6 | 1.8 |
| b-value | 3.9 | 3.2 | 1.5 | −1.2 | −2.0 | 0.0 |
| Light wavelength at which titanium oxynitride shows minimum reflectance (nm) | 470~480 | 470~490 | 480~500 | 540~550 | 560~600 | 500~530 |
| Minimum reflectance (%) | 11.2 | 11.2 | 11.2 | 10.7 | 9.9 | 11.8 |
| Optical reflectance at 650 nm (%) | 15.9 | 14.8 | 13.4 | 11.8 | 10.3 | 13.6 |
| Particle diameter (μm) | 0.03~0.10 | 0.03~0.10 | 0.03~0.08 | 0.03~0.08 | 0.01~0.03 | 0.03~0.10 |
| Specific surface area (m²/g) | 11.0 | 15.4 | 19.3 | 21.7 | 79.8 | 17.0 |
| Crystallite size (nm) | 20 | 21 | 22 | 22 | 16 | 26 |
| Oxidation stability | Good | Good | Good | Good | Good | Good |

TABLE 1-2

|  | Production Example 5 | Production Example 6 | Production Example 7 | Production Example 8 | Production Example 9 |
|---|---|---|---|---|---|
| Nitrogen content (wt %) | 20.0 | 19.3 | 19.3 | 19.5 | 18.7 |
| Silicon oxide content (wt %) | 0.5 | 0.5 | 0.5 | 0.5 | 0.5 |
| Presence or absence of titanium dioxide by X-ray diffraction | Absent | Absent | Absent | Absent | Absent |
| Reflection angle of main peak of titanium oxynitride by X-ray diffraction (°) | 42.90 | 42.96 | 42.94 | 43.00 | 42.94 |
| Particle diameter (μm) | 0.03~0.10 | 0.03~0.10 | 0.03~0.10 | 0.03~0.10 | 0.03~0.10 |
| Specific surface area (m²/g) | 16.0 | 22.3 | 25.0 | 21.5 | 22.8 |
| Crystallite size (nm) | 23 | 21 | 21 | 21 | 21 |
| Oxidation stability | Good | Good | Good | Good | Good |

FIGS. 4 to 9 show the visible light reflection spectrum of the samples A to F obtained in the Production Examples and the Comparative Production Examples. The titanium oxynitride samples according to the present invention have a high nitrogen content and a small crystallite size, and therefore as shown in FIGS. 4 to 9, a wavelength at which the titanium oxynitride according to the present invention shows a minimum visible light reflectance shifts to the lower wavelength side as compared to the case of the Comparative Production Examples. This indicates that the titanium oxynitride according to the present invention has a higher visible light reflectance. In addition, it has been found that the pigmentary properties of the titanium oxynitride samples according to the present invention are similar to those of the titanium oxynitride samples of the Comparative Production Examples.

Examples 1 to 15 and Comparative Examples 1 to 3

(Preparation of Pigment Dispersion Liquid)

A Pigment, a pigment dispersant (Disperbyk 161 (30 wt % of a pigment dispersant is contained in an organic solvent), BYK Japan K.K.), and an organic solvent were mixed at a composition ratio shown in Table 2, and then the pigment was pre-dispersed in the organic solvent using a Disper. Then, the thus obtained mixed liquid was put into a bead mill (Diamond Fine Mill MD-1, Mitsubishi Heavy Industries, Ltd.), the pigment was further dispersed using the bead mill until a desired diameter of dispersed particles of the pigment was obtained, and then beads were removed. In this way, dispersion liquids 1 to 13 were prepared. It is to be noted that the beads used were zirconia beads having a diameter of 0.10 mm and the filling factor of the beads in a vessel was 70%. The diameter of dispersed particles of the pigment was determined by measuring the particle diameter distribution of the pigment particles in the pigment dispersion liquid diluted with an organic solvent 1000 times using a microtrac UPA particle diameter distribution meter (manufactured by Nikkiso Co., Ltd.) The sample L shown in Table 2 was carbon black manufactured by Columbian Carbon under the trade name of "Laben 1255" (average diameter of dispersed particles: 21 nm), and the sample M shown in Table 2 was carbon black manufactured by Columbian Carbon under the trade name of "Laben 1040" (average diameter of dispersed particles: 28 nm).

TABLE 2

Composition of Pigment Dispersion Liquid

| | Pigment | Dispersant | Alkali-soluble resin | Organic solvent | |
|---|---|---|---|---|---|
| Dispersion Liquid 1 | Titanium oxynitride Sample A | Disperbyk 161 | | Methoxybutylacetate | |
| Blending amount | 100 parts by weight | 33 parts by weight | | 367 parts by weight | |
| Dispersion Liquid 2 | Titanium oxynitride Sample B | Disperbyk 161 | | Methoxybutylacetate | |
| Blending amount | 100 parts by weight | 33 parts by weight | | 367 parts by weight | |
| Dispersion Liquid 3 | Titanium oxynitride Sample C | Disperbyk 161 | | Methoxybutylacetate | |
| Blending amount | 100 parts by weight | 33 parts by weight | | 367 parts by weight | |
| Dispersion Liquid 4 | Titanium oxynitride Sample D | Disperbyk 161 | | Methoxybutylacetate | |
| Blending amount | 100 parts by weight | 33 parts by weight | | 367 parts by weight | |
| Dispersion Liquid 5 | Titanium oxynitride Sample E | Disperbyk 161 | | Methoxybutylacetate | |
| Blending amount | 100 parts by weight | 33 parts by weight | | 367 parts by weight | |
| Dispersion Liquid 6 | Titanium oxynitride Sample F | Disperbyk 161 | | Methoxybutylacetate | |
| Blending amount | 100 parts by weight | 33 parts by weight | | 367 parts by weight | |
| Dispersion Liquid 7 | Titanium oxynitride Sample G | Disperbyk 161 | | Methoxybutylacetate | |
| Blending amount | 100 parts by weight | 33 parts by weight | | 367 parts by weight | |
| Dispersion Liquid 8 | Titanium oxynitride Sample H | Disperbyk 161 | | Methoxybutylacetate | |
| Blending amount | 100 parts by weight | 33 parts by weight | | 367 parts by weight | |
| Dispersion Liquid 9 | Titanium oxynitride Sample I | Disperbyk 161 | | Methoxybutylacetate | |
| Blending amount | 100 parts by weight | 33 parts by weight | | 367 parts by weight | |
| Dispersion Liquid 10 | Titanium oxynitride Sample J | Disperbyk 161 | | Methoxybutylacetate | |
| Blending amount | 100 parts by weight | 33 parts by weight | | 367 parts by weight | |
| Dispersion Liquid 11 | Titanium oxynitride Sample K | Disperbyk 161 | | Methoxybutylacetate | |
| Blending amount | 100 parts by weight | 33 parts by weight | | 367 parts by weight | |
| Dispersion Liquid 12 | Carbon black Sample L | Disperbyk 161 | Epoxy(meth)acrylate resin | Methoxybutylacetate | Cyclohexanone |
| Blending amount | 100 parts by weight | 67 parts by weight | 37 parts by weight | 266 parts by weight | 30 parts by weight |
| Dispersion Liquid 13 | Carbon black Sample M | Disperbyk 161 | Epoxy(meth)acrylate resin | Methoxybutylacetate | Cyclohexanone |
| Blending amount | 100 parts by weight | 67 parts by weight | 37 parts by weight | 266 parts by weight | 30 parts by weight |

(Preparation of Binder Solution)

An alkali-soluble resin, a polyfunctional monomer, a photopolymerization initiator, a sensitizer, and an organic solvent were mixed at a composition ratio shown in Table 3, and they were stirred until all the components were completely dissolved to prepare a binder solution.

In this way, binder solutions 1 to 4 were prepared.

Alkali-Soluble Resin

Epoxy(meth)acrylate resin: Solid content 54%, Weight average molecular weight: 3,600, Acid value: 114 mgKOH/g Polyfunctional Monomer TO1382 (manufactured by TOAGOSEI Co., Ltd.)

Photopolymerization Initiator CGI242 (manufactured by Ciba Specialty Chemicals)

Biimidazole (manufactured by KUROGANE KASEI Co., Ltd.)

Irgacure 369 (manufactured by Ciba Specialty Chemicals)

Sensitizer 4,4-bis(diethylamino)benzophenone (hereinafter abbreviated as "EAB"; manufactured by Kanto Chemical Co., Ltd.)

Organic Solvent

Methoxybutylacetate (hereinafter, abbreviated as "MBA"; manufactured by Daicel Chemical Industries Ltd.)

Cyclohexanone (manufactured by Wako Pure Chemical Industries, Ltd.)

TABLE 3

Composition of Binder Solution

| | | Alkali-soluble resin | Polyfunctional monomer | Photopolymerization initiator | | Sensitizer | Organic solvent | |
|---|---|---|---|---|---|---|---|---|
| Binder solution 1 | | Epoxy(meth)acrylate resin | TO1382 | CGI-242 | Biimidazole | | MBA | Cyclohexanone |
| Blending amount | | 319 parts by weight | 130 parts by weight | 75 parts by weight | 25 parts by weight | | 1016 parts by weight | 435 parts by weight |
| Binder solution 2 | | Epoxy(meth)acrylate resin | TO1382 | CGI-242 | Biimidazole | EAB | MBA | Cyclohexanone |
| Blending amount | | 177 parts by weight | 72 parts by weight | 20 parts by weight | 30 parts by weight | 5 parts by weight | 563 parts by weight | 242 parts by weight |
| Binder solution 3 | | Epoxy(meth)acrylate resin | TO1382 | Irgacure369 | Biimidazole | | MBA | Cyclohexanone |
| Blending amount | | 319 parts by weight | 130 parts by weight | 75 parts by weight | 25 parts by weight | | 1016 parts by weight | 435 parts by weight |
| Binder solution 4 | | Epoxy(meth)acrylate resin | TO1382 | Irgacure369 | Biimidazole | EAB | MBA | Cyclohexanone |
| Blending amount | | 177 parts by weight | 72 parts by weight | 20 parts by weight | 30 parts by weight | 5 parts by weight | 563 parts by weight | 242 parts by weight |

(Preparation of Black Resin Composition for Display Device)

The dispersion liquid, the binder solution, and an organic solvent were mixed at a composition ratio shown in Table 4, and they were stirred for 2 hours. Then, the thus obtained mixed liquid was filtered using a 0.2 µm filter to prepare a resist. In this way, resists 1 to 15 and comparative resists 1 to 3 were prepared.

TABLE 4

Black Resin Composition

| | | Design P/V | Pigment dispersion liquid | Binder solution | Organic solvent |
|---|---|---|---|---|---|
| Example 1 | Resist 1 Blending amount | 1.7 | dispersion liquid 1 54 parts by weight | Binder solution 1 26 parts by weight | MBA 10 parts by weight |
| Example 2 | Resist 2 Blending amount | 1.7 | dispersion liquid 1 54 parts by weight | Binder solution 2 26 parts by weight | MBA 10 parts by weight |
| Example 3 | Resist 3 Blending amount | 2.3 | dispersion liquid 1 60 parts by weight | Binder solution 1 20 parts by weight | MBA 10 parts by weight |
| Example 4 | Resist 4 Blending amount | 1.7 | dispersion liquid 2 54 parts by weight | Binder solution 2 26 parts by weight | MBA 10 parts by weight |
| Example 5 | Resist 5 Blending amount | 1.8 | dispersion liquid 3 55 parts by weight | Binder solution 2 25 parts by weight | MBA 10 parts by weight |

TABLE 4-continued

<table>
<tr><th colspan="2"></th><th colspan="4">Black Resin Composition</th></tr>
<tr><th colspan="2"></th><th>Design P/V</th><th>Pigment dispersion liquid</th><th>Binder solution</th><th>Organic solvent</th></tr>
<tr><td>Example 6</td><td>Resist 6<br>Blending amount</td><td>2.0</td><td>dispersion liquid 4<br>57 parts by weight</td><td>Binder solution 2<br>23 parts by weight</td><td>MBA<br>10 parts by weight</td></tr>
<tr><td>Example 7</td><td>Resist 7<br>Blending amount</td><td>1.7</td><td>dispersion liquid 1<br>54 parts by weight</td><td>Binder solution 3<br>26 parts by weight</td><td>MBA<br>10 parts by weight</td></tr>
<tr><td>Example 8</td><td>Resist 8<br>Blending amount</td><td>1.7</td><td>dispersion liquid 1<br>54 parts by weight</td><td>Binder solution 4<br>26 parts by weight</td><td>MBA<br>10 parts by weight</td></tr>
<tr><td>Example 9</td><td>Resist 9<br>Blending amount</td><td>1.8</td><td>dispersion liquid 7<br>55 parts by weight</td><td>Binder solution 2<br>25 parts by weight</td><td>MBA<br>10 parts by weight</td></tr>
<tr><td>Example 10</td><td>Resist 10<br>Blending amount</td><td>1.9</td><td>dispersion liquid 8<br>56 parts by weight</td><td>Binder solution 2<br>24 parts by weight</td><td>MBA<br>10 parts by weight</td></tr>
<tr><td>Example 11</td><td>Resist 11<br>Blending amount</td><td>1.9</td><td>dispersion liquid 9<br>56 parts by weight</td><td>Binder solution 2<br>24 parts by weight</td><td>MBA<br>10 parts by weight</td></tr>
<tr><td>Example 12</td><td>Resist 12<br>Blending amount</td><td>1.8</td><td>dispersion liquid 11<br>55 parts by weight</td><td>Binder solution 2<br>25 parts by weight</td><td>MBA<br>10 parts by weight</td></tr>
<tr><td>Example 13</td><td>Resist 13<br>Blending amount</td><td>2.0</td><td>dispersion liquid 11<br>57 parts by weight</td><td>Binder solution 2<br>23 parts by weight</td><td>MBA<br>10 parts by weight</td></tr>
<tr><td>Example 14</td><td>Resist 14<br><br>Blending amount</td><td>1.8</td><td>dispersion liquid 9<br>49.5 parts by weight<br>dispersion liquid 12<br>11.0 parts by weight</td><td>Binder solution 2<br><br>23.4 parts by weight</td><td>MBA<br><br>6.1 parts by weight</td></tr>
<tr><td>Example 15</td><td>Resist 15<br><br>Blending amount</td><td>1.8</td><td>dispersion liquid 9<br>49.5 parts by weight<br>dispersion liquid 13<br>11.0 parts by weight</td><td>Binder solution 2<br><br>23.4 parts by weight</td><td>MBA<br><br>6.1 parts by weight</td></tr>
<tr><td>Comparative Example 1</td><td>Comparative Resist 1<br>Blending amount</td><td>2.3</td><td>dispersion liquid 5<br>60 parts by weight</td><td>Binder solution 1<br>20 parts by weight</td><td>MBA<br>10 parts by weight</td></tr>
<tr><td>Comparative Example 2</td><td>Comparative Resist 2<br>Blending amount</td><td>1.7</td><td>dispersion liquid 6<br>54 parts by weight</td><td>Binder solution 2<br>26 parts by weight</td><td>MBA<br>10 parts by weight</td></tr>
<tr><td>Comparative Example 3</td><td>Comparative Resist 3<br>Blending amount</td><td>2.3</td><td>dispersion liquid 6<br>60 parts by weight</td><td>Binder solution 1<br>20 parts by weight</td><td>MBA<br>10 parts by weight</td></tr>
</table>

<Evaluation of Black Resin Composition for Display Device 1>

Each of the black resin compositions of the Examples 1 to 15 and the Comparative Examples 1 to 3 was applied by a spin coater onto a glass substrate (manufactured by Asahi Glass Co., Ltd.) having a size of 10 cm×10 cm and a thickness of 0.7 mm so that an OD value was 4.0. Then, the black resin composition was pre-baked using a hot plate at 90° C. for 3 minutes to form a coating film of the black resin composition. Then, the coating film was exposed to light through a photo mask using an ultra high-pressure mercury lamp, developed with a 0.04 wt % aqueous potassium hydroxide solution (25° C.) for a predetermined time, washed with pure water, and dried. Then, the glass substrate was post-baked at 230° C. for 30 minutes in a clean oven to form a light-blocking layer on the substrate in a region where a light-blocking part should be formed on the substrate. It is to be noted that the photo mask used had a pattern whose line and space width was varied from 1 to 100 μm.

The thus obtained light-blocking layer was evaluated from the following viewpoints. The evaluation results are shown in Table 5.

<OD Value>

The OD value of the light-blocking layer was determined from a stimulus value Y in the XYZ color system measured with a microspectrophotometer OSP-SP200 (manufactured by OLYMPUS CORPORATION) using the following formula:

$$OD = -\log_{10}(Y/100)$$

<Film Thickness>

The film thickness of the light-blocking layer was measured using a stylus film thickness meter (manufactured by KLA Tencor Corporation).

<Sensitivity>

The minimum exposure dose required to allow a 20 μm line and space pattern to come into close contact with the glass substrate was measured and evaluated according to the following criteria.

⊚: Lines having a width of 10 μm were able to come into close contact with the glass substrate at an exposure dose of 100 mJ/cm² or less.

◯: Lines having a width of 20 μm were able to come into close contact with the glass substrate at an exposure dose of 100 mJ/cm² or less.

x: Lines having a width of 20 μm were not able to come into close contact with the glass substrate at an exposure dose of 100 mJ/cm² or less.

<Adhesiveness>

The minimum width of lines which were able to be in close contact with the glass substrate without being filed off by development was determined using 1 μm to 50 μm line and space patterns and evaluated according to the following criteria.

⊚: Lines having a width of 10 μm or less were able to be in close contact with the glass substrate.
○: Lines having a width of larger than 10 μm but 20 μm or less were able to be in close contact with the glass substrate.
x: Lines having a width of 20 μm or less were not able to be in close contact with the glass substrate.

TABLE 5

Evaluation Results of Black Resin Composition

| | OD value of light-blocking layer | Film thickness of light-blocking layer (μm) | Sensitivity 60~100 mJ/cm² Adhesiveness of 10 μm-wide lines and 20 μm-wide lines | Adhesiveness 60 mJ/cm² Adhesiveness of 20 μm-wide lines |
|---|---|---|---|---|
| Example 1 | 4.0 | 0.8 | ⊚ (60 mJ) | ⊚ |
| Example 2 | 4.0 | 0.8 | ⊚ (60 mJ) | ⊚ |
| Example 3 | 4.0 | 0.7 | ○ (60 mJ) | ○ |
| Example 4 | 4.0 | 0.8 | ⊚ (60 mJ) | ⊚ |
| Example 5 | 4.0 | 0.8 | ⊚ (60 mJ) | ⊚ |
| Example 6 | 4.0 | 0.8 | ⊚ (60 mJ) | ⊚ |
| Example 7 | 4.0 | 0.8 | ○ (100 mJ) | ○ |
| Example 8 | 4.0 | 0.8 | ○ (100 mJ) | ○ |
| Example 9 | 4.0 | 0.8 | ⊚ (60 mJ) | ⊚ |
| Example 10 | 4.0 | 0.8 | ⊚ (60 mJ) | ⊚ |
| Example 11 | 4.0 | 0.8 | ⊚ (60 mJ) | ⊚ |
| Example 12 | 4.0 | 0.8 | ⊚ (60 mJ) | ⊚ |
| Example 13 | 4.0 | 0.8 | ⊚ (60 mJ) | ⊚ |
| Example 14 | 4.0 | 0.8 | ○ (60 mJ) | ⊚ |
| Example 15 | 4.0 | 0.8 | ○ (60 mJ) | ⊚ |
| Comparative Example 1 | 4.0 | 1.6 | ○ (60 mJ) | ○ |
| Comparative Example 2 | 4.0 | 1.2 | ○ (60 mJ) | ⊚ |
| Comparative Example 3 | 4.0 | 1.0 | ○ (60 mJ) | ○ |

<Evaluation of Black Resin Composition for Display Device 2>

Each of the black resin composition of the Example 11 and the black resin compositions of Examples 14 and 15 obtained by replacing 10 wt % of the total amount of the pigment of the Example 11 with carbon black was applied onto a glass substrate to form a thin film, and the thin film was evaluated from the viewpoint of reflected light from the glass substrate side. More specifically, each of the black resin compositions was applied by a spin coater onto a glass substrate (manufactured by Asahi Glass Co., Ltd.) having a size of 10 cm×10 cm and a thickness of 0.7 mm so that an OD value was 4.0. Then, the black resin composition was pre-baked using a hot plate at 90° C. for 3 minutes to form a coating film of the black resin composition. The thin film was exposed to light at an exposure dose of 60 mJ/cm² using an ultra high-pressure mercury lamp. Then, the visible light reflection spectrum of the thus obtained coating film was measured over the wavelength range of 400 to 800 nm at an incident angle of 5° using a UV visible spectrophotometer (UV-2550, Shimadzu Corporation).

Figure 10:
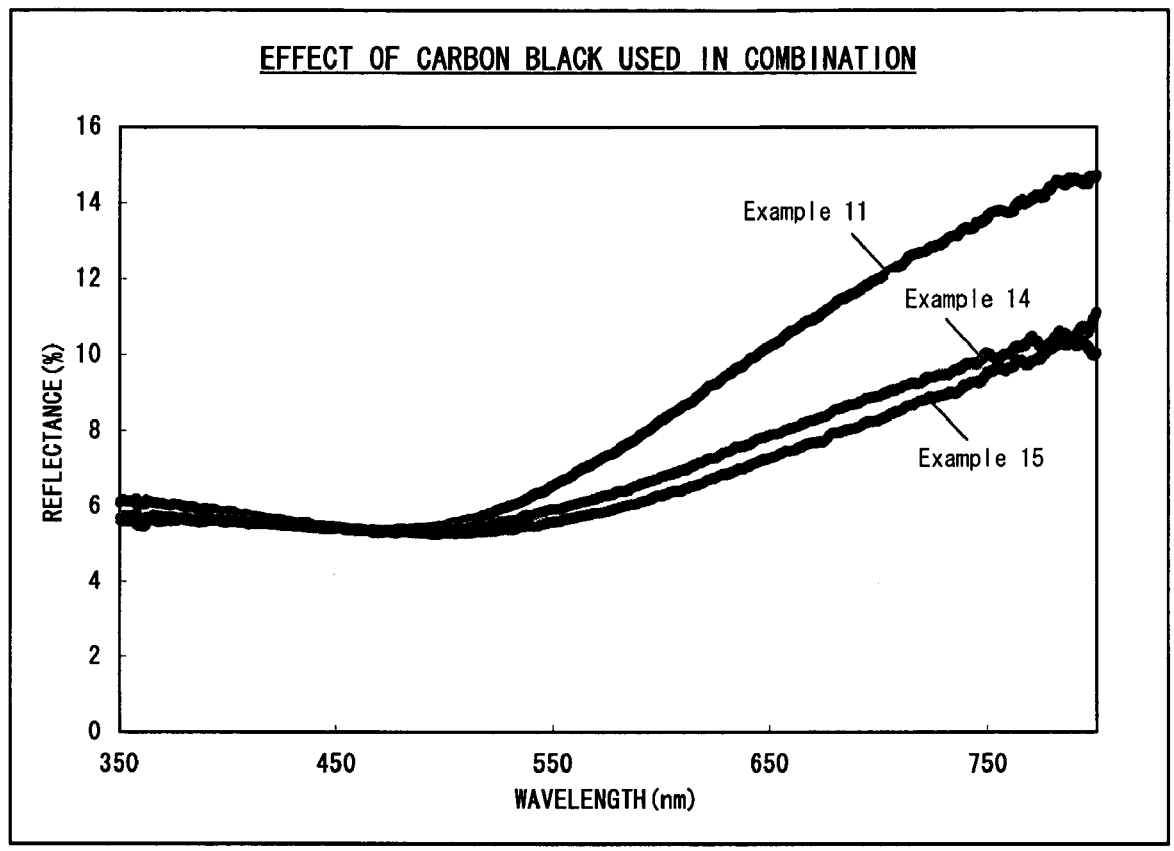
FIG. 10 is a graph showing the visible light reflectance of black resin compositions of Examples 11, 14, and 15.

FIG. 10 shows the visible light reflection spectrum of the coating films formed using the black resin compositions of the Examples 11, 14, and 15, respectively. It has become clear that the black resin compositions of Examples 14 and 15 containing an appropriate amount of carbon black not only have a high optical density even in the form of a thin film and excellent patterning ability like the black resin composition of Example 11 but also effectively reduce colored (yellowish red) reflected light.

Example A

Production of Color Filter

1. Formation of Black Matrix

The black resin composition of the Example 2 was applied onto a 1.1 mm-thick glass substrate (AL material, Asahi Glass Co., Ltd.) by a spin coater so that an OD value was 4.0, and was then dried at 90° C. for 3 minutes to form a light-blocking layer (line width: 25 μm). The thus obtained light-blocking layer was exposed to light using an ultra high-pressure mercury lamp through a predetermined photo mask corresponding to a light-blocking pattern, and was then developed with a 0.5 wt % aqueous potassium hydroxide solution. Then, the glass substrate was placed in an atmosphere having a temperature of 230° C. for 30 minutes for heat treatment to form a black matrix on the substrate in a region where a light-blocking part should be formed. The thickness of the black matrix as measured at the center of the light-blocking part was 0.7 μm.

2. Formation of Colored Layer (Preparation of Photosensitive Colored Resin Composition)

An organic pigment, a pigment dispersant, an acrylic copolymer, and an organic solvent were mixed according to the composition of a red pigment dispersion liquid shown in Table 6, and the pigment was pre-dispersed using a Disper. The thus obtained mixed liquid was put into a bead mill (Diamond Fine Mill MD-1, Mitsubishi Heavy Industries, Ltd.), and the pigment was further dispersed until a desired diameter of dispersed particles of the pigment was obtained, and then beads were removed to obtain a pigment dispersion liquid. It is to be noted that the beads used were zirconia beads having a diameter of 0.30 mm and the filling factor of the beads in a vessel was 70%. It is also to be noted that the diameter of dispersed particles of the pigment was determined by measuring the particle diameter distribution of the pigment particles in the pigment dispersion liquid diluted with an organic solvent 1000 times using a microtrac UPA particle diameter distribution meter (manufactured by Nikkiso Co., Ltd.). In the same manner, a green pigment dispersion liquid and a blue pigment dispersion liquid each having the composition shown in Table 6 were prepared.

The thus obtained red pigment dispersion liquid, an alkali-soluble resin, a polyfunctional monomer, photopolymerization initiator, and an organic solvent were mixed according to the composition of a photosensitive red resin composition shown in Table 7, and they were stirred for 2 hours and then filtered using a 0.2 μm filter to prepare a photosensitive red resin composition. In the same manner, a green resin composition and a blue resin composition each having the composition shown in Table 7 were prepared.

Alkali-Soluble Resin
Acrylic Copolymer: benzylmethacrylate/methylmethacrylate/n-butylmethacrylate/methacrylic acid copolymer (Solid content: 54%, Weight average molecular weight: 11,000, Acid value: 108 mgKOH/g)
Polyfunctional Monomer
TO1382 (manufactured by TOAGOSEI Co., Ltd.)
Photopolymerization Initiator
Irgacure 369 (manufactured by Ciba Specialty Chemicals)
Organic Solvent
Propyleneglycol monomethyl ether acetate (hereinafter, abbreviated as "PGMEA"; manufactured by Daicel Chemical Industries Ltd.)

TABLE 6

Composition of Colored Pigment Dispersion Liquid

| | Pigment | | Dispersant | Alkali-soluble resin | Organic solvent |
|---|---|---|---|---|---|
| Red pigment dispersion liquid | Pigment Red 254 | Pigment Yellow 139 | Ajisper PB822 | Acrylic copolymer | PGMEA |
| Blending amount | 85 parts by weight | 15 parts by weight | 20 parts by weight | 92.6 parts by weight | 1487.4 parts by weight |
| Green pigment dispersion liquid | Pigment Green 36 | Pigment Yellow 138 | Ajisper PB822 | Acrylic copolymer | PGMEA |
| Blending amount | 60 parts by weight | 40 parts by weight | 20 parts by weight | 92.6 parts by weight | 1487.4 parts by weight |
| Blue pigment dispersion liquid | Pigment Blue 15:6 | Pigment Violet 23 | Ajisper PB822 | Acrylic copolymer | PGMEA |
| Blending amount | 90 parts by weight | 10 parts by weight | 20 parts by weight | 92.6 parts by weight | 1487.4 parts by weight |

TABLE 7

Composition of Colored Resin Composition

| | Pigment dispersion liquid | Alkali-soluble resin | Polyfunctional monomer | Photopolymerization initiator | Organic solvent |
|---|---|---|---|---|---|
| Photosensitive red resin composition | Red pigment dispersion liquid | Acrylic copolymer | TO1382 | Irgacure369 | PGMEA |
| Blending amount | 100 parts by weight | 20 parts by weight | 7.5 parts by weight | 4.3 parts by weight | 56 parts by weight |
| Photosensitive green resin composition | Green pigment dispersion liquid | Acrylic copolymer | TO1382 | Irgacure369 | PGMEA |
| Blending amount | 100 parts by weight | 9.8 parts by weight | 5.2 parts by weight | 3.8 parts by weight | 47.8 parts by weight |
| Photosensitive blue resin composition | Blue pigment dispersion liquid | Acrylic copolymer | TO1382 | Irgacure369 | PGMEA |
| Blending amount | 100 parts by weight | 23.7 parts by weight | 8.4 parts by weight | 4.6 parts by weight | 59 parts by weight |

The photosensitive red resin composition shown in Table 7 was applied onto the opening partitioned by the light-blocking part and the light-blocking part so that the ligof 7 μm from the edge of the opening is covered with the ht-blocking part of an area surrounding each opening and having a width photosensitive red resin composition to form a red colored layer. It is to be noted that the thickness of the colored layer as measured at the center of the opening partitioned by the light-blocking part was 2.0 μm. In the same manner, a green colored layer and a blue colored layer were formed to obtain a color filter. The difference between the maximum total thickness of the light-blocking layer and the colored layer overlapping the light-blocking layer and the thickness of the colored layer as measured at the center of the opening of the black matrix was defined as a level difference resulting from the thickness of the light-blocking layer.

Comparative Example A

Production of Color Filter

Formation of Black Matrix

The black resin composition of the Comparative Example 2 was applied onto a 1.1 mm-thick glass substrate (AL material, Asahi Glass Co., Ltd.) by a spin coater so that an OD value was 4.0, and was then dried at 90° C. for 3 minutes to form a light-blocking layer (line width: 25 μm). The thus obtained light-blocking layer was exposed to light using an ultra high-pressure mercury lamp through a predetermined photo mask corresponding to a light-blocking pattern, and was then developed with a 0.5 wt % aqueous potassium hydroxide solution. Then, the glass substrate was placed in an atmosphere having a temperature of 230° C. for 30 minutes for heat treatment to form a black matrix on the substrate in a region where a light-blocking part should be formed. The thickness of the black matrix as measured at the center of the light-blocking part was 1.2 μm.

Formation of Colored Layer

In the same manner as in the Example A, a red colored layer, a green colored layer, and a blue colored layer were formed to obtain a color filter. The difference between the maximum total thickness of the light-blocking layer and the colored layer overlapping the light-blocking layer and the thickness of the colored layer as measured at the center of the opening of the black matrix was defined as a level difference resulting from the thickness of the light-blocking layer.

<Evaluation Result of Level Difference in Colored Layer>

The film thickness and OD value of the light-blocking layer, the film thickness of each of the red, green, and blue colored layers, and the level difference in each colored layer of the color filters produced in the Example A and the Comparative Example A are shown in Table 8. From the results, it has been confirmed that the use of the black resin composition for display device according to the present invention makes it possible to produce a color filter whose light-blocking effect is high and a level difference resulting from the thickness of the light-blocking layer is reduced to 0.4 μm or less.

TABLE 8

| | Black resin composition | OD value of light-blocking layer | light-blocking layer Film thickness (μm) | Red colored layer | | Green colored layer | | Blue colored layer | |
|---|---|---|---|---|---|---|---|---|---|
| | | | | Film thickness (μm) | Level difference (μm) | Film thickness (μm) | Level difference (μm) | Film thickness (μm) | Level difference (μm) |
| Example A | Resist 2 | 4.0 | 0.7 | 2.0 | 0.05 | 2.0 | 0.21 | 2.0 | 0.14 |
| Comparative Example A | Comparative resist 2 | 4.0 | 1.2 | 2.0 | 0.25 | 2.0 | 0.43 | 2.0 | 0.32 |

The invention claimed is:

1. A black resin composition for display device, comprising titanium oxynitride represented by the composition formula: $TiN_xO_y nSiO_2$ (wherein Ti represents a titanium atom, N represents a nitrogen atom, O represents an oxygen atom, Si represents a silicon atom, x represents the ratio of nitrogen atoms to titanium atoms, y represents the ratio of oxygen atoms to titanium atoms, wherein $0<x<2$ and $0<y<2$, n represents the molar ratio of $SiO_2$ to $TiN_xO_y$ and is a real number within the range of $0 \leq n \leq 0.05$), containing a nitrogen atom wherein N is present in an amount by weight of $17 \leq N < 23$ wt %, and having a specific surface area of 5 to 30 m/g and a crystallite size as measured using an X-ray diffractometer of 17 to 25 nm; and a curable binder system containing a compound represented by the following formula (1):

formula (1)

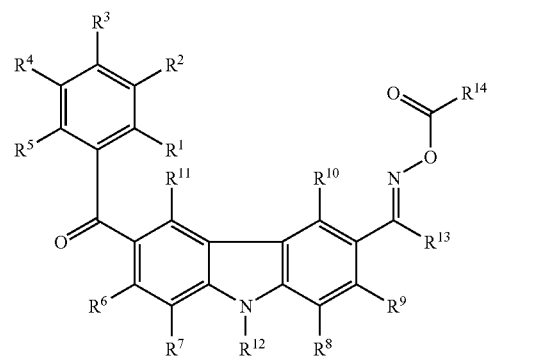

wherein $R^1$ to $R^{14}$ are each independently selected from the group consisting of hydrogen, a hydroxyl group, an amino group, a carboxyl group, a halogen, a ketone group, an aromatic group, or an aliphatic group, wherein the aromatic group and the aliohatic group may have a structure selected from the group consisting of a branched structure and an alicyclic structure, and may contain one or more kinds of bonds selected from the group consisting of an ether bond, an ester bond, an amino bond, an amide bond, a thioether bond, and an unsaturated bond at any position other than the terminal thereof, and may contain one or more kinds of groups selected from the group consisting of a hydroxyl group, an amino group, a carboxyl group, a halogen, a carbonyl group, and an aromatic group at the terminal thereof.

2. The black resin composition for display device according to claim 1, wherein the titanium oxynitride has a reflectance of at least 11% as measured using a UV visible spectrophotometer at a wavelength of 650 nm and has a minimum reflectance of 11.5% or less within the wavelength range of 400 to 800 nm.

3. The black resin composition for display device according to claim 1, wherein the titanium oxynitride represented by $TiN_xO_y\text{-}nSiO_2$ contains a nitrogen atom represented by N in an amount of 19 to 22 wt %.

4. The black resin composition for display device according to claim 1, wherein the ratio (y/x) of y to x in $TiN_xO_y$ of the titanium oxynitride is in the range of 0.10 to 0.60.

5. The black resin composition for display device according to claim 1, wherein the surface of particles of the titanium oxynitride is coated with an inorganic compound and/or an organic compound in an amount of 0.01 to 30 wt % with respect to the amount of the titanium oxynitride.

6. The black resin composition for display device according to claim 1, wherein the curable binder system is photosensitive.

7. The black resin composition for display device according to claim 1, further comprising carbon black in an amount of 3 to 20 wt % with respect to the total amount of a pigment including the titanium oxynitride.

8. The black resin composition for display device according to claim 1, wherein the weight ratio (P/V) between a pigment (P) including the titanium oxynitride and solid content (V) except for the pigment is in the range of 0.5 to 3.0.

9. The black resin composition for display device according to claim 1, which is used for producing a color filter.

10. A member for display device, comprising a light-blocking layer formed using the black resin composition according to claim 1.

11. The black resin composition for display device according to claim 1, wherein the titanium oxynitride is represented by the composition formula: $TiN_xO_ynSiO_2$ wherein x represents the ratio of nitrogen atoms to titanium atoms, y represents the ratio of oxygen atoms to titanium atoms, wherein O<x<2 and O<y<2, n represents the molar ratio of $SiO_2$ to $TiN_xO_y$, wherein O <n 0.05, and the titanium oxynitride is obtained by a process comprising the following steps:

coating silicon oxide on one or more titanium oxide particles; and heat-baking the titanium oxide particles In the presence of a nitrogen-coating reducing agent.

* * * * *